(12) United States Patent  
Snyder et al.

(10) Patent No.: US 8,138,720 B2  
(45) Date of Patent: Mar. 20, 2012

(54) SYSTEM AND METHOD FOR DUAL ENERGY STORAGE MANAGEMENT

(75) Inventors: Philip Kenneth Snyder, Livermore, CA (US); Donald Bender, San Ramon, CA (US)

(73) Assignee: AFS Trinity Power Corporation, Bellevue, WA (US)

( * ) Notice: Subject to any disclaimer, the term of this patent is extended or adjusted under 35 U.S.C. 154(b) by 529 days.

(21) Appl. No.: 12/370,561

(22) Filed: Feb. 12, 2009

(65) Prior Publication Data

US 2009/0212626 A1  Aug. 27, 2009

Related U.S. Application Data

(60) Provisional application No. 61/031,663, filed on Feb. 26, 2008, provisional application No. 61/115,004, filed on Nov. 14, 2008.

(51) Int. Cl.
- *H02J 7/00* (2006.01)
- *H02J 1/10* (2006.01)
- *H02J 7/16* (2006.01)
- *H02J 3/00* (2006.01)

(52) U.S. Cl. ........ 320/127; 320/134; 320/135; 320/136; 320/152; 320/157; 320/158; 320/159; 320/162; 320/163; 320/164; 307/44; 307/45; 307/46; 307/48; 307/52; 307/53; 307/59

(58) Field of Classification Search ........... 320/127; 307/46, 48

See application file for complete search history.

(56) References Cited

U.S. PATENT DOCUMENTS

| | | | |
|---|---|---|---|
| 7,193,392 B2 | 3/2007 | King et al. | |
| 7,301,307 B2 | 11/2007 | Hansen et al. | |
| 7,733,061 B2* | 6/2010 | Zemke et al. | 320/128 |
| 7,969,121 B2* | 6/2011 | Smith et al. | 320/167 |
| 2004/0209161 A1* | 10/2004 | Dubac et al. | 429/149 |
| 2005/0077880 A1* | 4/2005 | Turner et al. | 320/166 |
| 2005/0112420 A1* | 5/2005 | Lai et al. | 429/13 |
| 2007/0132456 A1 | 6/2007 | Salman et al. | |
| 2008/0143119 A1* | 6/2008 | Asada | 290/40 B |
| 2008/0276892 A1* | 11/2008 | Doljack | 123/179.28 |
| 2009/0066291 A1* | 3/2009 | Tien et al. | 320/118 |

OTHER PUBLICATIONS

D. Franzoni, An Active Filter for Fuel Cell Applications, 2005, IEEE.*  
Abhishek Drolia, An Approach to Connect Ultracapacitor to Fuel Cell Powered Electric Vehicle and Emulating Fuel Cell Electrical Characteristics using Switched Mode Converter, 2003, IEEE.*  
International Search Report and Written Opinion for PCT/US2009/034510 dated Oct. 27, 2009.

* cited by examiner

*Primary Examiner* — Patrick Assouad  
*Assistant Examiner* — Nathaniel Pelton  
(74) *Attorney, Agent, or Firm* — Morgan, Lewis & Bockius LLP

(57) ABSTRACT

A dual-energy storage system is described, having two energy sources: (a) a fast-energy storage device (FES) such as an ultracapacitor, and (b) a long duration or steady power device, such as a fuel-cell or battery. A power converter or controller executes an energy management algorithm to determine when to provide bursts of additional power/current from the fast-energy storage device, and when to recharge the fast-energy storage device.

29 Claims, 32 Drawing Sheets

SYSTEM AND METHOD FOR DUAL ENERGY STORAGE MANAGEMENT

RELATED APPLICATIONS

This application claims the benefit and priority of U.S. Provisional Patent Application Ser. No. 61/031,663, filed on Feb. 26, 2008, which is hereby incorporated entirely herein by reference. This application also claims the benefit and priority of U.S. Provisional Patent Application Ser. No. 61/115,004, filed on Nov. 14, 2008, which is also hereby incorporated entirely herein by reference.

TECHNICAL FIELD

This invention relates to the coordination of two energy-storage devices, one fast-energy storage device (also known as FES™) intended for delivery of energy of short duration and high power (e.g., an ultracapacitor, capacitor, flywheel energy storage device, or high power battery), the second intended for long duration and steady power (e.g., a battery, fuel cell). The technology described herein is suitable for all applications where electrical power must be rapidly delivered or recovered. Suitable applications include uninterruptible power supplies (UPS), electric vehicles (EVs), hybrid vehicles (HEVs), and plug-in hybrid electric vehicles (PHEVs).

BACKGROUND

There are many situations in industry or transportation that require the use of multiple energy storage systems. Typically, a long term energy storage system, such as a battery or fuel cell, may be used to supply the bulk of the energy required to operate equipment or power electronics. Often times there is a need for quick bursts of energy and power that cannot always be supplied by such long term energy systems without causing damage to the system that results in a shortened operating life of such systems, or even the risk of overheating and explosion. In these cases it is desirable to add an additional energy storage system to supply shorter, but higher power, bursts of energy to the equipment. Getting these two energy sources to work together, however, is challenging. Therefore it is highly desirable to provide a system and method that addresses the challenges of having the two energy systems work together.

Hybrid vehicles typically use a conventional hydrocarbon combustion engine (e.g., using gasoline, diesel, compressed natural gas, ethanol, or a combination thereof) and an electric motor coupled to a battery. The battery provides power to the electric motor and in some cases stores power recovered from regenerative braking. In current hybrids, the battery usually has sufficient storage to assist the gasoline engine, but not to operate the vehicle using electric power only at freeway speeds. Plug-in Hybrid vehicles (PHEVs) are hybrid vehicles that have a higher electrical power/energy capacity, such that they can operate on electric power alone for short (e.g., less than 40 miles) trips. Plug-in hybrids typically recharge from an mains electric power supply (such as 110 Volts or 220 Volts at home or a higher voltage at a dedicated charging station).

Unfortunately, current problems with conventional current storage systems have limited the wider adoption of emerging PHEVs. For example, these conventional electrical power sources (e.g., batteries) are costly and have a limited life. Existing PHEV systems also do not last long, as rapid charging and discharging degrades the power source over time.

Power and current demands of such a vehicle vary significantly. For example, when a vehicle is at a stoplight, the vehicle is in a stopped steady state and requires very little power or current. When a vehicle is cruising on a freeway, the vehicle may be in a cruising steady state and may also require lower current or power. Accelerating, climbing a hill, or towing a load, however, required significantly more current or power, and may required a continuous heavy power draw. For example. typical freeway cruising may require only 30% of the power required for accelerating onto a freeway or for passing. Maintaining steady freeway speed on a grade (e.g., in a climb mode) may require as much power as acceleration in highway operation.

If rechargeable batteries are subjected to high current draw above certain limits (often specified by the battery manufacturer) the battery performance and useful life of the battery will be degraded.

Therefore, it would be desirable to have an energy storage system that addresses the above problems, by allowing for high current/power demands without degrading the performance or useful life of the power source.

SUMMARY OF EMBODIMENTS

A system and method of adaptively managing fast-energy storage devices is described. Fast energy storage devices include power batteries, ultracapacitors, flywheels and superconductors. A novel and useful application of fast energy storage devices is the combination of an ultracapacitor and batteries in an electric vehicle, including Plug-in Hybrid Vehicles (PHEVs) and also Electric Vehicles (EVs) and Hybrid Electric Vehicles (HEVs). In some embodiments, the battery is utilized for operating the vehicle during cruise. The ultracapacitor is the fast energy storage that provides large bursts of power when required for acceleration, and the ultracapacitor may also absorb regenerated energy that can be supplied in lieu of mechanical braking of the vehicle. A desirable effect of this combination of energy storage devices is the reduced loading on the batteries, and the resulting longer battery life.

An improved power conversion system and method is described, using a fast energy storage device. A power converter/controller (PCC) converts and controls the flow of energy to and from the fast energy storage. A method of managing the fast energy storage device is described.

In the method, a load current drawn by a load is determined. An estimated battery current to be supplied from a battery to the load is estimated based on the load current. A transient current required from a fast energy storage to the load is determined based on the estimated battery current and the load current. Discharge of the transient current from the fast energy source to the load is controlled.

In some embodiments, the method is performed at a lift power controller converter in a lift mechanism. A lift mechanism includes a crane, a lifting platform, a jack, an elevator, etc In some embodiments, the method is performed at a universal power controller converter in a universal (uninterruptable) power supply.

In some embodiments the fast energy storage is recharged if the load current is below a predetermined level.

In some embodiments, a filtered value of the load current is determined and the filtered value is bounded to a bounded value between a first upper threshold value and second lower threshold value, and a maximum current drawn from the battery is limited to the bounded value.

In some embodiments, the maximum current drawn from the battery is limited to the first upper threshold value if the maximum current from the battery is above the first upper threshold value for a period of time. In some embodiments, the fast energy storage is recharged if the load current is below a predetermined level less than the second lower threshold value.

In some embodiments, at least one of the estimating, determining, or controlling occur at a power controller. In some embodiments, the method is performed at a universal power supply (UPS). In some embodiments, the method is performed at an at least partially electric vehicle. In some embodiments, the method is performed at a lift power controller converter in a lift mechanism.

In some embodiments, energy associated with the load current is measured at a sensor coupled to a powertrain of a vehicle. In some embodiments, a position of a throttle control is measured, wherein the throttle control is configured to increase or decrease load current to the load.

In some embodiments, the load current is a filtered current. In some embodiments, the filtered current is an average of load currents over a period of time. In some embodiments, a safe battery current is estimated that a battery can provide without damaging the battery.

In some embodiments, the transient current is a difference between the load current and the estimated battery current. In some embodiments, the load current is reduced when the fast energy storage reaches a minimum charge. In some embodiments, current drawn from the battery is limited to a maximum battery current level. In some embodiments, the maximum battery current level is varied in response to a temperature of the battery.

In some embodiments, upon reaching a low charge state of the fast energy storage, the transient current from the fast energy storage is gradually reduced to protect the fast energy storage from damage.

In some embodiments, a discharge command is sent to a power converter controller to manage a flow of electrical energy from the fast energy storage and the battery.

In some embodiments, the load current is analyzed and determination is made when a steady state has been reached. In some embodiments, the recharge current to be supplied to the fast energy storage by the battery is determined based on the steady state.

In some embodiments, a state of charge of the fast energy storage is monitored and the estimated recharge current to be supplied by the battery is gradually reduced to protect the fast energy storage from damage.

In some embodiments, a recharge command is sent to a power converter controller, wherein the power converter controller manages a flow of electrical energy between the fast energy storage and the battery.

In some embodiments, the load current is compared to a seek band, wherein the seek band specifies a range of load current in which the fast energy storage will be recharged.

In some embodiments, a determination is made if the load current is in a stopped steady state or in a cruising steady state.

In some embodiments, a recharge current is estimated to charge the fast energy storage to the maximum charge if the load current is in a stopped steady state. In some embodiments, a recharge current is estimated to charge the fast energy storage to below the maximum charge if the load current is in a cruising steady state.

In some embodiments, a determination is made whether the load current is in a stopped steady state or in a cruising steady state, and if the load current is in a stopped steady state the recharge current to charge the fast energy storage to the maximum charge is estimated, and if the load current is in a cruising steady state, the recharge current to charge the fast energy storage to below the maximum charge is estimated.

A method of adaptively controlling a load driven by a system that includes a battery and a fast energy storage described. A load current drawn by the load is determined. An estimated battery current is determined by filtering the load current. The estimated battery current is bounded to an upper first threshold value. The estimated battery current is bounded to a lower second threshold value.

In some embodiments, a maximum current drawn from the battery is limited to a first upper threshold value if the rate of change of the load current is above the upper first threshold value for a period of time.

In some embodiments, the fast energy storage is recharged if the load current is below the lower second threshold value.

In some embodiments, a transient current required from the fast energy storage to the load is determined based on the estimated battery current, and discharge of the transient current from the fast energy storage to the load is controlled.

A method of adaptively controlling power distribution in a system that includes a battery and a fast energy storage is described. A load current drawn by a load is determined. A fast energy storage (FES) is recharged if the load current is within a lower current limit. If the load current is above the lower current limit, a determination is made whether the vehicle is operating in a continuous draw mode or in an acceleration mode. A battery current limit is set based on the mode in which the vehicle is operating. Power in the system is distributed based on the battery current limit.

In some embodiments, the load is a motor. In some embodiments, the battery current limit is set to a continuous current limit.

In some embodiments, the load current is reduced when a fast energy storage reaches a lower limit, wherein the fast energy storage provides current to the load in parallel with a battery current. In some embodiments, the battery current limit is set to an adaptive high battery current limit greater than the adaptive continuous current limit.

In some embodiments, the adaptive high battery current limit is varied in an inverse direction to battery temperature. In some embodiments, in the acceleration mode power is provided to the load from the battery and from the fast energy storage.

In some embodiments, current is provided from a fast energy storage to the motor load at a rate sufficient to drain the fast energy storage to a lower limit by the time a target speed is achieved.

Systems and computer readable storage mediums describing these and other methods are also described.

Figure 1A:
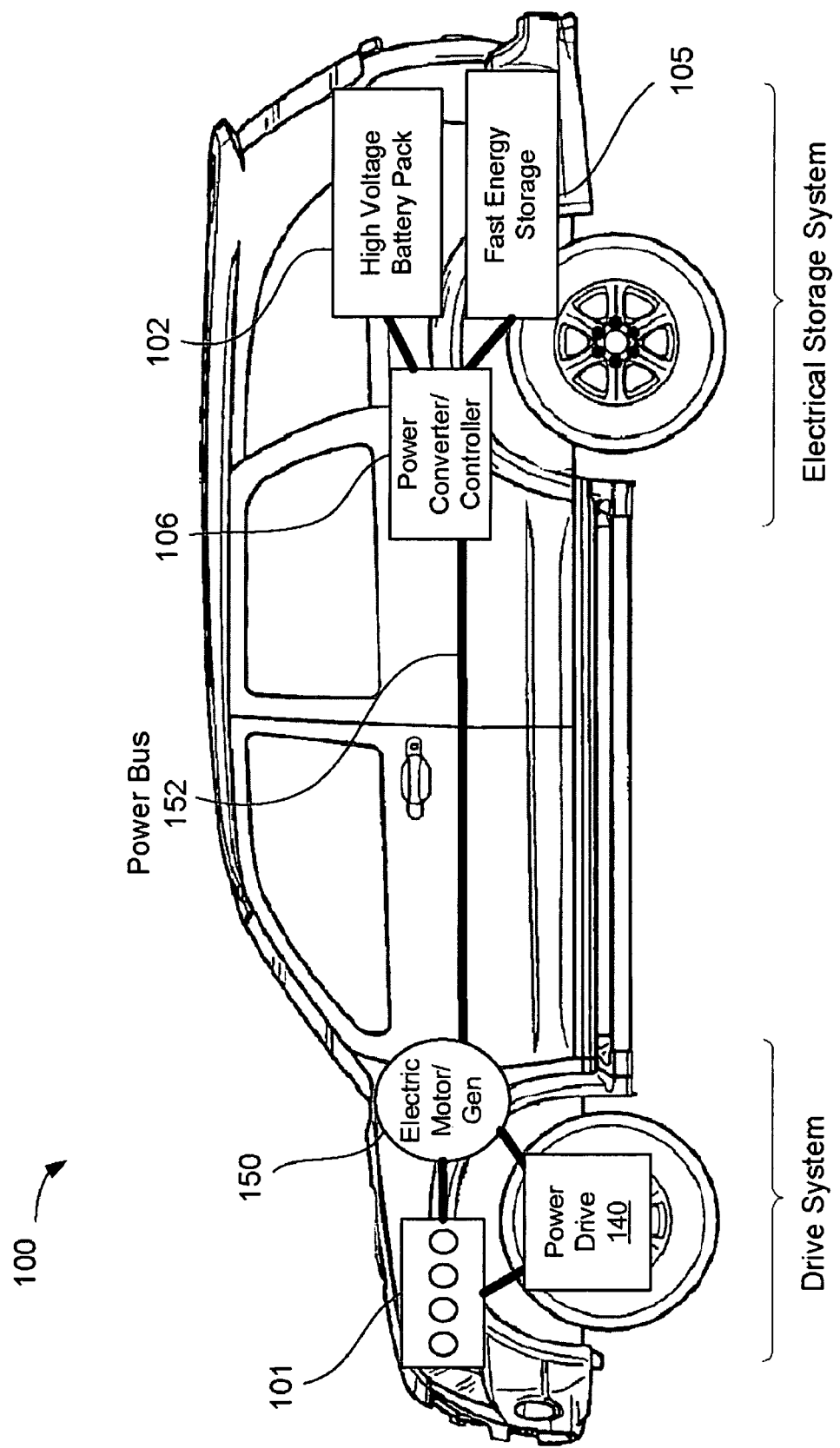
FIG. 1A illustrates a plug-in hybrid electric vehicle (PHEV), in accordance with some embodiments.

Further aspects of the invention will become apparent from consideration of the drawings and the ensuing description of the preferred embodiments of the invention. A person skilled in the art will realize that other embodiments of the invention are possible, and that the details of the invention can be modified in a number of respects, all without departing from the inventive concept. Thus, the following drawings and description are to be regarded as illustrative in nature and not restrictive.

DETAILED DESCRIPTION

Plug-in hybrid electric vehicles (PHEVs), also known as partial hybrid electric vehicles, are vehicles having a conventional (e.g., gasoline, diesel, compressed natural gas, ethanol, etc.) combustion engine, an electric motor, and a battery power source for powering the electric motor, and in some embodiments, for storing energy produced by regenerative braking. PHEV's have a sufficiently large battery power source to run on battery power alone for short trips, such as a typical commute distance.

An advantage of Plug-in Hybrid Vehicles (PHEVs) is the substitution of electricity for gasoline (or other hydrocarbon fuel), when powering the vehicle on short trips. A short trip may be considered as the typical daily commute for a typical driver, e.g., 40 miles (or approximately 60 kilometers). However, having a daily electric range of approximately 40 miles would displace gasoline entirely for many users.

In some embodiments, a PHEVs have a range greater than 40 miles.

A PHEV vehicle, according to some embodiments, includes a hybrid drivetrain with both a hybrid mode and an electric-only mode of operation. In some embodiments, the electric drivetrain is capable of full performance for daily operation, including operation at freeway speeds. To minimize cost (and weight and volume), in some embodiments the energy storage system in a PHEV is selected to provide a predefined electric range. In some embodiments, the energy storage system is selected to provide the predefined electric range plus a safety margin.

The combination of selecting an energy storage system for the specified (e.g., 40 mile) electric range and providing full performance in electric operation presents a challenge for the energy storage system. For example, for mixed urban/highway driving, a small car and larger car or crossover SUV may consume approximately 0.2 kWh/mi and 0.4 kWh/mi, respectively. In some embodiments, for these two vehicles, the energy required to travel 40 miles is approximately 8 kWh and 16 kWh, respectively. Electric-only vehicles may require even more energy.

For good all-around performance including accelerating, passing, overtaking, or towing, the motor power should be about 80 kW or greater for a small car and 150 kW or greater for a larger car/crossover SUV. The discharge rate ratio of power to required energy provides a "C" rating of the battery. For the representative energy consumption and power requirements here, the resulting discharge rate ratio is approximately C10.

The system and method for dual energy storage management described herein addresses the drawbacks associated with high current draw or demand, such as during acceleration, by combining FES or other fast energy storage devices with batteries. The FES provides power to supplement the battery during transient currents, such as during acceleration onto a freeway. A transient current is an excessive current, usually of short duration (e.g., <10 seconds). A FES is a capacitor capable of storing significant amounts of energy to supplement the battery during a transient period (e.g., when a transient current occurs), with a capacity that is usually measured in Farads. The added power from the FES protects the battery (by reducing or eliminating current drawn from the battery), thereby allowing the use of lighter, less expensive batteries, while providing full performance in electric mode.

While a capacitor or ultracapacitor is described herein for fast energy storage, one skilled in the art should appreciate that other fast energy storage, such as flywheels or high-power batteries, may also be used. Another way to address high current draw is to use the combustion engine to supplement the electric motor during high current demand. However, as one of PHEV's most important goals is to minimize consumption of gasoline, it is desirable to minimize the use of the combustion engine.

In some embodiments, the FES is sized to provide all of the energy necessary to accelerate the vehicle from a standstill to freeway speed. A FES sized for this function provides maximum protection of the battery, but adds potentially undesirable space, weight and cost to the vehicle. In some embodiments, the FES is sized to operate concurrently with the battery to limit current drawn from the battery to a level that will not damage the battery; this method yields a smaller and less expensive system than the aforementioned solution.

In some embodiments, the dual energy storage system does not completely deplete the FES when passing or climbing a hill. Doing so could render the vehicle unsafe (e.g., incapable of passing on a grade or of emergency maneuvering). In some embodiments, the dual energy storage system is able to differentiate between a transient (e.g., a throttle control or an acceleration command by the driver, such as depressing the gas pedal) and a high average power (e.g., the power required to maintain the vehicle at a given speed increases due to a hill or slope). In some embodiments, the dual energy system determines whether the vehicle is in an acceleration or a hill-climb mode by monitoring a load current associated with the motor.

FIG. 1A illustrates a plug-in hybrid electric vehicle system 100, in accordance with some embodiments. The vehicle comprises an internal combustion engine 101, an electric motor/generator 150, a power drive 140, a power bus 152 (corresponding to DC bus 104 in subsequent figures), a power converter controller 106, a high voltage battery pack 102, and a fast energy storage 105. The power bus 152 is coupled at least to the power converter controller 106 and the electric motor generator 150, and serves to conduct current between a power storage system (102, 105, 106) and a drive system (101, 150, 140). The power converter controller 106 controls the current carried by the bus 152, and controls the proportion of the bus current (i) from the battery pack 102, and (ii) from the fast energy storage 105.

In some embodiments, the combustion engine is coupled directly to the power drive 140. In some embodiments, the combustion engine is coupled to the electric motor 150, and the combustion engine mechanically drives the motor, to generate electricity.

In some embodiments, the combustion engine and electric motor may be used in parallel (e.g., in a performance mode), and the vehicle may be powered by both the combustion engine, and by the electric motor 150 supplied with current along the bus 152 from the high voltage battery pack 102 and/or fast energy storage 105. In some embodiments, the vehicle may be driven (e.g., in an electric only mode) by the electric motor 150 powered by the by high voltage battery pack 102 and/or fast energy storage 105. In some embodiments, the vehicle may be driven in a combustion engine only mode (like conventional non-electric vehicles). In some embodiments, the vehicle may be driven in a primarily combustion engine mode, with the electric motor/generator used to provide bursts of acceleration on demand and to capture energy from regenerative braking.

Figure 1B:
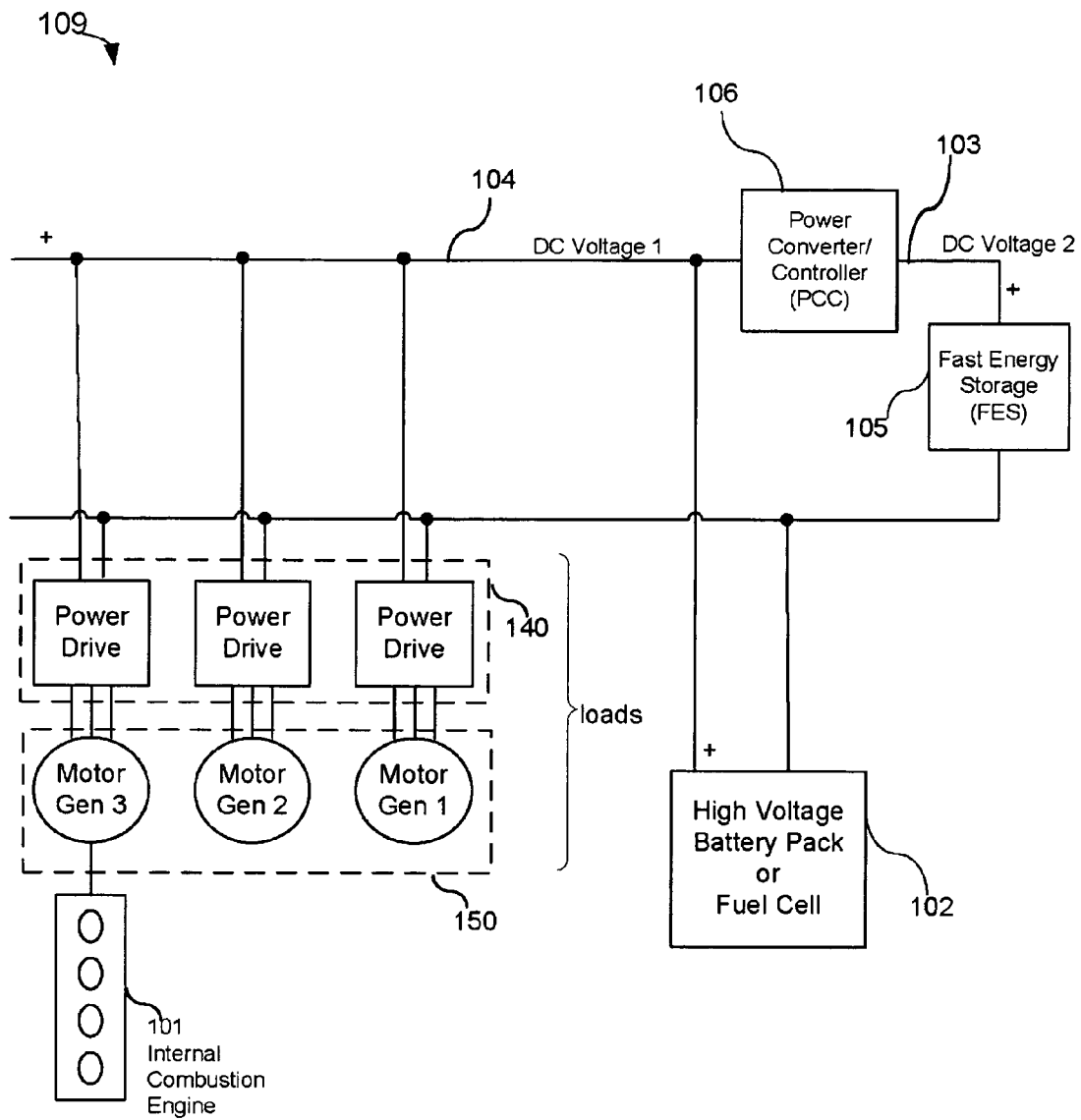
FIG. 1B is a schematic of a dual-energy system for an electric vehicle, in accordance with some embodiments.

FIG. 1B is a schematic of a dual-energy system 109, such as a hybrid electric vehicle, in accordance with some embodiments. The dual energy system can use any number of loads or energy sources 101 coupled to one or more DC buses 104. Applications include electric vehicles (EV) or hybrid vehicles (HEV, or plug-in PHEV) where both steady-state (e.g., continuous heavy power draw demand for climbing a hill) and transient (e.g., acceleration) power are required. For example, cranes, lifts, or construction equipment that use battery power and require bursts of power (transients) will benefit from the dual energy system described herein. Furthermore, industrial uninterruptible power supply (UPS) systems can also be enhanced with the dual energy system described herein to reduce the loading on the batteries when the system rapidly provides power in the event of a power failure.

The fast energy storage system includes: long-term energy storage such as a high voltage battery pack 102 (one or more electrical energy storage cells) or fuel cells, short-term fast energy storage 105 such as capacitors, ultracapacitors, power batteries and flywheels; and a power converter/controller (PCC) 106, a fast energy storage bus coupled between the fast energy storage 105 and the PCC 106, a DC bus 104 coupled between the PCC 106 and the battery pack 102.

The fast energy storage system further includes one or more power drives 140 coupled to the DC bus 104, one or more motor/generators 150 coupled to the power drive 140, and one or more internal combustion engines 101 coupled to one or more of the motor/generators 150 and/or to the power drives 140. The power drive 140 transfers mechanical power (e.g., from the engine 101 and/or from the electric motor 150) to wheels of the vehicle. In some embodiments, the power drive 140 also transfers mechanical power from the wheels to the electric motor 150 during regenerative braking. During normal drive operation, the power drive(s) 140 and motor/generator(s) 150 act as a load when they draw current from the battery 102 and/or the FES 105. During regenerative braking, the power drive 140 and motor/generator 150 comprise a source as they provide regenerated energy (from braking) to the DC bus 104.

The PCC 106 (Power Converter/Controller) includes an algorithm for managing the flow of energy between the fast energy storage bus 103 and the DC bus 104, during both normal drive operation and during regenerative braking. The PCC 106 uses mostly information that is available locally from the electrical system when managing this energy flow. In some embodiments, the PCC 106 includes power electronics and one or more processors (in some embodiments, a special purpose power converter processor) for managing a flow of electrical energy, and a controller that executes a strategy for power conversion.

In some embodiments, an independent fast energy storage system (e.g., PCC 106, bus 103 and fast energy storage 105) may be manufactured and provided as a means of improving existing applications that use a slow energy storage source (e.g., battery pack 102). In some embodiments, the fast energy storage system may be provided as an aftermarket kit to retrofit existing vehicles.

Figure 1C:
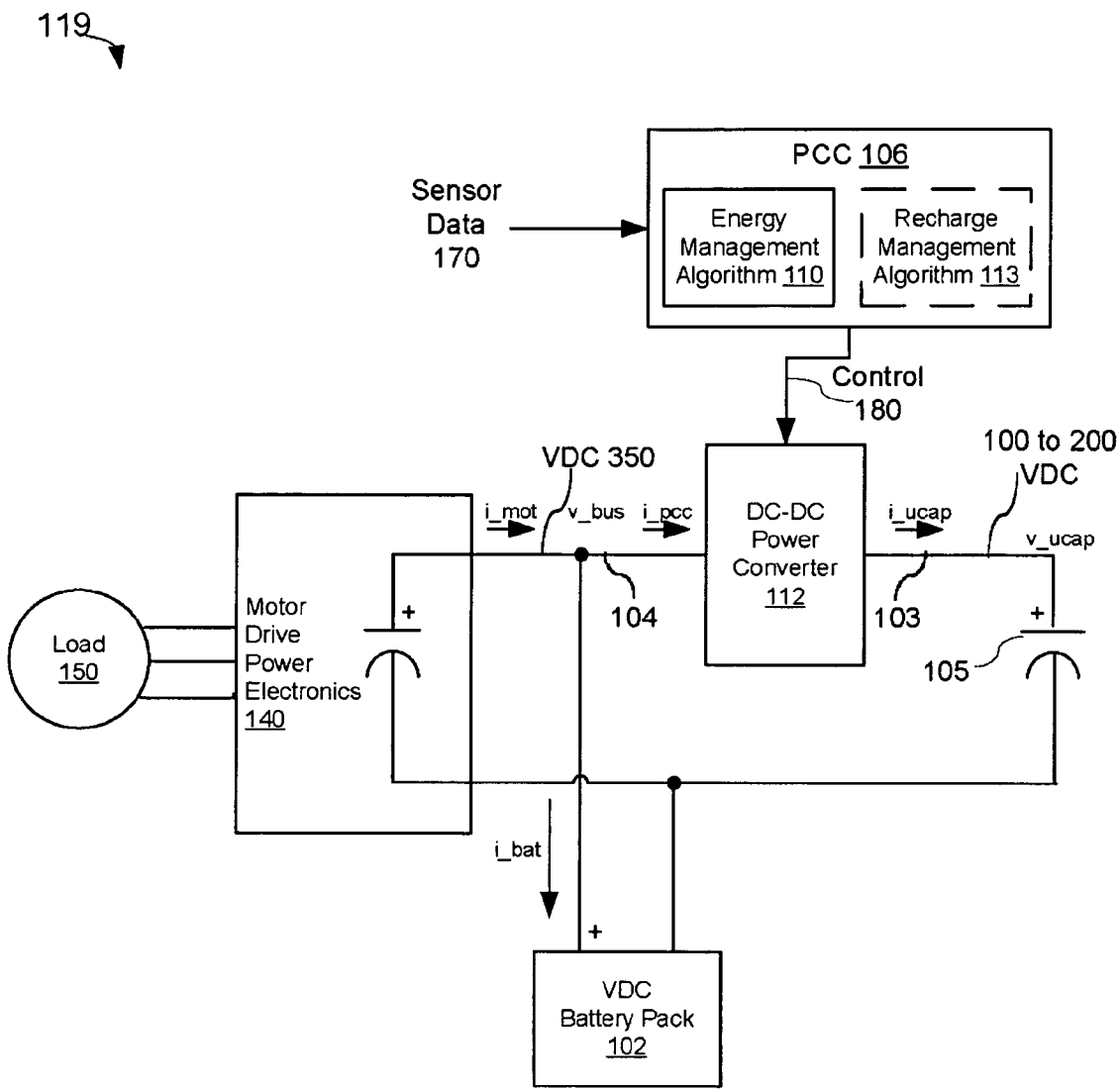
FIG. 1C is another schematic of a dual-energy storage system for an electric vehicle application including a power converter controller (PCC), in accordance with some embodiments.

FIG. 1C is another schematic of a dual-energy storage system 119 for an electric vehicle application including a power converter controller (PCC), in accordance with some embodiments. The dual-energy storage system comprises a PCC 106, including an energy management algorithm 110, a recharge management algorithm 113, a DC-DC power converter 112 coupled to the PCC 106, motor drive power electronics 140 coupled to the power converter 112 via a high voltage bus (e.g., approximately 350 Volts DC), a battery pack 102 coupled to the power converter 112, and a load 150 (e.g., the electric motor) is coupled to the motor drive power electronics 140.

The dual-energy storage system further comprises the fast energy bus 103 (e.g., approximately 100 to 200 Volts DC) and a fast energy storage system 105, such as a FES coupled to the DC-DC converter 112 over the low voltage bus. The operating voltage of the FES varies as it is charged and discharged.

In some embodiments of an electric vehicle (EV) application or other motor driven device, the PCC 106 (using energy management algorithm 110) manages power conversion of power between the high voltage bus and the low voltage bus to protect the battery 102. The PCC 106 receives sensor data 170, such as sensor data providing current, voltage, battery temperature, how far the pedal/throttle is depressed, and other pertinent information from the local electrical system.

The PCC 106 isolates (i.e., electrically separates using a DC-DC converter) the FES voltage v_ucap from the battery voltage v_bus, representing the voltage of the DC bus, usually the same as the battery terminal voltage. v_ucap is the estimated theoretical voltage of a FES. The PCC includes a DC-DC converter that isolates the voltages on the low voltage bus 103 from the high voltage bus 104, and provides power transfer between them as necessary.

The energy management algorithm 110 in the PCC controls the DC-DC power converter 112, to convert and transfer power between the FES 105 and the motor drive power electronics 140 according to a predefined strategy. Sensor data 170 may include electrical measurements of currents and voltages in the system. In a vehicle application, some data such as vehicle speed and accelerator position may also be used to optimize the performance of the algorithm based on vehicle conditions. A control signal 180 controls the DC-DC power converter to transfer power between the vehicle bus and the FES as computed by the energy-management algorithm. The recharge management algorithm 113 manages recharge of the FES 105. In some embodiments the recharge management algorithm 113 is separate from energy management algorithm 110. In some embodiments the recharge management algorithm 113 is part of energy management algorithm 110.

In some embodiments, the energy management algorithm 110 is implemented using one or more special purpose power processors at or associated with the PCC. In some embodiments, high-voltage switching circuitry is coupled to the one or more special purpose power processors for switching and converting high voltages associated with the fast energy storage bus 103 and the DC bus 104.

An advantage of the dual energy storage system of FIG. 1C is that it is easily tunable to use different types or sizes of fast energy storage by adjusting a filter parameter (typically a time-constant number). The algorithm is advantageous as it both protects the battery and permits a smaller (and thus cheaper) battery to be used. In some embodiments, the algorithm may be executed by the same one or more processors as the power converter controller 106. In some embodiments, the algorithm may be executed separately from the power converter controller.

Figure 2:
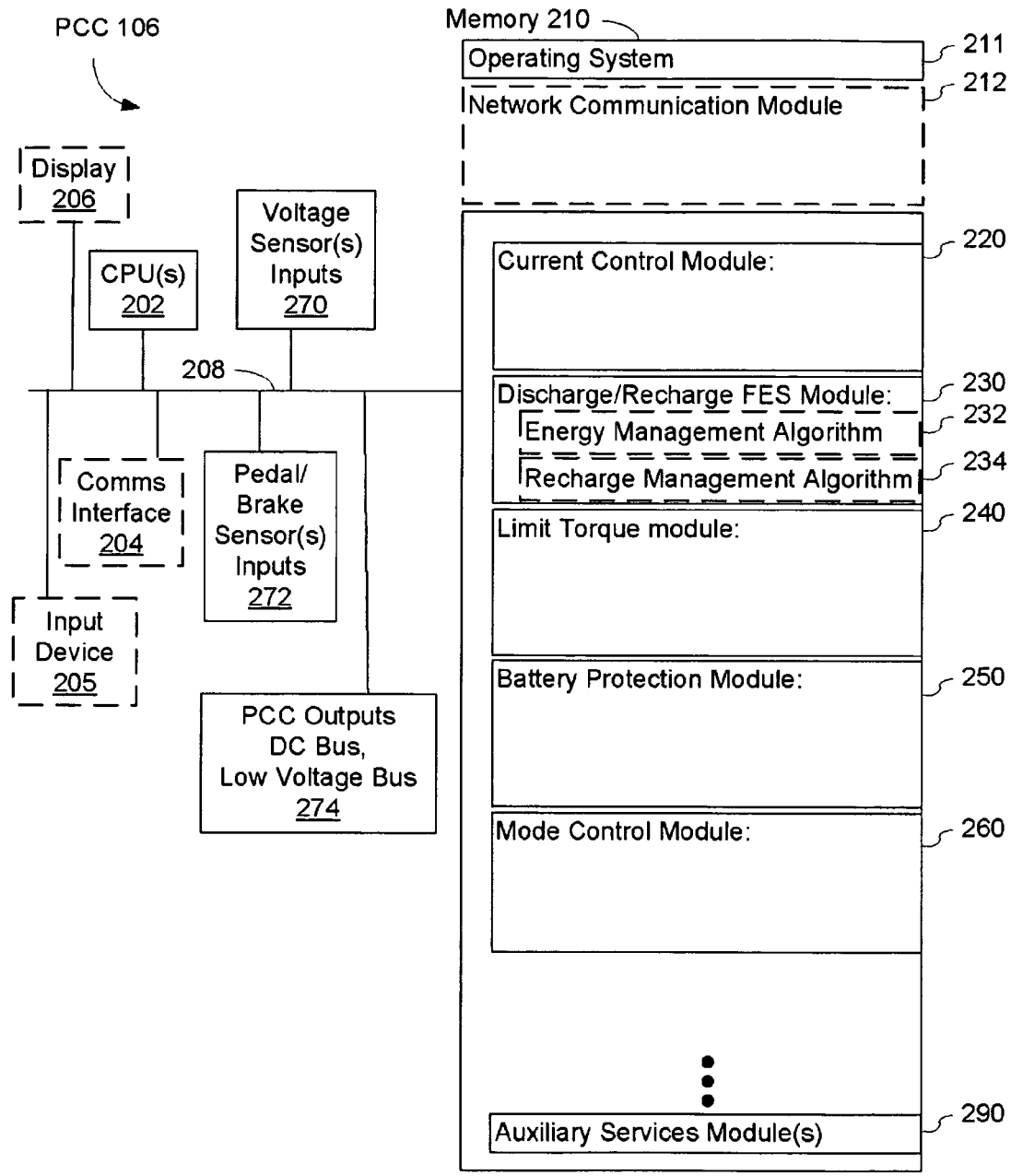
FIG. 2 is a block diagram illustrating a computer-implemented energy management system, in accordance with some embodiments.

FIG. 2 is a block diagram illustrating a computer-implemented energy management system, implemented as the PCC 106. In some embodiments, the PCC 106 is a dedicated (e.g., special purpose) automobile power controller computer, for controlling power distribution in an at least partial hybrid electric vehicle. In some embodiments, this computer is a dedicated universal power supply controller computer, for controlling operation of a universal power supply. In other embodiments, the PCC 106 is a general purpose computer.

The PCC 106 typically includes one or more processing units (CPU's) 202, optionally one or more network or other communications interfaces 204, memory 210, and one or more communication buses 208 for interconnecting these components. The PCC 106 optionally may be compatible with a user interface (e.g., so a mechanic or technician can access and communicate with the PCC) optionally comprising a display device 206 and a user input device 205 (e.g. control panel, keypad, keyboard, data port, etc.).

The PCC 106 typically receives one or more inputs 270 from voltage sensors, temperature sensors, current sensors etc., and one or more inputs 272 from pedal/throttle and brake sensors 272. The PCC 106 also typically comprises control outputs 274 to the DC bus 104, the low voltage bus 103, etc.

Figure 23:
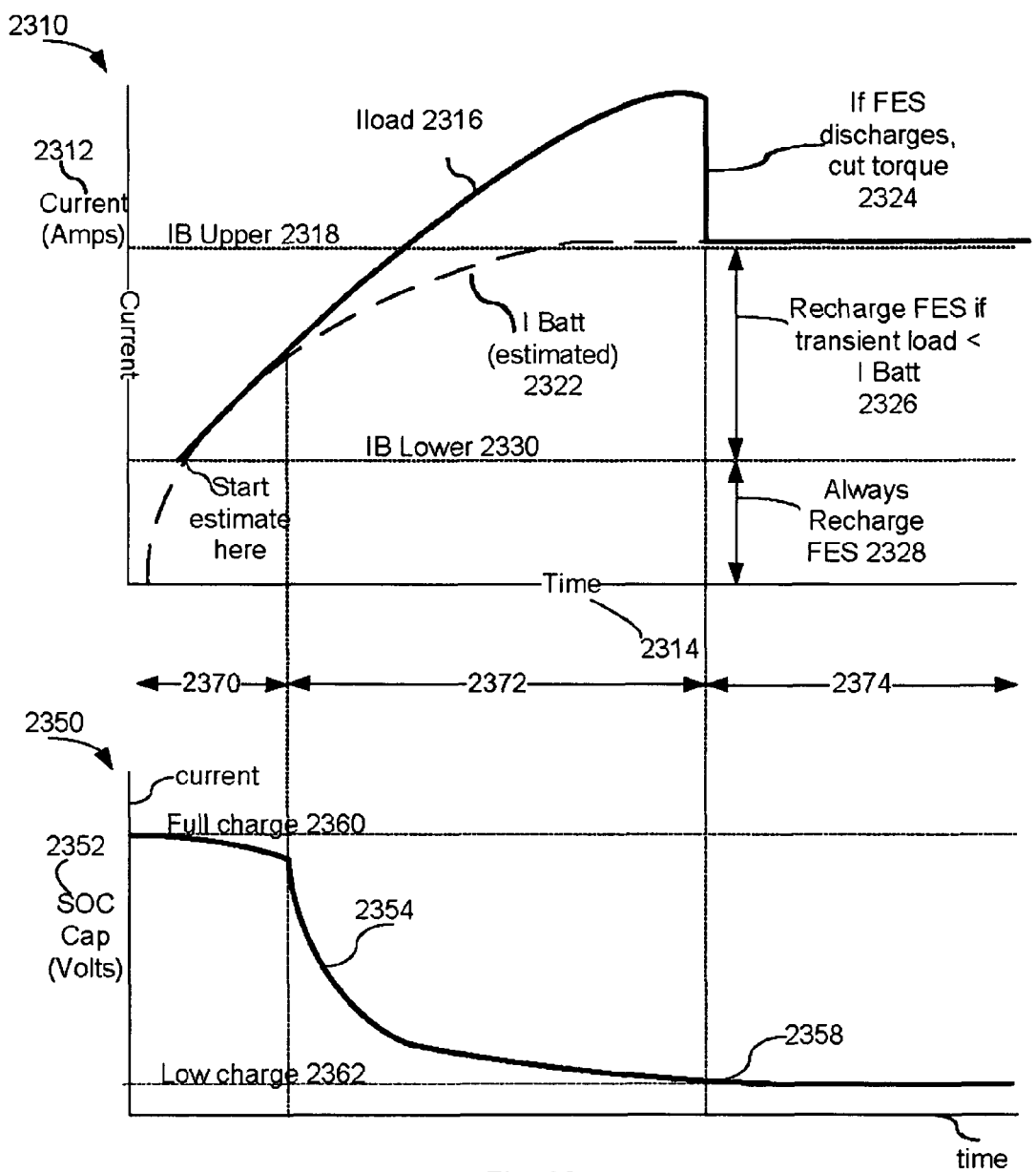
FIG. 23 are graphs of load current and FES voltage versus time showing adaptive charging of a fast energy storage, in accordance with other embodiments.

The memory 210 may comprise high speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 210 may optionally include one or more storage devices remotely located from the CPU(s) 202. The memory 210, or alternately a non-volatile memory device(s) within memory 210, may include a computer readable storage medium. In some embodiments, the memory 210 stores the following programs, modules and data structures, or a subset thereof:

- an operating system 211 that includes procedures for handling various basic system services and for performing hardware dependent tasks;
- a optional network communication module 212 that is used for connecting the PCC 106 to other computing devices via the one or more communication network interfaces 204 (wired or wireless) and one or more communication networks, such as the a wireless network, a WiFi network, a cellular phone network, the Internet, other wide area networks, local area networks, metropolitan area networks, and so on, which may be used for updating software in the PCC if a service patch is released, or to allow customization of the vehicle's performance;
- a current control module 220 that estimates, determines, and controls currents including a load current, a battery current, a transient current, and a recharge current. The load current is a current drawn by the load (e.g., power drive 140 and motor 105, FIG. 1B) from the battery 102 and/or FES 105. The battery current is a current supplied by the battery 102 to the DC bus 104 (FIG. 1). The transient current is a difference between a high load current drawn by the load during a period of acceleration, climbing, and/or towing, and a maximum safe battery current that may be drawn from the battery. The transient current is supplied by the PCC from the FES 105. The recharge current is a current supplied from the load during regenerative braking, and is used to recharge the battery 102 and/or the FES 105. In some embodiments, the FES is charged from the recharge current generated by regenerative braking. In some embodiments, the FES is charged from the battery.

a discharge/recharge fast energy storage module 230 that monitors charge of the FES device (e.g., ultracapacitor), and recharges it to full or recharges it to partially full, as described below in relation to FIGS. 4, 5, 6, and/or provides a snubber (rate of change limiter) function, as described below in relation to FIG. 7. In some embodiments, the discharge/recharge module 230 comprises an energy management algorithm 232 and a recharge management algorithm 234;

a limit torque module 240 that determines if a load current is higher than can be safely provided by a battery and FES together and in some embodiments a combustion engine, and reduces a load current by limiting torque to the load, e.g., by reducing power provided to wheels of a vehicle, as illustrated in FIG. 23 by label cut torque 2324;

a battery protection module 250 that monitors the temperature of a battery, adaptively adjusts high and low current limits, and/or monitors current, voltage and/or charge of a battery;

a mode control module 260 that controls operating modes of a load or other device, including controlling a recharge mode (both when stopped and cruising), a torque mode (e.g., when towing, laden, or climbing a hill), an acceleration mode (e.g., accelerate from a standstill), and a limit torque mode (e.g., when a fast energy storage is depleted); and an auxiliary services module 290 for providing auxiliary services including status, control, management, etc.

Each of the above identified modules may be stored in one or more of the previously mentioned memory devices, and includes a set of instructions for performing the functions described above. The above identified modules or programs (i.e., sets of instructions) need not be implemented as separate software programs, procedures or modules, and thus various subsets of these modules may be combined or otherwise re-arranged in various embodiments. In some embodiments, memory 210 may store a subset of the modules and data structures identified above. Furthermore, memory 210 may store additional modules and data structures not described above.

Although FIG. 2 shows a single system, it is intended as a functional description of the various features which may be present in one or more computers. In practice, and as recognized by those of ordinary skill in the art, items shown separately could be combined and some items could be separated. The actual number of computers used to implement a system and how features are allocated among them will vary from one implementation to another.

Figure 3:
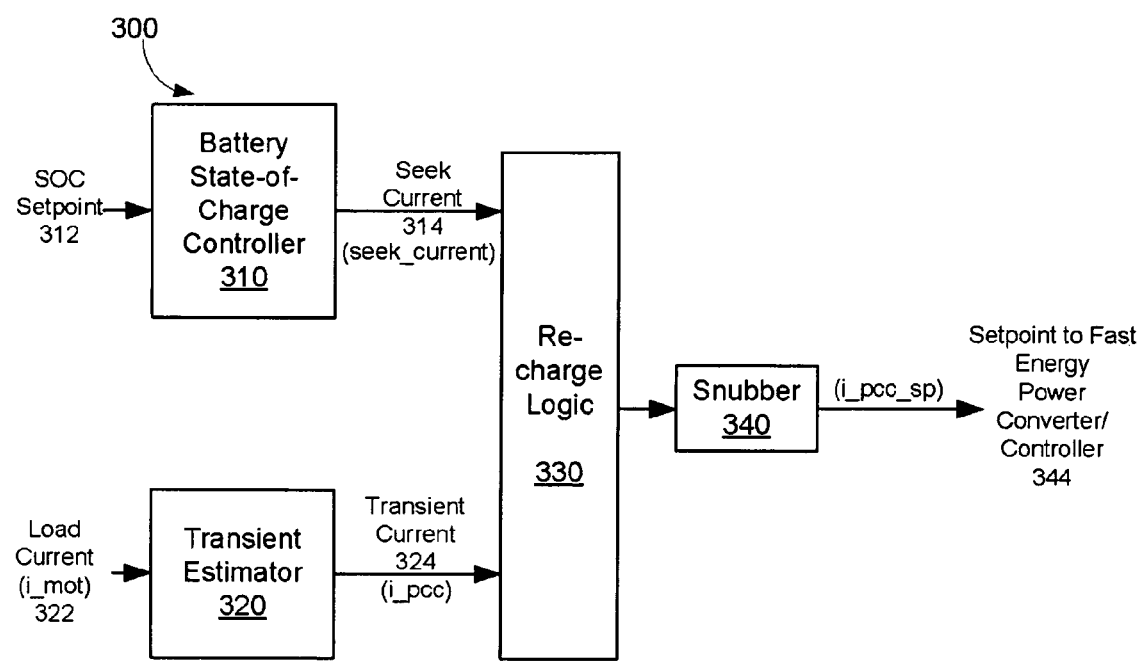
FIG. 3 is a circuit schematic of the energy management system of FIG. 1C, in accordance with some embodiments.

FIG. 3 illustrates 300 a circuit schematic of the power converter controller 106 implementing the energy management algorithm 110 of FIG. 1C, in accordance with some embodiments. The hardware (circuitry) and/or software system and algorithms (e.g., implemented at or associated with the PCC, as described) depicted in FIG. 3 comprises a State of Charge (SOC) controller 310, a Transient Estimator 320, Recharge Logic 330, and a Snubber 340. In some embodiments, the circuit of FIG. 300 corresponds to the current control module 220 of FIG. 2.

State of charge (SOC) control is used to recharge the FES so that it is available for the next transient demand for motor current in excess of the battery current limit. SOC control is enabled when the motor current falls below the low battery current limit. During charging, the SOC controller will draw current from either the battery or from the motor (during regenerative deceleration). The State of Charge (SOC) controller 310 receives a SOC setpoint input 312 and has an output 314 (seek current) coupled to the recharge logic 330.

In some embodiments, the SOC setpoint is coded into the control software and may be set to some value below 100% (e.g. 80%). In some embodiments, this number is fixed, but could be changed if the application called for a variation in the FES control strategy where, for example, a 50% setpoint might be used so that the FES is able to sink more energy.

The SOC represents a percentage of energy storage capacity. The transient estimator 320 receives a load current input 322 (measurement of load current from the motor) and has an output 324 (transient current) coupled to the recharge logic 330. The recharge logic has an output coupled to the snubber 340. The snubber has an output 344 (setpoint) coupled to the fast energy PCC 106.

The following description assumes a motor load where a FES 105 is used as the fast energy storage, and a battery is used for long-term energy storage. However, one skilled in the art will recognize that any other load or fast energy storage may be used.

The transient estimator 320 calculates a fast energy storage current during transient periods, e.g., acceleration, passing, overtaking, climbing a hill, and towing a load. The transient estimator determines the proportion of load current to be delivered from the battery 102 (slow energy source) and from the FES to the load (motor 150, coupled to power drive 140), using the PCC 106. The transient current (e.g., due to acceleration) is analyzed and separated from the steady current (e.g., due to a hill climb), and the transient current estimates become the setpoint to the PCC 106. This may be done by determining the rate of change of load current, i.e., high rate of change corresponds to acceleration, or a general high load current corresponds to towing a load or climbing a hill.

The PCC then causes the transient current to be supplied by the FES 105 to the load (motor) 150, thus limiting the current drawn from the battery 102 and thereby protecting the battery from excessive current. In some embodiments, this battery protection function is implemented by a battery protection module 250 of FIG. 2.

In cases where the load current is steady (e.g., when there is no acceleration), there is no effective transient current (i_pcc) to send to the load 150. This presents an opportunity to recharge the FES to a suitable state-of-charge (SOC); this recharging is performed by the SOC Controller 310.

The SOC controller 310 recharges the fast energy storage (FES) during periods when the load current is steady, i.e., no transient current. The SOC controller is responsible for restoring the FES charge level to a desired setpoint (SOC setpoint, e.g., 85% charge). In the short term, the charge in the FES may vary considerably from the SOC setpoint, especially as the demand of the vehicle changes. The SOC controller takes advantage of steady-state conditions to restore the SOC of the FES to the desired SOC setpoint. The term 'state' may be used to mean 'setpoint', as both refer to a state of charge value (absolute, or relative).

Figure 4A:
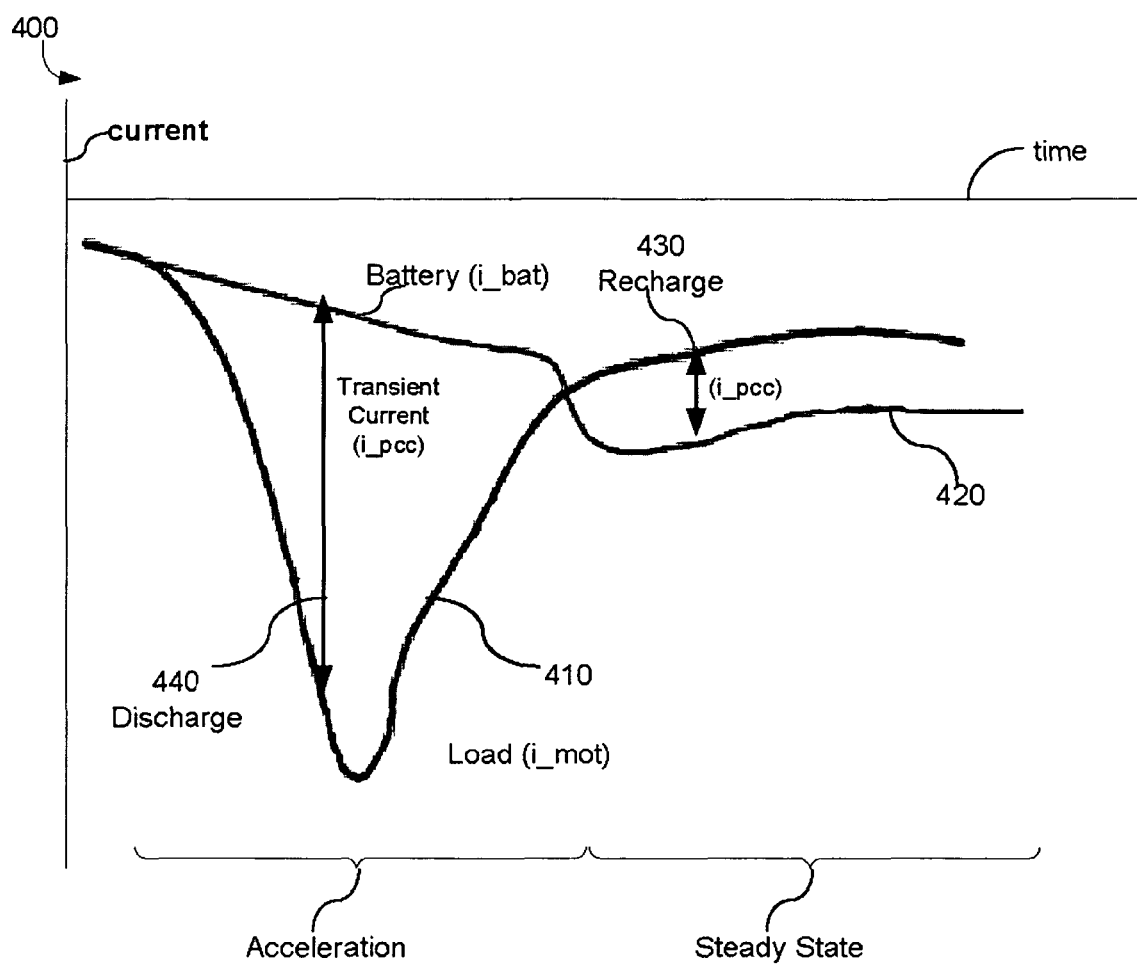
FIG. 4A is a graph of load and battery current versus time, in accordance with some embodiments.
Figure 4B:
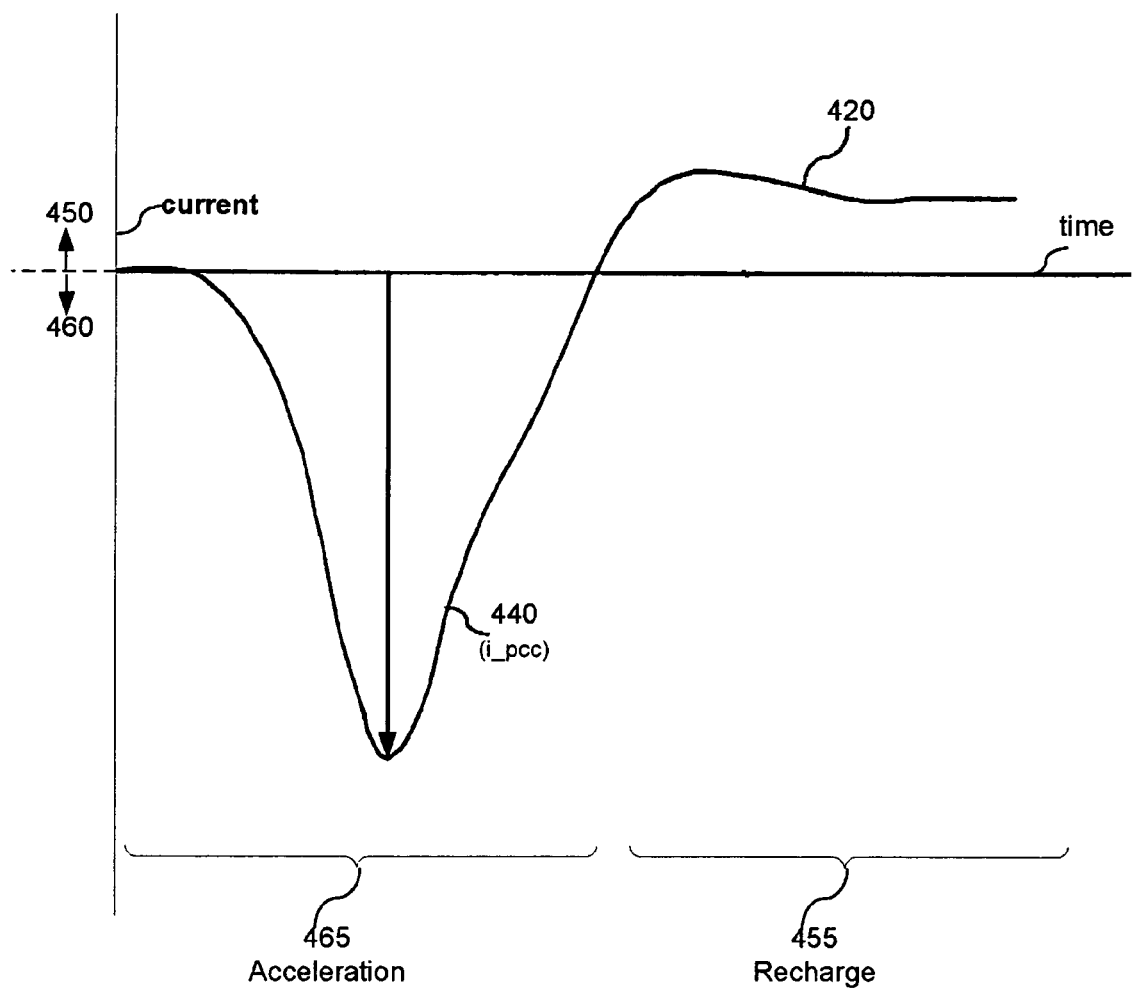
FIG. 4B is a graph that shows the current response of the fast energy storage system versus time, in accordance with some embodiments.
Figure 6:
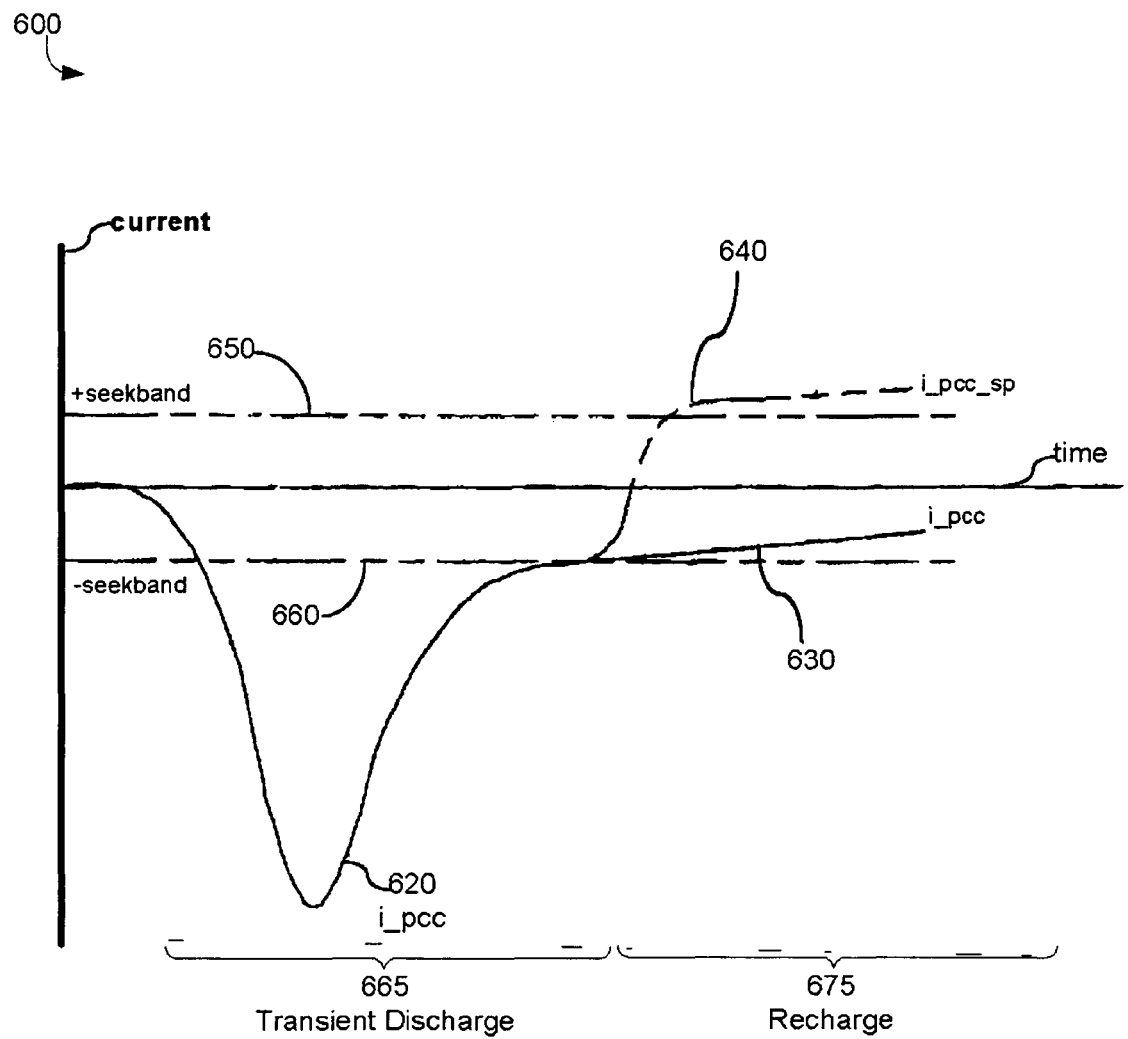
FIG. 6 is a graph of current through the power converter controller of FIG. 1C versus time, showing how a seek band is used to recharge the fast-energy storage, in accordance with some embodiments.

Recharge Logic 330 comprises logic (implemented as hardware and/or software including recharge management algorithm 234 of FIG. 2, the output of which is illustrated in the graphs of FIG. 4B and FIG. 6) for determining whether or not to recharge the FES 105 via the SOC Controller 310. The Recharge Logic 330 block determines when the system is in a steady-state (i.e., no transient current) and then utilizes the output of the SOC Controller 310 with the Transient Estimator 320, which is sent to the snubber 340. In some embodiments, the SOC controller output is summed with the Transient Estimator output.

The snubber 340 prevents over-charging or over-discharging of the fast energy storage. The snubber 340 represents a calculation (performed by hardware, software, or a combination thereof) that maintains the fast energy storage within operating limits. A Snubber 340 calculation (illustrated by the sloped sides 712 and 714 of the graph of FIG. 7) gradually reduces the current commanded to the PCC as either a full or empty limit of the FES is approached. The snubber thus keeps the fast energy storage within its operating limits. A final output to the PCC 106 is computed after a snubber 340 calculation is performed. In some embodiments, a snubbing operation is performed at a range from the full limit or the empty limit, e.g., within 5%, within 10%, within 15%, within 20%, within 25% of the limit value.

As discussed in the following graphs (e.g., FIG. 4A, FIG. 4B, FIG. 6), the motor, bus, battery and FES current are shown and described as having negative values when drawing current from the power sources and positive values when sending current to the power sources during regenerative deceleration. Throughout the text, a "high battery current" refers to a battery current with a larger value than a "low battery current," i.e., "high" and "low" are relative to one another.

FIG. 4A are superimposed graphs 400 of load current (i.e., current drawn by the load) and battery current (i.e., current drawn by the battery) versus time, in accordance with some embodiments. FIG. 4A illustrates how the transient current (i_pcc) is related to the load and battery currents. FIG. 4A shows the load current (i_mot) 410, and the current supplied by the battery (i_bat) 420, current into the battery terminals. The motor current is measured at the DC bus. Negative current delivers power to the motor. Positive current provides regenerated energy from the motor/generator onto the DC bus.

The difference between i_mot 410 and i_bat 420 represents the transient current to be supplied by the FES, i_pcc 440, and corresponds to acceleration conditions. The i_pcc is the current flow into the power converter/controller (PCC) electronics (charges the fast energy storage), and is also described as the "transient current".

The recharge zone 430 is where the FES recharge module (FIGS. 2,3) is actively restoring the transient current to the FES to charge it, and corresponds to a steady state conditions. In some embodiments, the FES is recharged by the battery. In some embodiments, the FES is recharged by current from the generator (e.g., during regenerative braking) that is coupled to the battery. In some embodiments, the battery protection module 250 (FIG. 2) limits change in the battery current, thus protecting the battery.

FIG. 4B is a graph that shows the transient current 106 to/from of the fast energy storage system versus time, in accordance with some embodiments, i.e., this Figure provides a more detailed view of the transient current (i_pcc) 440 of FIG. 4A. The discharge of the FES is shown as a negative current (i.e., anything below the X-axis as shown by reference numeral 460 is a negative current) and the recharging 420 is shown as a positive current (i.e., anything above the X-axis as shown by reference numeral 450 is a positive current). It is also possible (e.g., during regenerative braking) for the FES to charge from energy regenerated from the generator. In this situation, either the SOC Controller 310 or Transient Estimator 320 computes a positive current that can fully charge the FES.

During acceleration conditions, the transient current (i_pcc) 440 is negative, indicating that current is drawn from the fast energy storage 105. During recharge conditions 455, the transient current 420 is positive 420, indicating that current 420 is positive, indicating that current supplied by the PCC 106 to the fast energy storage 105.

Figure 5:
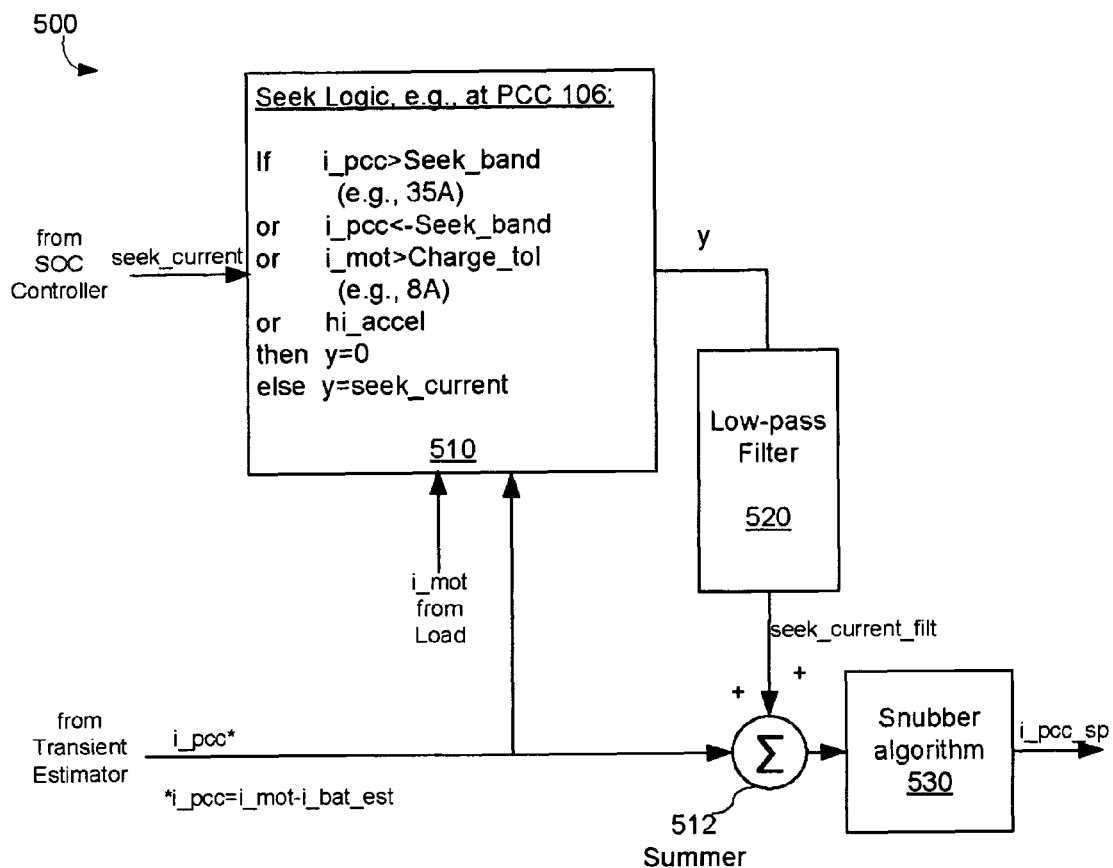
FIG. 5 is a block diagram showing a schematic representation of a circuit to recharge the fast energy storage, in accordance with some embodiments.

FIG. 5 is a block diagram showing a schematic representation of a circuit to recharge the fast energy storage, in accordance with some embodiments. In some embodiments, FIG. 5 corresponds to recharge management algorithm 234 of FIG. 2. FIG. 6 is a graph of current through the PCC 106 of FIG. 1C, showing how a seek band is used to recharge the fast-energy storage. A seek band is a band (typically centered about 0 Amps) that applies to the computed transient current i_pcc; when i_pcc is within this band, recharging of the fast energy storage may occur. For clarity, FIG. 6 is described first.

In some embodiments, if the transient current i_pcc is within the seek bands, the seek current is added to the transient current being drawn from the battery, and this total current is sent to recharge the FES In other embodiments, the output sent to recharge the FES is selected to be either the seek current or the transient current. If the transient current i_pcc is within the seek bands, only the seek current is sent to recharge the FES, otherwise the transient current is sent to the FES.

FIG. 6 illustrates a graph of transient or recharge current through the PCC 106 (of FIG. 1C) versus time, showing how a seek band is used to recharge the fast energy storage, in accordance with some embodiments. Referring to FIG. 6, a seek band 610 is defined, 2 having a positive seek band 650 and a negative seek band 660. When the computed transient current i_pcc 620, falls between the positive and negative seekbands (e.g., at point 630 at the end of a transient discharge) at the end of a transient discharge, the vehicle is considered to be operating in a steady-state condition, i.e., no large transient current required from the FES. During a transient discharge phase 665, the transient current 620 is outside the seekband and no recharging occurs. During a recharge phase 675, the transient current is within (630) the seekband and recharging occurs, as shown by the transient current setpoint 640 (i_pcc_sp), originating from seek logic block 510 of FIG. 5 (described below). The filtered seek current output from the low-pass filter 520 of FIG. 5 is added to the transient current i_pcc to create a positive transient current setpoint 640, causing the fast energy storage to recharge.

In some embodiments, the circuit of FIG. 5 comprises seek logic 510 (corresponding to recharge management algorithm 234 of FIG. 2), that receives a seek current input from the SOC controller, receiving a load current input i_mot from the load, and that receives a transient current (i_pcc) from the transient estimator. Seek logic 510 has an output coupled to a low-pass filter 520. The low-pass filter 520 has an filtered seek current output coupled to a summer 512. The summed output from summer 512 is coupled to a snubber algorithm 530. The snubber algorithm has an output that is a setpoint for the PCC current (i_pcc_sp), generated by an energy management algorithm, in some embodiments implemented on a special purpose power converter processor.

In some embodiments, seek logic 510 prevents recharging where i_pcc falls outside the seek band 620, where the electric motor is regenerating energy, or where the driver has put the accelerator pedal at "full throttle", i.e., signal hi_accel is active.

The recharge logic is described with reference to FIGS. 5 and 6. The function of the recharge logic 303 (FIG. 3) is to determine when to recharge the FES 105 (FIG. 1) from the batteries (using the SOC controller 310, FIG. 3), or other long-term energy source. Logic 510 will pass the recharge signal from the SOC Controller (seek_current) to then begin recharging the FES; the actual recharge current to the PCC is i_pcc_sp 640. The seek_current is a current command calculated by the state-of-charge (SOC) controller that seeks to recharge the fast energy storage to a specific charge level.

The lowpass filter 520 prevents a harsh step transition from the SOC Controller to the PCC. This is normally a fast filter that ramps the recharge signal seek_current_filt whenever a change in the logic 520 occurs, thus avoiding a step change. The lowpass filter 520 is a filter designed to transmit electromagnetic frequencies below a certain value, while excluding those of a higher frequency; the design of the filter may be simple or complex.

Summer 512 sums the filtered seek current and the PCC current from the transient estimator, and provides a summed output.

Snubber logic 530 is applied before actually sending a signal to the power converter/controller (PCC). Based on the output from summer (including the filtered seek current) the snubber algorithm controls current 710 (FIG. 7) from/to the PCC, i_pcc_sp, and ramps it down (712, 714, FIG. 7) as either a full (e.g., 100%), or empty (e.g., 25%) SOC is attained, thus avoiding over or under-charging the FES. In some embodiments, this ramping is linear.

In some embodiments, the snubber prevents having to suddenly switch off very high currents at the capacitor extremes, thus avoiding a transient to the power electronics. In some embodiments, the low pass filter 520 prevents suddenly applying a high recharge current to the power electronics also avoiding the transient and possible reduction in life of the power electronics.

Figure 7:
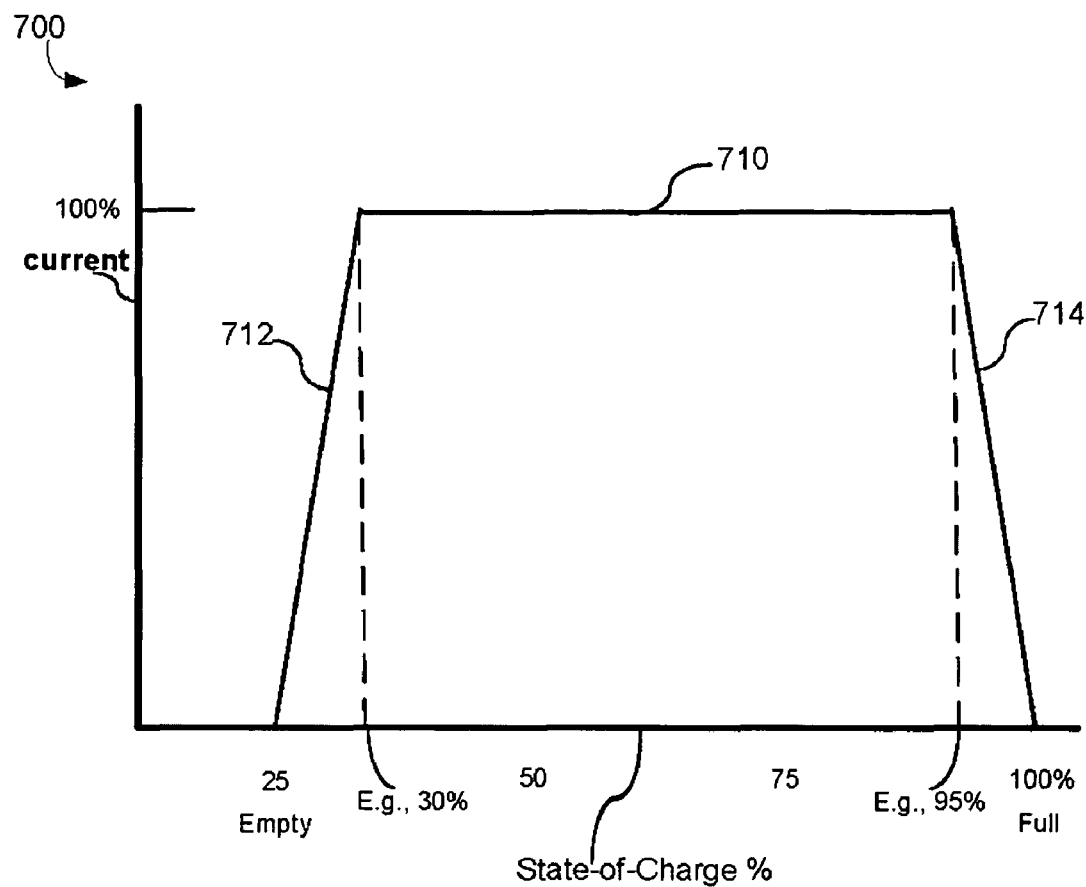
FIG. 7 is a graph of percentage of full current supplied versus a state of charge of a fast energy storage device (e.g., an ultracapacitor), depicting a snubber action that protects the fast-energy storage device from being over-charged, or over-depleted, in accordance with some embodiments.

FIG. 7 is a graph showing a percentage of full current supplied to the FES versus a state of charge of the fast energy storage, and depicting a snubber action that protects the fast-energy storage device from being over-charged, or over-depleted, in accordance with some embodiments. The snubber is a rate of change limiter.

Full current means a maximum current that is applied to the fast energy storage to recharge it, across a range of range of charge level (percentage). In some embodiments, the full current can vary across the range of charge. In some embodiments, the full current can vary in response to temperature, age of the fast energy storage, number of charge/discharge cycles of the fast energy storage, etc. In some embodiments, the snubber function shown in FIG. 7 corresponds to discharge/recharge FES module 230, of FIG. 2.

FIG. 7 graphically illustrates a method of performing this function. In the relatively high 714 and/or relatively low 712 bands, the current flowing into the FES 105 is reduced to limit the rate of change of the current when a high level or low level is reached. For example, if the FES is charged at full current level (e.g., 100% current) until the FES is 100% full, the charge current will turn off from full (100%) to zero (0%) rapidly. This fast change in current may harm the FES over time, so it is desirable to prevent the fast change using the snubber action.

As the FES charge 710 reaches a relatively high (e.g., 95%) state of charge (SOC), the current is reduced 714 until no current is passed by the snubber 530 at 100% SOC. A snubbing action is also employed from a relatively low (e.g., 30% to 25%) state of charge (SOC), where the current is reduced 712 until no current is passed by the snubber at a low level (e.g., where empty is defined as 25% of charge left in the FES). In some embodiments, wider or narrower snubber bands could be used, depending on a particular application.

Figure 8:
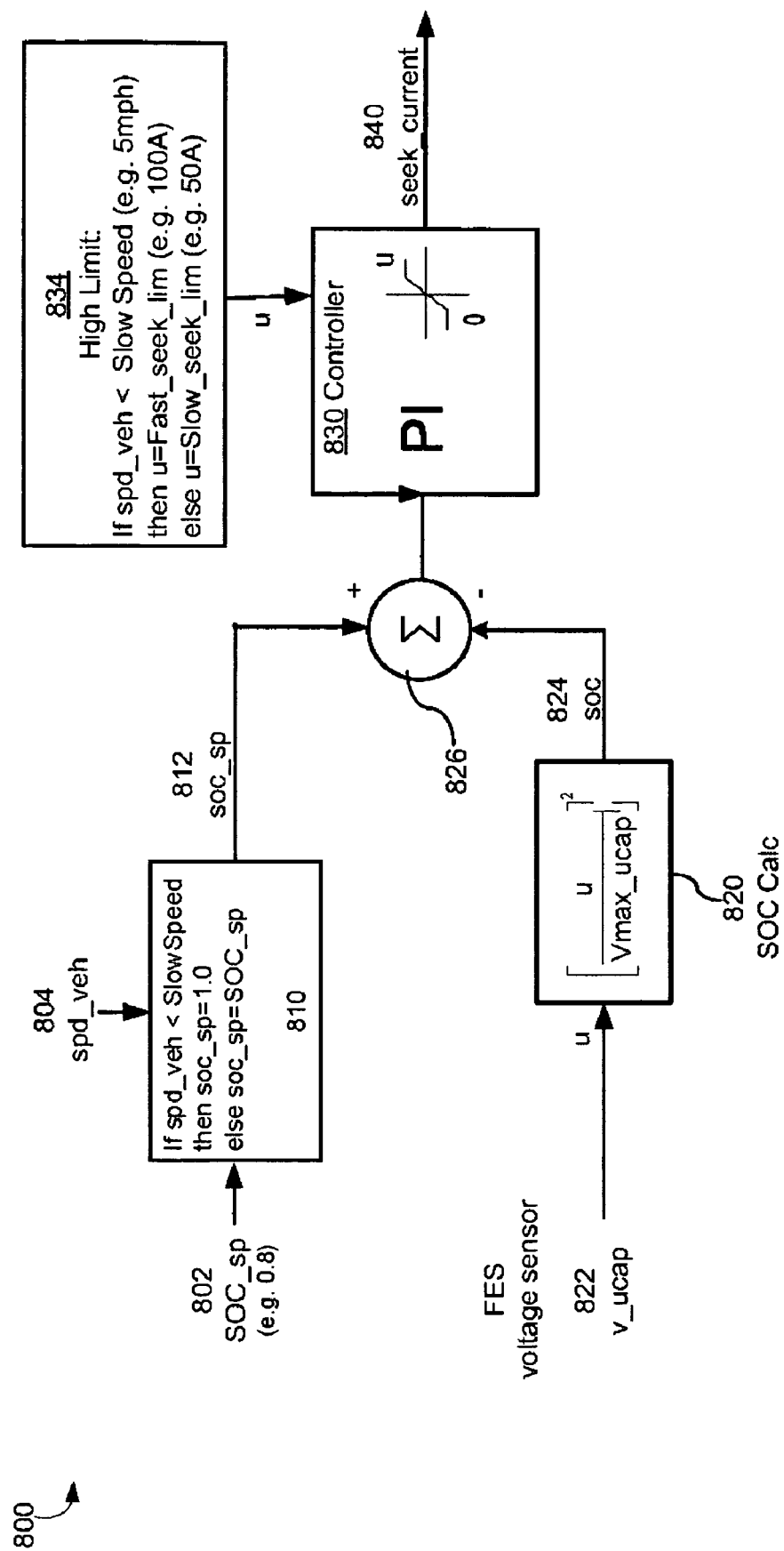
FIG. 8 is an example of a closed-loop regulator circuit for recharging a fast energy storage (e.g., an ultracapacitor) in a vehicle application, in accordance with some embodiments.

FIG. 8 is an example of a closed-loop regulator circuit 800 for recharging a FES in a vehicle application, in accordance with some embodiments. In some embodiments, the functions of FIG. 8 correspond to discharge/recharge FES module 230, of FIG. 2.

The regulator circuit comprises an SOC setpoint logic 810, which receives a fixed SOC setpoint input 802 (e.g., 0.8, or 80%), and a vehicle speed input 804. SOC setpoint logic 810 has a regulated SOC setpoint output 812, which is coupled to a summer 826. The SOC setpoint input 802 corresponds to the charge level of the FES. The SOC setpoint output 812 corresponds to the desired charge level of the FES, taking into account the current speed of the vehicle (spd_veh) 804, determined from a sensor, e.g., on the power-train, axle, or wheels.

The regulator circuit further comprises an SOC calculator 820, which receives a fast energy storage voltage (v_ucap from a FES voltage sensor). The SOC calculator 820 has an estimated SOC output 824, which is coupled to the summer 826. A summed output from the summer 826 is coupled to an integrator block 830. The integrator block 830 receives a high limit signal from a high limit block 834. The integrator block 830 outputs an integrated seek current 840.

The regulator 800 is used to restore the charge on the FES during steady-state operation. In some embodiments, this regulator is of a closed-loop system, and functions to restore the measured SOC of the FES to a fixed setpoint value. Other types of closed-loop controllers may accomplish a similar result; in the vehicle example of FIG. 8, a SOC regulator algorithm is employed using classical proportional-integral (PI) control techniques. In other embodiments, a lookup table, or another suitable control algorithm could be used.

The State-of-Charge setpoint logic 810 compares the fixed setpoint 802 (soc_sp) to the measured SOC of the FES (soc). The circuit 810 forces the SOC setpoint to or close to 100% if the vehicle speed is low, this ensures that the vehicle starts off with a full FES charge; otherwise the setpoint is a value less than 100% (e.g. 80%), allowing some margin for regenerative braking.

The SOC calculator 820 estimates the FES SOC from the measured terminal voltage, v_ucap. In some embodiments v_ucap is the estimated theoretical voltage of the capacitor (i.e. the terminal voltage corrected for the voltage drop), and outputs it as an estimated SOC output 824. In some embodiments the terminal voltage alone is used since the SOC becomes more accurate whenever the SOC target is reached, or at the end of a discharge (where current is zero). Value Vmax_ucap represents the maximum voltage (and corresponding charge) the FES (e.g., ultracapacitor) can safely store.

The summer 826 sums the output of SOC setpoint logic 810, and of SOC calculator logic 820. The summed output (which represents the difference between the calculated SOC 824, and the target SOC 812) is coupled to controller block 830.

Controller block 830 applies proportional and integral gains and tunes them to restore the FES charge in a stable manner. The recharge current is limited to a maximum charge current defined by either Fast_Seek_lim or Slow_Seek_lim, received from the high limit block 834. The Fast_Seek_lim is used to quickly charge the FES when the vehicle is at a slow speed or stopped. In one embodiment, the controller will charge the FES and not discharge it; for this reason, the lower limit of zero is employed in the high limit block 834.

The high limit block 834 determines whether to charge the FES quickly (e.g., Fast_seek_lim, to recharge the vehicle so it can take off from a stop light), or slowly (e.g., Slow_seek_lim)

Figure 9A:
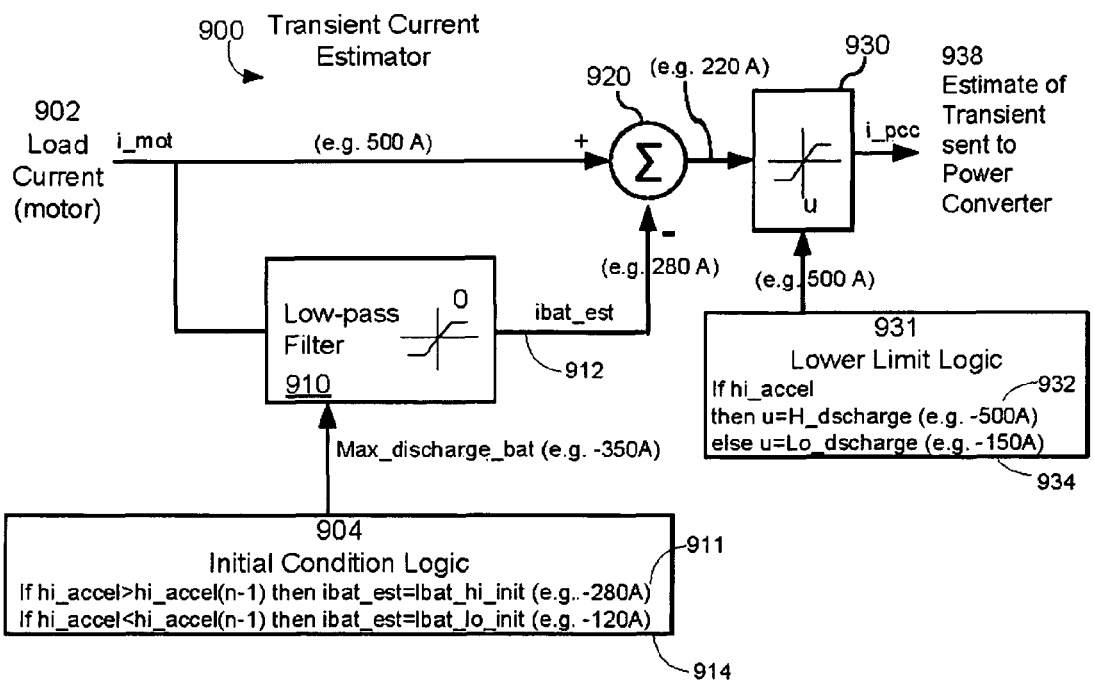
FIG. 9A is an example of a current estimator circuit for calculating the transient current that is to be supplied or absorbed by the fast energy storage, in accordance with some embodiments.

FIG. 9A is an example of a transient current estimator circuit 900 (e.g., found in PCC 106, FIG. 1) for calculating the transient current that is to be supplied or absorbed by the fast energy storage, in accordance with some embodiments. In some embodiments, the transient current estimator circuit 900 corresponds to current estimator 320 of FIG. 3.

The current estimator circuit comprises a low-pass filter 910, that receives a load current (i_mot) 902 input drawn by the motor, and an initial condition logic 904 input. The battery current estimator 910 generates an estimated battery current (ibat_est) 912 output, which is sent to a summer 920. The summer also receives as an input the load current 902. The summer outputs the difference between the load current and the estimated battery current, and this difference is coupled to an integrator 930. The integrator is coupled to and receives an input from lower limit logic 931. The integrator outputs an estimated transient and this is sent to the PCC 106.

In some embodiments, the battery current estimator 910, summer 920 and integrator 930 are implemented at the PCC 106, using hardware and/or software. In some embodiments these functions are implemented as part of current control module 220 of FIG. 2

The battery current estimator 910 monitors the motor current (i_mot) and computes a filtered version (using a low-pass filter) of this current. The lowpass filter calculates a smoother current profile that contains fewer transients than the motor current and is thus more suitable for delivery from a battery (or fuel cell), The output of the battery current estimator 910 is indicated as the estimated battery current i_bat_est. This is an estimation of the desired battery current as computed by the energy management algorithm. The lowpass filter may comprise a simple filter (e.g., a single-pole filter with a single time-constant), or it may comprise a more complex type of filter, depending on the application.

The filter 910 has an associated time constant, and the FES operation is affected by adjusting this value. A filter with a large time-constant (lower cut-off frequency) results in smoother battery current estimates and higher transient currents. This requires more FES capacity to supply the transient currents due to a slower reaction time of the filter. A filter with a small time-constant (higher cut-off frequency) requires less capacity but would result in more rapid battery current changes. For a given FES size, it is possible to tune the algorithm (by adjusting the filter cutoff frequency) to fully utilize the FES for most situations, as should be appreciated to those of skill in the art.

The initial condition logic determines the rate at which the vehicle is accelerating, and sets the battery current limit accordingly. If the present acceleration rate is higher than the previous acceleration rate (911) then the battery current limit is set to a higher level (e.g., −280 Amps). If the present acceleration rate is lower than a previous acceleration rate (914) then the battery current limit is set to a lower level (e.g., −120 Amps).

In some embodiments, limits are applied after the lowpass filter 910 to limit the range of the battery current. The lower limit logic 931 determines whether the FES 106 will discharge energy at a high rate 932 (e.g., −500 Amps) or a low rate 934 (e.g., −150 Amps). The high rate may be used to provide a burst of power (e.g., during acceleration), and the low rate may be used to provide assistance over a longer time period (e.g., when climbing a hill).

The summer 920 is configured to calculate a difference between the load current 902 and the estimated battery current 912. This difference corresponds to the PCC current (i_pcc) 440 of FIGS. 4A and 4B. In some embodiments, the FES provides the non-battery portion of the motor current, as calculated by the summer 920. This non-battery portion contains the transient activity that can be better delivered (or absorbed) from the FES. It is estimated by calculating the difference 920 of the motor current and the estimated battery current (i.e., i_mot−i_bat_est).

The integrator 930 integrates the difference output from the summer 920 to smoothen it, and based upon the lower limit logic 931 sends an estimate 938 of the power to be provided from the PCC 106. If the vehicle is in a high acceleration mode (determined by lower limit logic 931) then the estimate 938 from the integrator is associated with the high rate 932. If the vehicle is in a low acceleration mode, then the then the estimate 938 from the integrator is associated with the low rate 934. In some embodiments, the estimate 938 from the integrator may vary between the high and low rate.

Figure 9B:
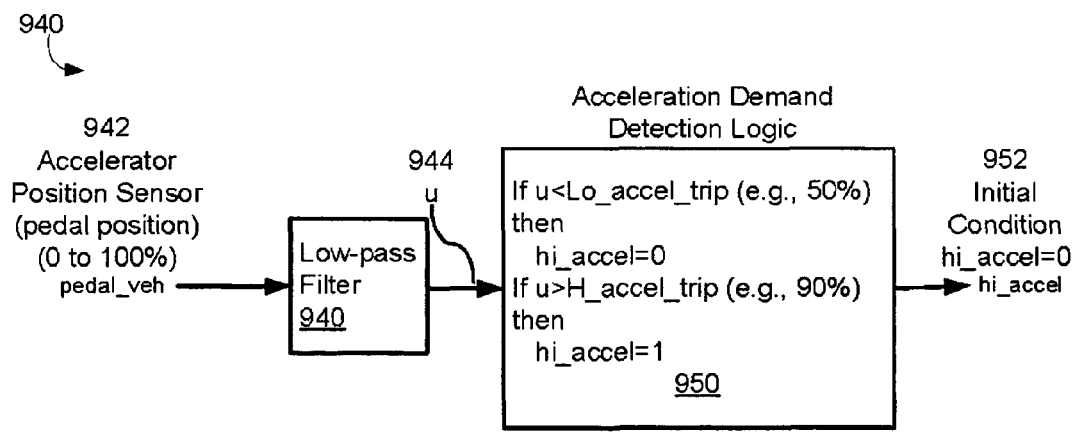
FIG. 9B is an example of an acceleration demand detection circuit for determining if a vehicle is in a high or low acceleration state, in accordance with some embodiments.

FIG. 9B illustrates an acceleration demand detection circuit 940 for determining if a vehicle is in a high or low acceleration state, in accordance with some embodiments. The output 952 of circuit 940 is coupled to initial condition logic 904 of FIG. 9A.

The acceleration demand detection circuit comprises an acceleration position sensor 942 (e.g., throttle or 'gas' pedal in an automobile) coupled to a low-pass filter 940. The filtered output 942 of the low pass filter is coupled to an acceleration demand detection circuit 950, which provides a high acceleration output 952.

In the circuit of FIG. 9B, the acceleration position sensor 942 (e.g., a sensor on or associated with or coupled to the pedal, the drivetrain, the power bus, the battery, etc.) detects the position of the throttle control or accelerator pedal (e.g., signal pedal_veh) or a resulting parameter to determine when the driver has fully depressed and/or significantly depressed (e.g., "full throttle") the pedal, and is expecting the highest performance from the vehicle. Low-pass filter 940 and acceleration demand detection circuit 950 determines whether the hi_accel is a 0 or a 1. If the pedal is being fully depressed (e.g., 90% or greater) the flag hi_accel is then used to modify the Transient Estimator limits and initial conditions 904, 935. This allows the battery current to reach higher levels than normal before unloading the energy from the FES (911). Initial conditions are reduced when the accelerator pedal position is backed off, i.e., when the driver releases his foot and the pedal is depressed less (914), e.g., less than 50% depressed. These correspond to high current 932 and low current 934 respectively, of lower limit logic 931 of FIG. 9A. In some embodiments, only the high (full throttle) position condition is analyzed. In some embodiments, a hysteresis (e.g., between 50% and 90% pedal depression) is variable, according to user preference, and/or vehicle configuration (e.g., sports sedan vs. family wagon).

In some embodiments, the battery current estimator 910 and/or acceleration demand detection logic 950 are implemented as hardware and/or software corresponding to model control module 260 of FIG. 2.

In some embodiments, the dual energy storage system distinguishes between transients and variable high average power. The method of control (e.g., as discussed in FIG. 8 and FIG. 9) adapts as average power requirements change significantly during normal driving. In some embodiments, this method of control protects the battery, recharges the FES so that it has a high degree of availability for transients that occur relatively unpredictably, and allows the size of the FES to be minimized.

FIGS. 10A-D are flowcharts representing a computer method 1000 for dual energy storage management, according to certain embodiments of the invention. Computer method 1000 may be governed by instructions that are stored in a computer readable storage medium and that are executed by one or more processors of one or more servers. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by one or more processors.

Figure 10A:
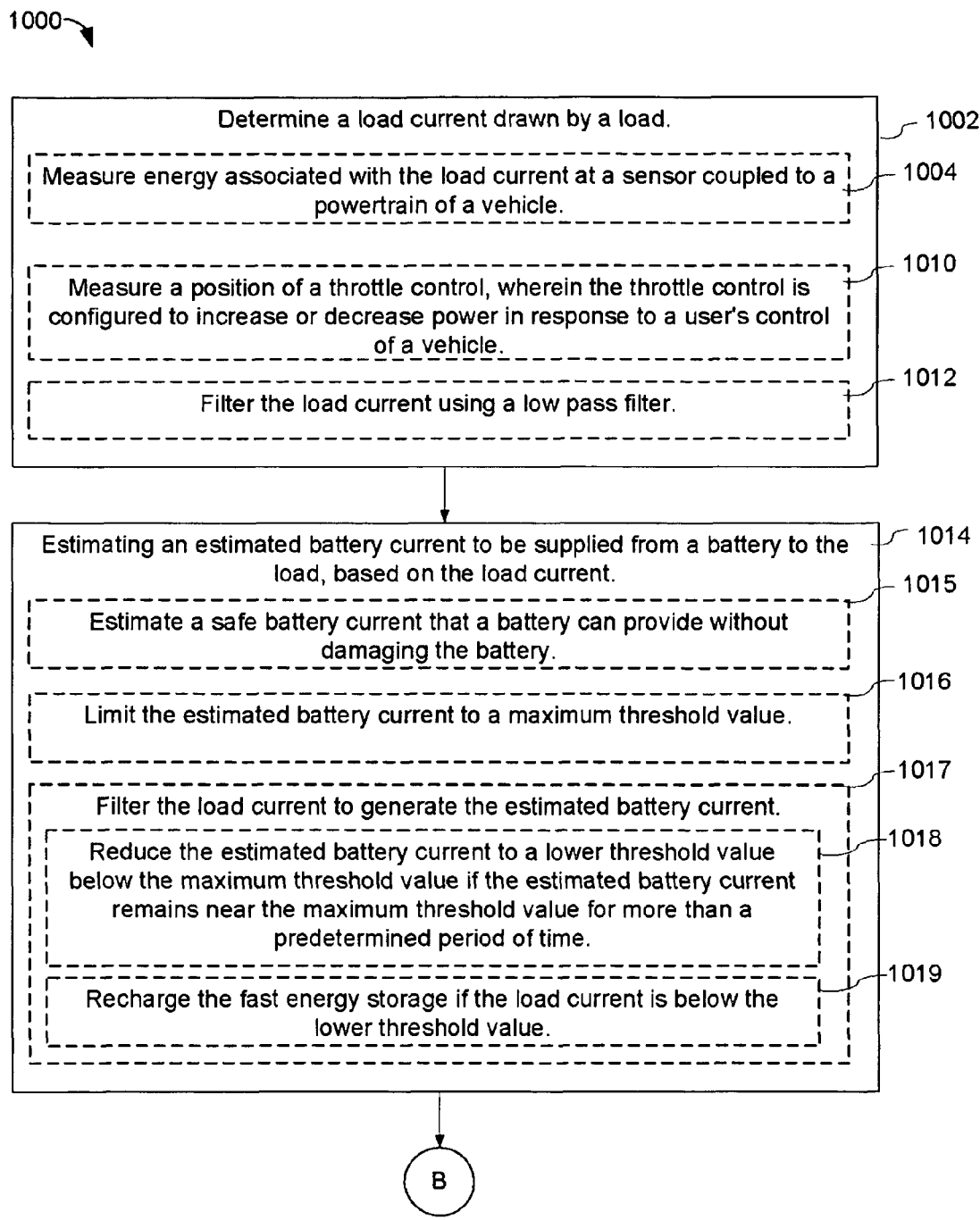
FIG. 10A-D is a flow chart of a process for dual energy storage management, in accordance with some embodiments.

Referring to FIG. 10A, a load current drawn by a load is first determined (1002). In some embodiments, energy associated with a load current (e.g., load current 410, FIG. 4A) is measured at a sensor (e.g., sensor 170, FIG. 1C) coupled to a powertrain of a vehicle (1004). For example, PCC 106, FIG. 1C determines load current i_mot drawn by motor drive power electronics (MDPE) 140, FIG. 1C. In some embodiments, the load current is measured by current control module 220 of FIG. 2.

In some embodiments, a voltage at a sensor coupled to a powertrain of a vehicle is measured. For example, in FIG. 1C bus voltage v_bus is measured on the powertrain (DC bus) 104. The bus voltage is a DC voltage on a DC power supply bus that is usually bounded within a range. It is often determined by the voltage of the battery in the system.

In some embodiments, a position of an acceleration pedal is measured, wherein the acceleration pedal is configured to depress in response to a user's control of a vehicle. For example, in FIG. 9B acceleration position sensor 942 pedal_veh is measured and is used to control the acceleration demand detection circuit 950. In some embodiments, the acceleration demand detection is controlled by mode control module 260 of FIG. 2.

In some embodiments, a position of a throttle control (e.g., a manual throttle control corresponding to the pedal control pedal_veh) is measured (1010), wherein the throttle control is configured to increase or decrease power in response to a user's control of a vehicle (e.g., throttle or 'gas' pedal) of a vehicle.

In some embodiments, the load current is filtered using a low pass filter (1012).

A battery current to be supplied from a battery to the load is estimated (1014) based on the load current. In some embodiments, the estimate is performed at a power controller converter (e.g., PCC 106 of FIG. 1). For example, in FIG. 9A battery current estimator 910 estimates battery current, and provides it to a summer 920 where it is subtracted from the motor current i_mot, before being provided to integrator 930. In some embodiments, the battery current is estimated by battery protection module 250 of FIG. 2.

In some embodiments, a safe battery current is estimated (1015) that a battery can provide without damaging the battery. This is performed at the battery current estimator 910, where a max_discharge_bat value indicating the maximum safe battery current is provided to the estimator 910.

In some embodiments, the estimated a battery current is limited to a maximum threshold value (1016).

In some embodiments, the load current is filtered to generate the estimated battery current (1017).

In some embodiments, the estimated battery current is reduced to a lower threshold value below the maximum threshold value if the estimated battery current remains near the maximum threshold value for more than a predetermined period of time (1018).

In some embodiments, the fast energy storage is recharged if the load current is below the lower threshold value (1019).

Figure 10B:
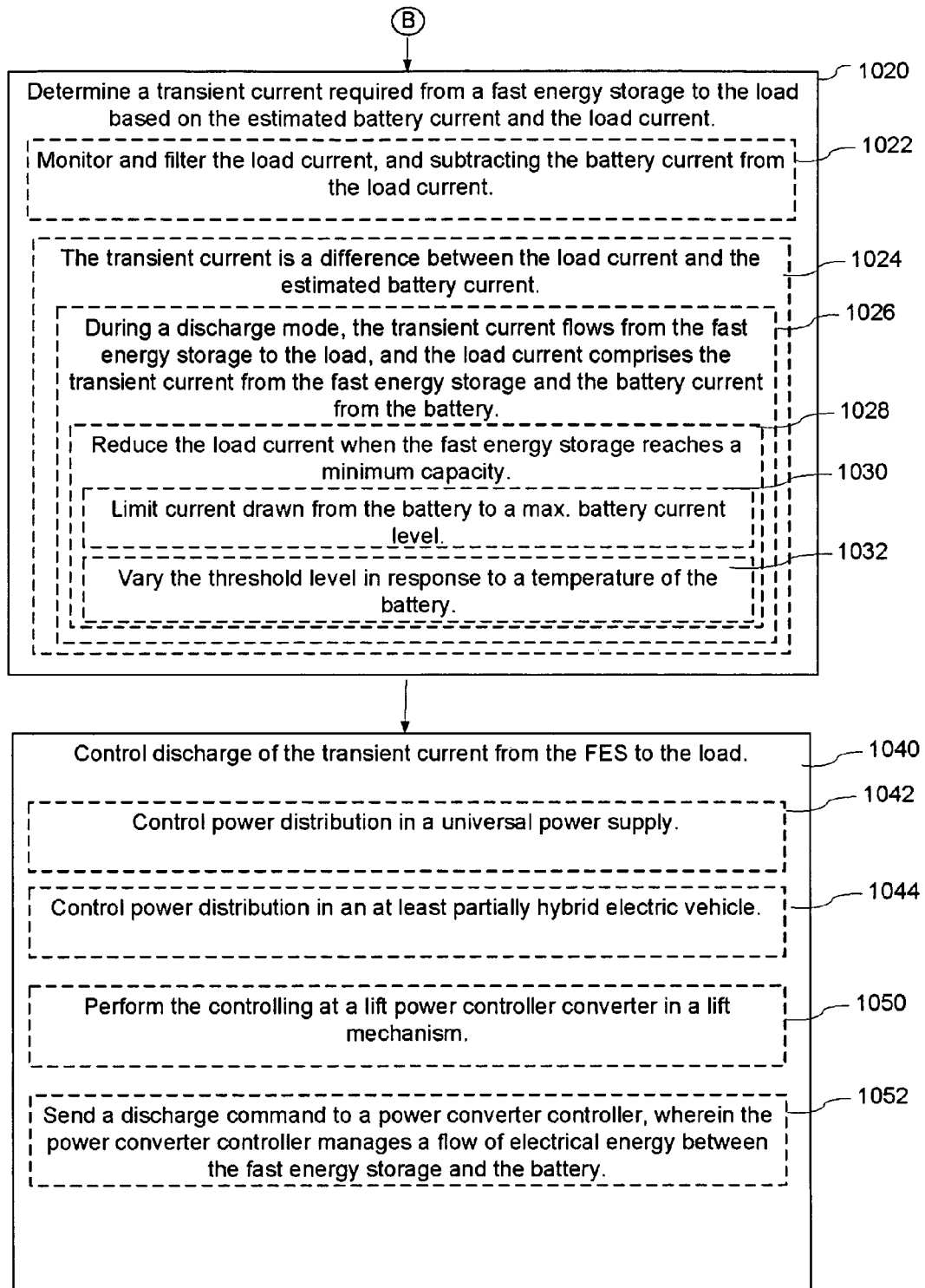

Referring to FIG. 10B, a transient current required from a fast energy storage to the load is determined based on the estimated battery current and the load current (1020). For example, in FIG. 9A the integrator 930 estimates a transient and sends it to the power converter (PCC).

In some embodiments, the load current is monitored and filtered (1022), and the battery current is subtracted from the load current. For example, in FIG. 9A summer 920 subtracts the estimated battery current ibat_est from the load current i_mot.

In some embodiments, the transient current is a difference between the load current and the battery current (1024). In FIG. 9, the estimated transient current i_pcc 930 is sent to the power converter.

In some embodiments, during a discharge mode (1026), the transient current flows from the fast energy storage to the load, and the load current comprises the transient current from the fast energy storage and the battery current from the battery. For example, in FIG. 1C the transient current i_ucap is provided by fast energy storage 105 through the DC-DC power converter 112 (controlled by PCC 106) to the load motor drive power electronics 140.

In some embodiments, the load current is reduced (1028) when the fast energy storage reaches a minimum capacity. For a battery, the capacity is usually rated in Amp-hours (Ah); it can also be expressed in Wh or kWh. This reduction in load current is referred to as 'torque limiting' as the motor power (torque) is cut, i.e., the amount of work the motor performs is reduced, thus limiting the load current drawn by the motor. In some embodiment, this torque limiting corresponds to limit torque module 240 of FIG. 2.

In some embodiments, a current drawn from the battery is limited to a maximum battery current level (1030). For example, a battery high level Ibat_hi_init 911 or a battery low level Ibat_lo_init 914 of FIG. 9A are threshold levels. In some embodiments, the maximum battery current level is varied in response to a temperature of the battery (1032).

Discharge or charge of the transient current from the fast energy storage to the load is controlled (1040). For example, the transient current estimate 938 (FIG. 9A) is sent to the PCC 106 (FIG. 1), which controls the fast energy storage 105.

In some embodiments, power distribution is controlled (1042) at a universal power controller converter in a universal power supply.

In some embodiments, power distribution is controlled (1044) in an at least partially hybrid electric vehicle, such as vehicle 100, FIG. 1.

In some embodiments, the controlling is performed at an automobile power controller converter (e.g., PCC 106, FIG. 1) in an automobile. The PCC executes or causes to be executed an energy management algorithm 110 (FIG. 1C) for controlling current into and out of the PCC.

In some embodiments, the controlling is performed at a lift power controller converter in a lift mechanism (1050).

In some embodiments, a discharge command is sent (1052) to a power converter controller, wherein the power converter controller manages a flow of electrical energy between the fast energy storage and the battery (e.g., using energy management algorithm 110, as described).

Figure 10C:
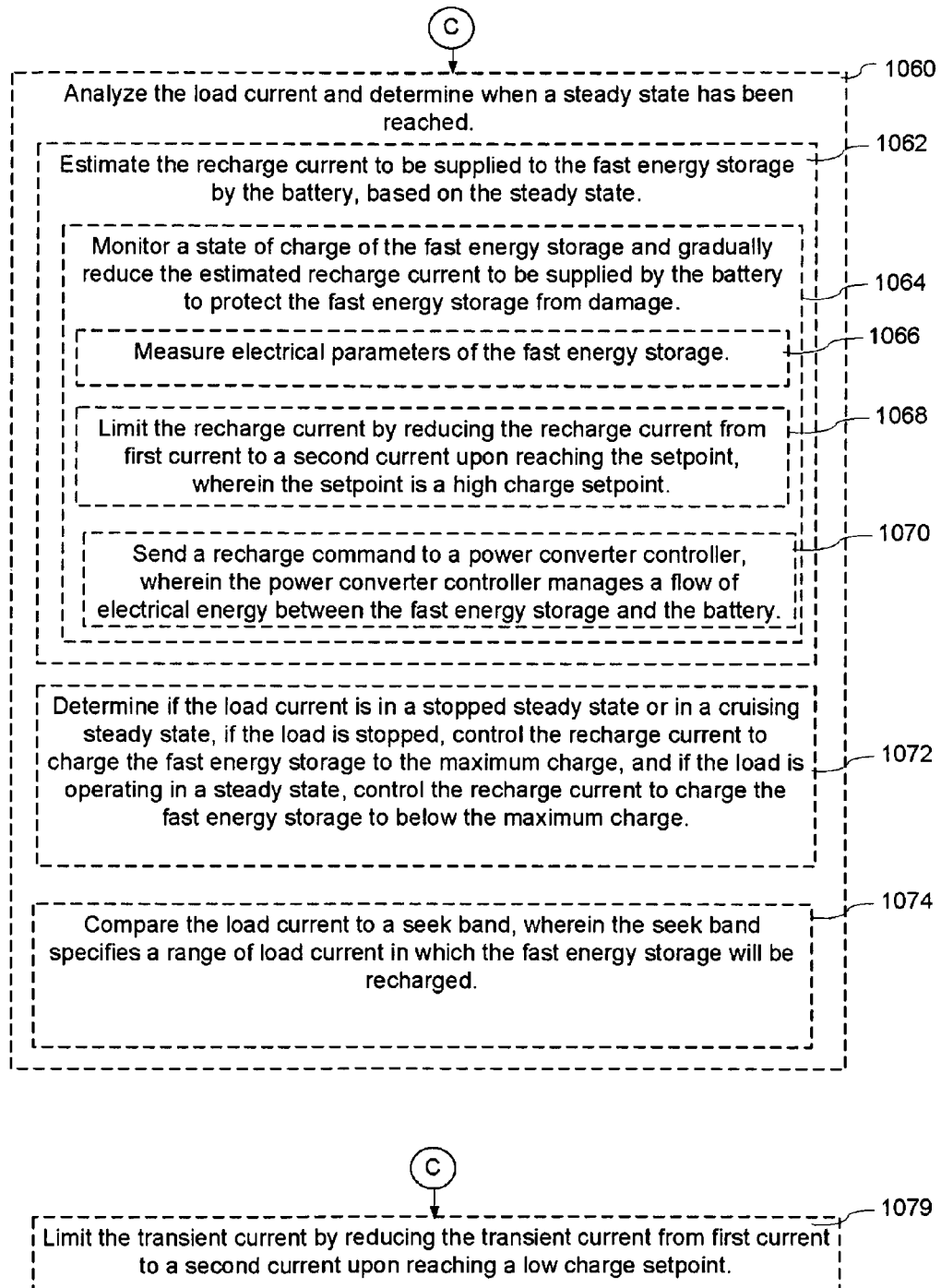

Referring to FIG. 10C, in some embodiments the load current is analyzed (1060) and a determination is made as to when a steady state has been reached. For example, FIG. 6 illustrates recharge activity while in the seek band. During a recharge time period 675, the transient current (current required from the fast energy storage) is within a seek band, and thus the fast energy storage is recharged (recharge 430, FIG. 4A).

In some embodiments, the transient current is a recharge current (1062). The recharge current to be supplied to the fast energy storage by the battery is estimated, based on the steady state.

In some embodiments, a state of charge of the fast energy storage is monitored (1064) and the estimated recharge current to be supplied by the battery is gradually reduced, to protect the fast energy storage from damage. For example, FIG. 8 illustrates a FES state of charge (SOC) setpoint Soc_sp 802, that is monitored 810. FIG. 7 illustrates a 'snubber' action 710 where the state of charge is monitored. If the state of charge is within a middle range 710 (e.g., between 'low' 712 and 'high' 714 on FIG. 7) then charge flowing into the fast energy storage is not limited, i.e., a full flow of charge is permitted into the fast energy storage. If the state of charge is in a low region (e.g., between 'empty' and 'low' or a high region between 'high' and 'full') then the rate of charge flowing is limited (as seen by the sloped line at the left and right side of the graph). The limiting prevents an overly fast rate of change from harming the fast energy storage.

In some embodiments, electrical parameters of the fast energy storage are measured (1066). For example in FIG. 8, the FES voltage sensor v_ucap measures a voltage value across the fast energy storage. In some embodiments, the voltage value on the voltage sensor corresponds to a temperature, e.g., sensed by a thermocouple coupled to the fast energy storage.

In some embodiments, the recharge current is limited (1068) by reducing the recharge current from first current to a second current upon reaching the setpoint, wherein the setpoint is a high charge setpoint. This is described with reference to FIG. 7 above.

In some embodiments, a recharge command (e.g., i_pcc_sp, FIG. 6) is sent (1070) to a power converter controller (e.g., PCC 106, FIG. 1), wherein the power converter controller manages a flow of electrical energy between the fast energy storage and the battery. In some embodiments, the recharge command is associated with discharge/recharge FES module 230 of FIG. 2.

In some embodiments, a determination is made (1072) if the load current is in a stopped steady state or in a cruising steady state. For example, in FIG. 8 FES SOC setpoint 810 determines if the vehicle speed is less than a slow speed, and if so, sets the SOC setpoint to full charge (i.e., soc_sp=1.0). If the vehicle speed is higher than the slow speed, then the SOC setpoint is set to a less than full charge, to allow energy to be captured by regenerative braking.

If the load is stopped, the recharge current is controlled to charge the fast energy storage to the maximum charge, and if the load is operating in a steady state, the recharge current is controlled to charge the fast energy storage to below the maximum charge.

In some embodiments, the load current is compared (1074) to a seek band, wherein the seek band specifies a range of load current in which the fast energy storage will be recharged, as illustrated in recharge region 675 of FIG. 6, as described.

In some embodiments, a recharge current is estimated to charge the fast energy storage to the maximum charge if the load current is in a stopped steady state 810, as illustrated in FIG. 8, as described.

In some embodiments, a recharge current to charge the fast energy storage to below the maximum charge is estimated if the load current is in a cruising steady state, as illustrated in FIG. 8, as described.

In some embodiments, the transient current is limited (1079) by reducing it from first current to a second current upon reaching a low charge setpoint. For example, torque limiting may be performed to reduce the motor load current. The torque limiting may be controlled by limit torque module 240 of FIG. 2, as described.

Figure 10D:
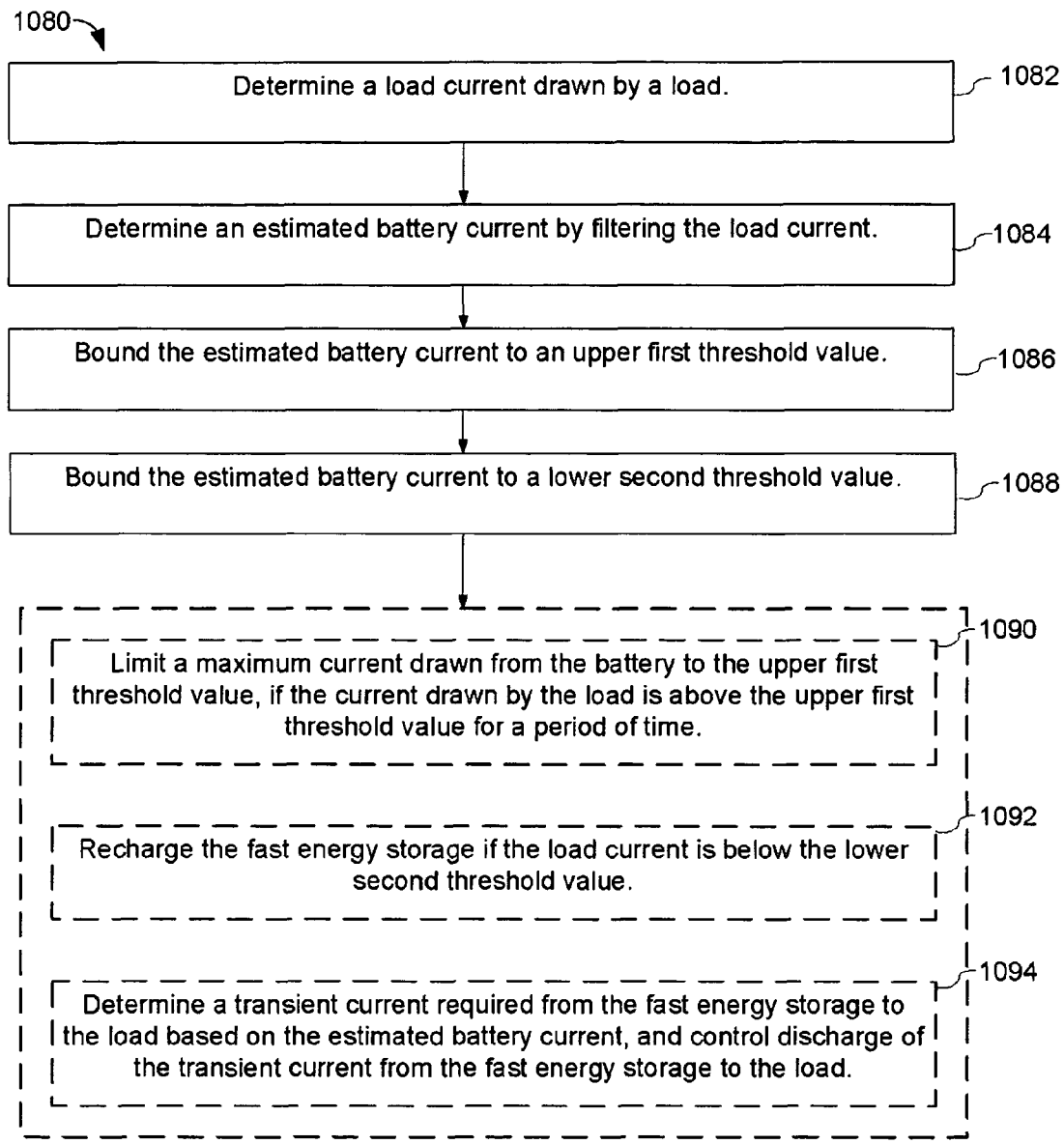

Referring to FIG. 10D, a flowchart representing a computer method 1080 for dual energy storage management is illustrated. A load current drawn by a load is determined (1082). An estimated battery current is determined by filtering the load current (1082), as described. The estimated battery current is bounded to an upper first threshold value (1084), as described. The estimated battery current is bounded to an lower second threshold value (1088), as described.

In some embodiments, a maximum current drawn from the battery is limited to the upper first threshold value, if the current drawn by the load is above the upper first threshold value for a period of time (1090).

In some embodiments, the fast energy storage is recharged if the load current is below the lower second threshold value (1092).

In some embodiments, a transient current required from the fast energy storage to the load is determined based on the estimated battery current, and discharge of the transient current from the fast energy storage to the load is controlled (1094).

The methods described herein may be governed by instructions that are stored in a computer readable storage medium and that are executed by one or more processors of one or more servers. Each of the operations of the methods may correspond to instructions stored in a computer memory or computer readable storage medium. The computer readable instructions stored on the computer readable storage medium include source code, assembly language code, object code, or other instruction format that is interpreted by one or more processors.

Described in FIGS. 11-24 is a system and method for adaptively managing the state of charge of a FES or other fast energy storage (FES) device in the dual energy storage system of a PHEV. The system and method provide improved protection of the battery, improved performance, and minimizes the required capacity of the FES. The method of control is hosted in a controller (in some embodiments in PCC 106 of FIG. 1A) that operates both the motor drive (e.g., motor 150 of FIG. 1A) and a DC-DC converter (e.g., converter 112, FIG. 1C) that manages the flow of power between the FES (e.g., FES 105, FIG. 1A) and the DC bus.

The system and method (executed by the controller) provide several functions, including protecting the battery from high current draws using the FES and torque limiting, maximizing the availability of the FES, minimizing the use of the torque limit, and minimizing the capacity of the FES.

One embodiment described herein includes a battery (e.g., battery 102 of FIG. 1A) coupled to a DC bus without intervening power electronics. As shown in FIG. 1C, the FES is coupled to the DC bus through a DC-DC converter 112, in some embodiments coupled to or part of PCC 106. The motor 150 is coupled to the DC bus through an inverter (motor drive power electronics 140). The FES current and motor current are controlled so that the net current flowing is the battery current. Alternately, the method disclosed herein may be implemented using a DC-DC converter between the battery and the DC bus. The purpose of controlling the battery current is to protect the battery from overheating and to increase battery life.

The method of control disclosed herein is inherently adaptable and is suitable for a wide variety of types of vehicle use. The method may be implemented without modification during acceleration, deceleration, cruise, sustained high load operation such as hill climb or towing, and at idle. This strategy renders unnecessary the monitoring of many aspects of the operation of the vehicle, is simpler and cheaper to implement than conventional solutions, and is more reliable. A number of control processes are applied including: determining a battery current limit, sourcing or sinking energy from the FES, and applying a current limit to the motor.

To be responsive to a wide range for average traction power, an adaptive battery current limit is used instead of a fixed battery current limit. The method and system of calculating this adaptive battery current limit are described. The adaptive battery current limit is advantageous because it defines an acceptable range of battery current to prevent damage and extend battery life. The limit is enforced by first supplementing the vehicle with energy from the FES and, only if necessary, reducing the traction power to the motor (i.e., in the case that the FES energy is depleted, or close to depletion).

In an embodiment, a high battery current limit and a low battery current limit are established and the battery current limit is varied between these limits. They may be set as fixed parameters, user selected, or adjusted dynamically and automatically by the controller. In some embodiments, the battery current limits are stored in a memory (volatile or non-volatile) and/or in a look-up table (LUT).

A representative value for the low battery current limit is the continuous current rating for the battery. A representative value for the high battery current limit is the 30 second transient current limit for the battery, i.e. the maximum current that can be drawn for 30 seconds without damaging the battery. In some embodiments, other time periods or levels could be used.

While it is desirable to limit battery current to the low level, it is allowable to use the high level for short durations. The use of the high level should be minimized to maximize battery life.

The battery current limit may also be dynamically adjustable between the low and high bounds. For example in the case of a "full throttle" acceleration event (e.g., fully depressed pedal as described with regard to FIG. 9B), one approach is to set the battery current limit equal to the high battery current limit.

The high battery current limit may be decreased as a function of battery temperature to protect against battery damage or battery aging. Many other parameters may be used as input for the adjustment of battery current limits, including battery age, ambient temperature, number of battery cycles to date, etc.

The battery current limit may be varied between the low and high limits by a processor, e.g., at or associated with the PCC. The determination of how to adjust the battery current limit is made by observing the motor current. In some embodiments, the battery current limit is computed by continuously averaging the motor current (this calculation can be performed any number of ways including a simple exponential low-pass filter, or moving averager). This averaged value then represents the steady-state current that should be supplied by the battery. The calculation is bounded by the low and high limits.

An advantage of an adaptive battery current limit over a fixed limit is that the adaptive battery current limit temporarily allows high average power operation without depleting the FES. For instance, hill climb on a freeway at constant speed may result in an average power that exceeds acceleration power requirements in urban and highway driving. A fixed current limit that allows the FES to protect the battery in urban and highway acceleration would also allow the FES to deplete during constant speed freeway hill climb leaving the vehicle unable to accelerate for passing or emergency maneuvering. Using the adaptive current limit, as the vehicle travels up the hill at constant speed, the battery current limit estimate increases to match the average motor current requirement. This allows the FES charging methods described below to maintain sufficient charge for passing or maneuvering.

Many alternatives for the battery current limit estimator may be implemented. In some embodiments, the estimator is implemented as a filter or as a simple moving average, executed by a processor or by dedicated estimator hardware. In some embodiments, the order and time constants of the filter are hard coded or set as parameters. In some embodiments, the parameters for the filter are dynamically adjustable.

A variety of energy management strategies may be employed to efficiently use the FES. In some embodiments, a control mode for the FES is selected based on battery current, and there are two zones of battery current whereby a particular battery current level is the partition for the two control regimes for the FES. In some embodiments, the partitioning battery current differentiating between these control regimes is the low battery current limit. In other embodiments, the partitioning battery current could be selected arbitrarily. With this partition, there are at least two control regimes: a State-of-Charge (SOC) control band, and a Transient Current Control (TCC) band.

During transient current control (TCC), the FES is operated to reduce the transient loads on the battery, thus preserving battery life. An acceptable battery current limit is estimated by continuously averaging (or filtering) the motor current. TCC is used to source or sink current from the FES to hold the battery current at or below the computed battery current estimate. A transient current controller is a circuit that monitors a transient current and ensures that the transient current does not cause damage to the battery.

The motor (load) draws a load current and generates a torque to turn wheels of the vehicle. This motor torque is monitored by the PCC. If the motor current demand exceeds the sum of FES output plus the high battery current limit, the PCC limits torque to reduce motor current to maintain the battery current at or below the high battery current limit. Limiting torque means reducing power to the wheels so the vehicle will accelerate less, climb more slowly (on a hill) or tow more slowly (with a trailer or load).

In some embodiments, the motor drive has a signal input that controls how much torque is applied by the motor. In some embodiments, this signal originates from the throttle control (e.g., accelerator pedal). In some embodiments, the signal output can be limited by the software so as not to apply the full accelerator output to the motor drive.

In some embodiments, the motor torque is limited when the fast energy storage reaches a minimum capacity. In some embodiments, the minimum capacity is within a range, e.g., 20% to 30% of normal capacity, 10% to 40% of normal capacity, etc. In some embodiments, it is desirable to leave some charge in the fast energy storage device for emergency maneuvering, etc. When the FES is depleted and unable to protect the battery from high current, motor current is reduced. Many variations for calculating the threshold for torque limiting may be applied, while remaining within the scope of this invention.

The dual-energy storage capacity and the high battery current limit may be controlled to protect the battery and provide satisfactory performance. Acceleration times (such as 0-60 mph time) are often used to compare vehicles. The FES may be used to maximize the acceleration without drawing excessive battery current.

In some embodiments, the system automatically detects a full-throttle event, and adjusts the battery current limit to the maximum allowed limit. This makes full use of the battery (within its safe operating limits) while the FES provides the remainder of the required power or current. In some embodiments, the FES control parameters can also be automatically adjusted to fully deplete the FES by the time the vehicle attains 60 mph, or some other target speed. This target speed may be set by the user, by the manufacturer of the vehicle, or may be dependent on location (e.g., local highway laws, city laws, etc.).

A smaller FES can be used under this situation than would otherwise be needed if the FES were to carry the full brunt of the acceleration event. This enables a reduced cost, weight and footprint of a vehicle's dual-energy storage requirements, and reduces the cost to manufacture a vehicle with such a dual-energy storage system.

Figure 11:
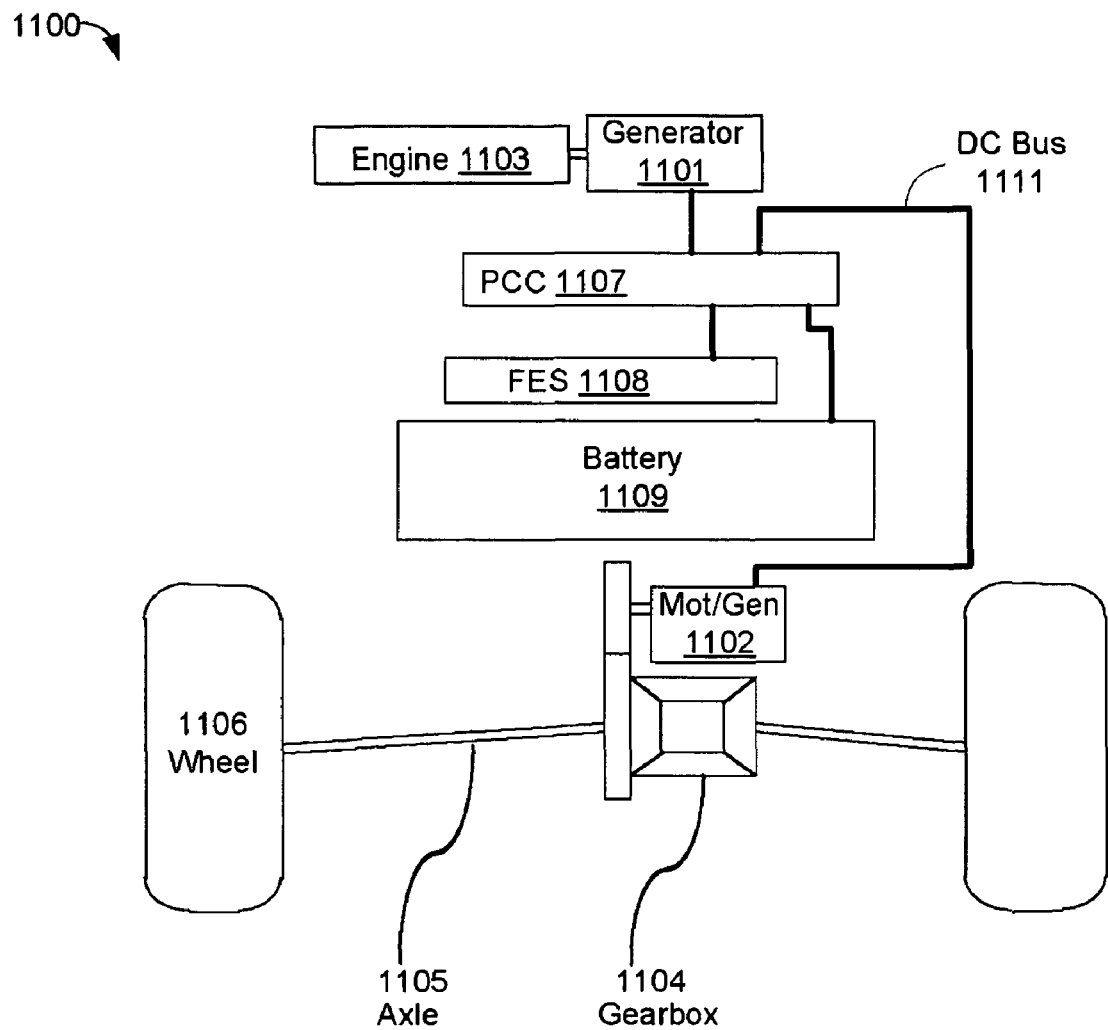
FIG. 11 is a schematic of a series plug-in hybrid electric vehicle system, in accordance with some embodiments.
Figure 18:
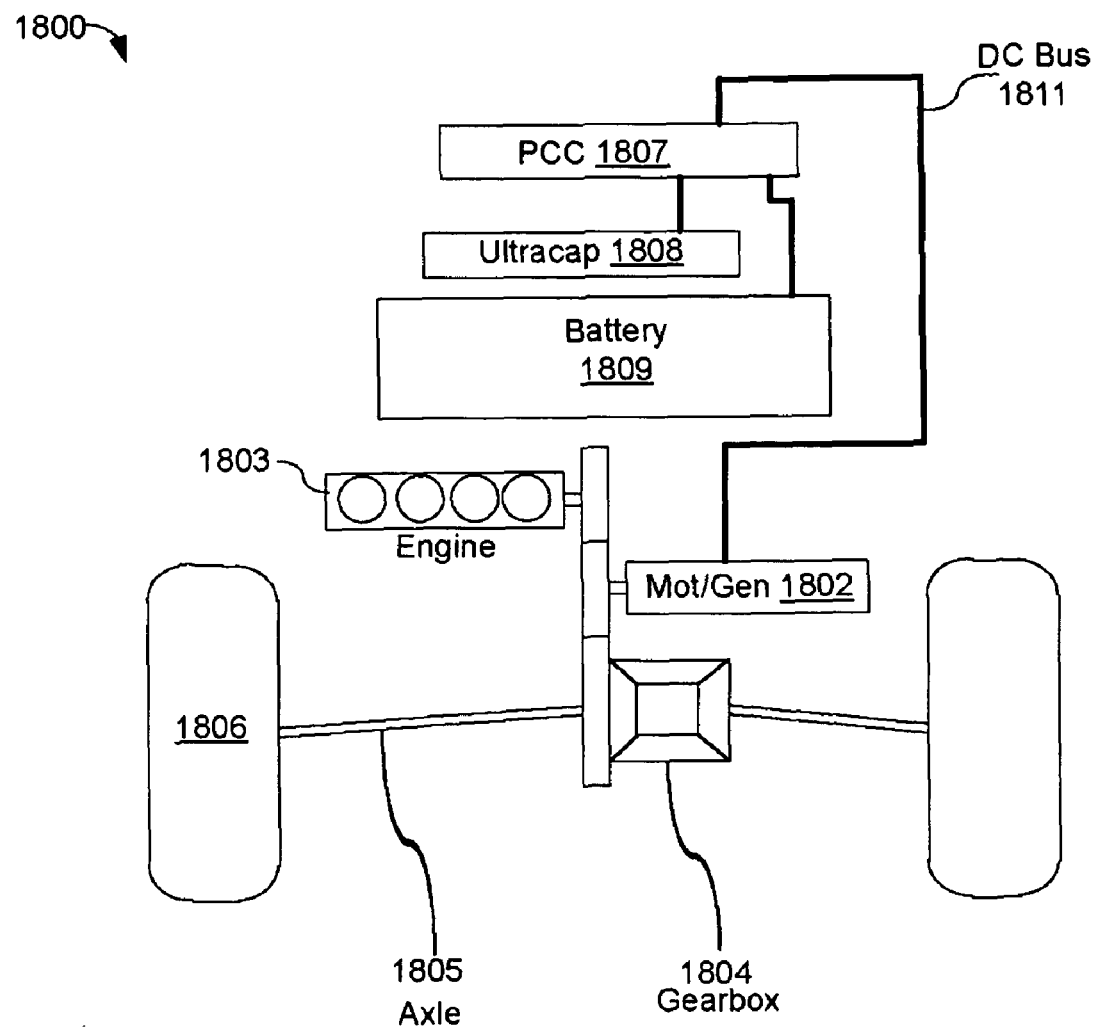
FIG. 18 is a schematic of a parallel hybrid propulsion system with one electrically driven axle, in accordance with some embodiments.
Figure 19:
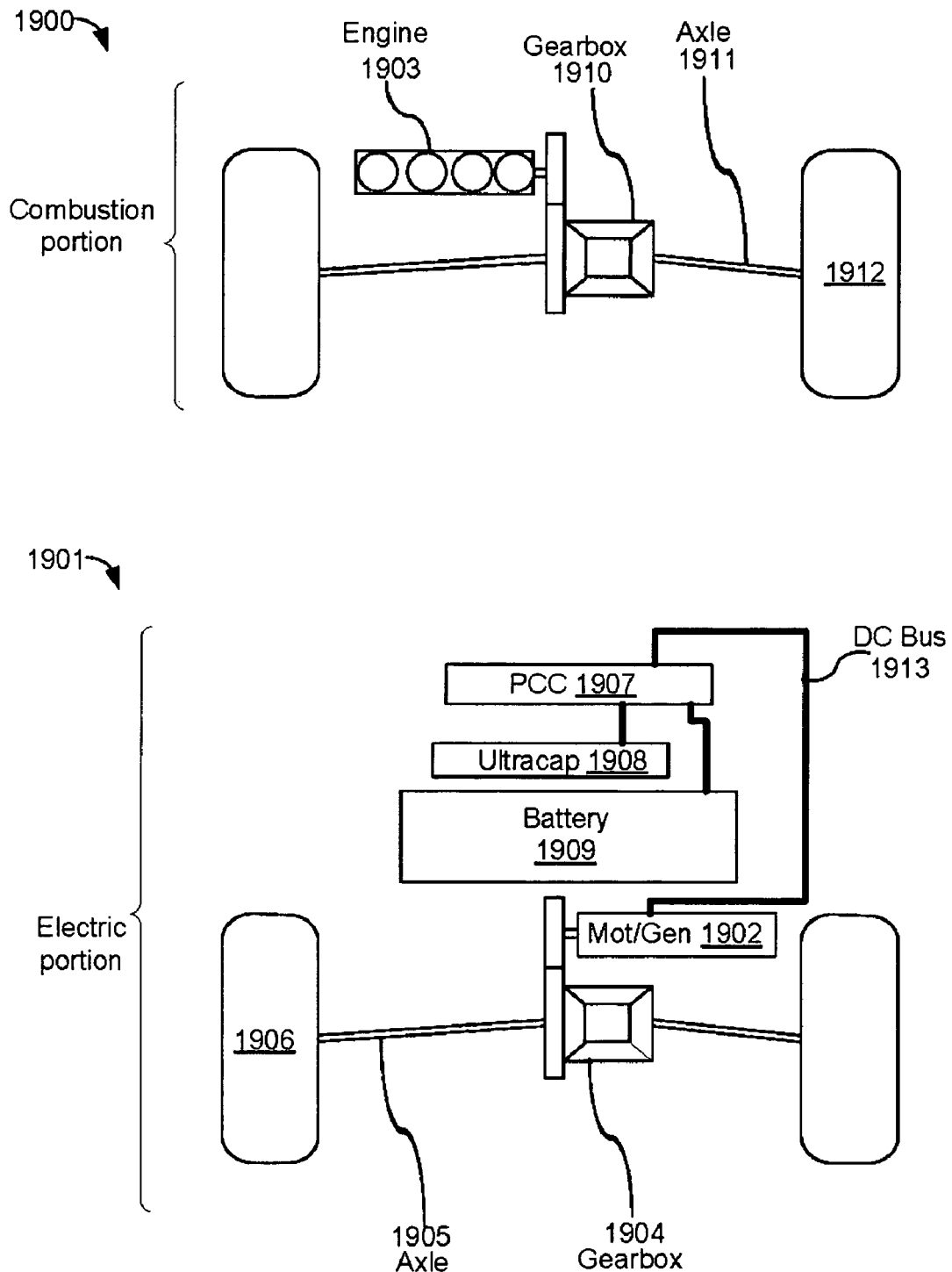
FIG. 19 is a schematic of a through-the-road (TTR) parallel plug-in hybrid vehicle, in accordance with some embodiments.
Figure 20:
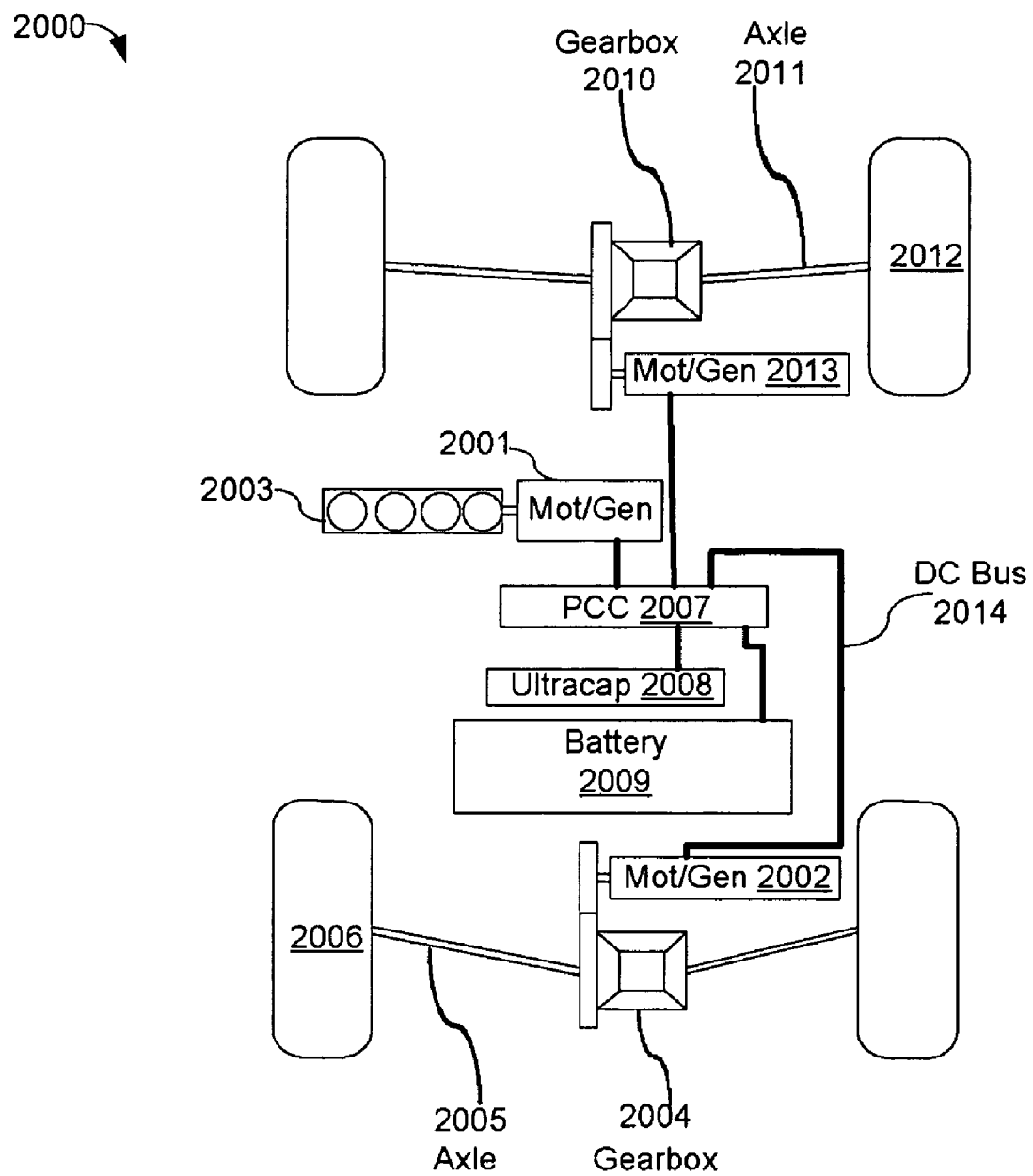
FIG. 20 is a schematic of a series hybrid propulsion system with two driven axles, in accordance with some embodiments.

Referring to FIG. 11, a schematic of a vehicle system for adaptively managing the state of charge of a FES (or other energy storage device) in an automobile is disclosed, such as for the automobile of FIG. 1A. FIGS. 18-20 show alternative vehicle systems.

FIG. 11 shows an embodiment 1100 of a series plug-in hybrid electric vehicle (PHEV) with one driven axle. A series PHEV has engine that is not mechanically coupled to an axle/wheel, but instead drives an electrical generator that provides current to a battery and to drive the electrical motor.

The vehicle comprises an engine 1103 (e.g., a conventional hydrocarbon fuel engine as described) coupled to a first motor/generator 1101, where the engine drives the motor/generator producing electricity. The first motor/generator 1101 is coupled to a power controller converter (PCC) 1107. The PCC 1107 is coupled to a FES 1108, and to a slow energy storage (e.g., battery) 1109. The PCC 1107 is coupled to a DC bus 1111, which is in turn coupled to a second motor/generator 1102. The second motor/generator is coupled via a gearbox 1104 to one or more axles 1105, which are coupled to one or more wheels 1106, as the second motor drives the wheels directly. In some embodiments, the bus 1111 may be an AC bus instead of a DC bus.

Electric power is exchanged between motor/generators, the battery 1109, the FES 1108, and ancillary systems by the power converter and controller 1107 over the DC bus 1111. The second motor/generator 1102 consumes electricity to produce traction power and/or may produce electricity through regenerative braking. The power converter and controller 1107 processes, conditions, and directs the flow of electrical power between and among the connected components, such as the motors/generators, energy storage devices, and charging and other ancillary systems. The power converter and controller 1107 sources or sinks DC, single phase AC, and/or multiple phase AC electricity over a range of voltage and power levels.

Figure 12:
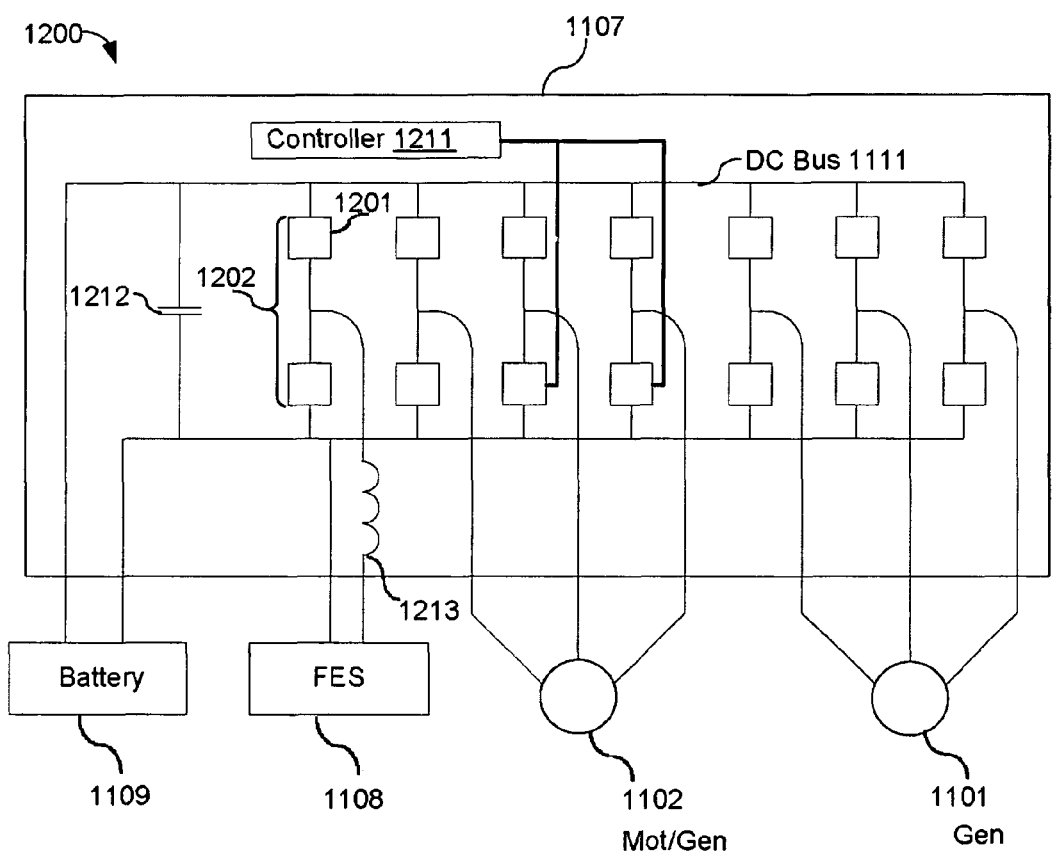
FIG. 12 is a schematic of a power converter controller (PCC) for the electric drive of the series hybrid PHEV shown in FIG. 11, in accordance with some embodiments.

FIG. 12 shows a schematic representation 1200 of the power converter and controller (PCC) 1107 corresponding to the series hybrid PHEV shown in FIG. 11.

The PCC 1107 is coupled to the first motor/generator 1101 and to the second motor/generator 1102. The PCC 1107 provides power to (in a drive mode) and receives power from (in a recharge mode) the first and second motor/generators. In some embodiments, the PCC 1107 is also coupled to a FES 1108, and to a slow energy storage (e.g., battery) 1109.

Inside the PCC 1107, a controller 1211 is coupled to a DC bus 1111, and via the PCC bus to a plurality of switching devices 1201. A smoothing capacitor 1212 is coupled across voltage lines from the battery 1109. The switching devices 1201 are coupled in series across the voltage lines from the battery 1109. An inductor 1213 is coupled to voltage lines from the FES 1108.

Referring to FIG. 12, the switching devices 1201 that drive the motor/generators 1101 and 1102 comprise two 3-phase inverter configurations. The FES 1108 is coupled to the DC bus 1111 by a buck-boost converter 1202 comprising a single phase leg with two switching devices 1201, and the inductor 1213. This buck-boost converter 1202 facilitates the matching of the variable FES voltage with the relatively constant DC bus voltage. The smoothing capacitor 1212 helps stabilize the DC bus voltage and reduces voltage ripples. The switching devices 1201 are operated by the controller 1211. Although not shown, current and voltage feedback is used to help control the inverters. For simplicity only a few of the control paths between the controller 1211 and the switching devices 1201 are shown.

In some embodiments, the energy management strategies described herein (and in FIG. 2) is executed by the controller 1211. A number of control processes are applied including: establishing an adaptive battery current limit, managing energy flow to and from the FES, and applying a current limit to the motor.

The adaptive battery current limit defines a level of acceptable battery current for the vehicle at a given time. The limit is enforced by first supplementing the vehicle with energy from the FES and, only if necessary, reducing the traction power to the motor (i.e. in the case that the FES energy is depleted). This is described in FIGS. 13, 14, 15 and 16.

Figure 13:
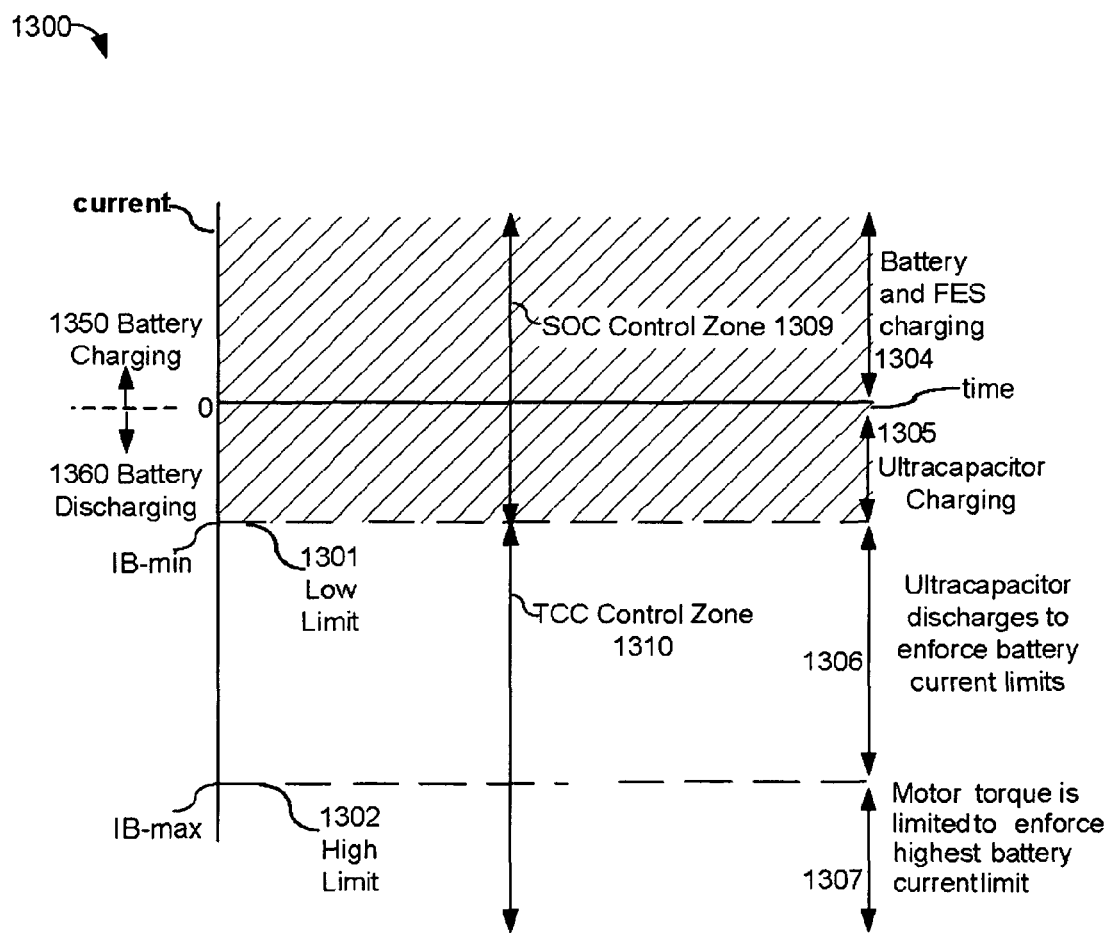
FIG. 13 is a linear graph of battery current vs. time, showing state of charge (SOC) and transient current control (TCC) operating zones, in accordance with some embodiments.

FIG. 13 is a linear graph 1300 of battery current vs. time, showing state of charge (SOC) and transient current control (TCC) operating zones, in accordance with some embodiments. FIG. 13 illustrates a variety of operating zones and energy management strategies that utilize the FES while observing the battery current limits. Above the X-axis, a regenerative zone 1304 indicates that the battery and/or FES are charging. Below the X-axis, a low-power operating zone 1305 indicates that the battery is discharging slightly and the FES is charging, as discussed with regard to the seekbands in FIG. 6. A high-power operating zone 1306 indicates that the battery is discharging and the FES discharges to enforce battery current limits. A torque limiting zone 1307 indicates that the battery is discharging at its high current limit 1302 and motor torque is limited to enforce this high current limit to prevent damage to the battery. In some embodiments, the limits between the bands may be dynamic.

In the regenerative zone 1304, the battery current is positive (1350 on Y axis) indicating that it is charging. The FES may be also conveniently charged making use of the available motor energy.

In the low-power operating zone 1305 the battery current is negative (1360 on Y axis), and the vehicle is drawing a nominal amount of battery current (within low limit 1301, IB-min). IB-min is the Low (low magnitude) battery current limit. The FES is not required, but may be recharged as long as the battery current limit 1301 is not exceeded.

In the high-power operating zone 1306 (TCC control zone 1310), the vehicle will use the FES to limit the current to either the low battery current limit 1301, or a dynamically adjusted limit (1403—FIG. 14) that moves between the low 1301 and high limits 1302.

In high power cases, the battery may be required to reach the high battery current limit 1302. In the torque limiting operating zone 1307, motor torque limiting is used to keep the battery current from exceeding the high battery current limit 1302, especially when the FES energy has been depleted.

In some embodiments, a variety of control strategies may be employed to optimally use the FES. In some embodiments, one of two control modes is selected based on battery current, where there are two zones (SOC zone 1309 and TCC zone 1310 of FIG. 13) of battery current whereby a particular battery current level 1301 (lower limit) is the partition for the two FES control regimes. In some embodiments, the battery current value that divides these control regimes may be selected arbitrarily. In some embodiments, the partitioning battery current is the low battery current limit 1301.

In a State-of-Charge Control (SOC) zone 1309, the battery current magnitude is less than the low battery current limit. In this regime, the FES is not needed to protect the battery from high current. The controller charges the FES to seek a target state-of-charge SOC using a simple feedback control strategy. The target SOC may have any value but will typically be near full charge. This mode of operation is referred to as SOC control, controlled by SOC controller (discussed in relation to 1611, FIG. 16).

In a Transient Current Control (TCC) zone 1310, the battery current magnitude exceeds the low battery current limit. In this regime, the FES controller sources or sinks current to make up the difference between the motor current and the battery current limit estimate. This mode is referred to as TCC control, controlled by TCC controller (discussed in relation to 1612, FIG. 16).

In some embodiments of adaptive battery current limit, a high battery current 1302 limit and a low battery current limit 1301 are established and the battery current limit is varied (1403, FIG. 14) between the high and low limits. They may be set as fixed parameters, user selected, or adjusted adaptively and automatically by the controller.

In some embodiments, the adaptive (variable) battery current limit 1403 represents the filtered load current.

While it is desirable to limit battery current to the low level 1301, it is allowable to use the high 1302 level for short durations without damaging the battery. The use of the high level 1302 should be minimized to maximize battery life. A representative value for the low battery current limit 1301 is the continuous current rating for the battery. A representative value for the high battery current limit 1302 is the 30 second transient current limit (e.g., from battery manufacturer's specification) for the battery. Other values may be used depending on implementation.

Figure 14:
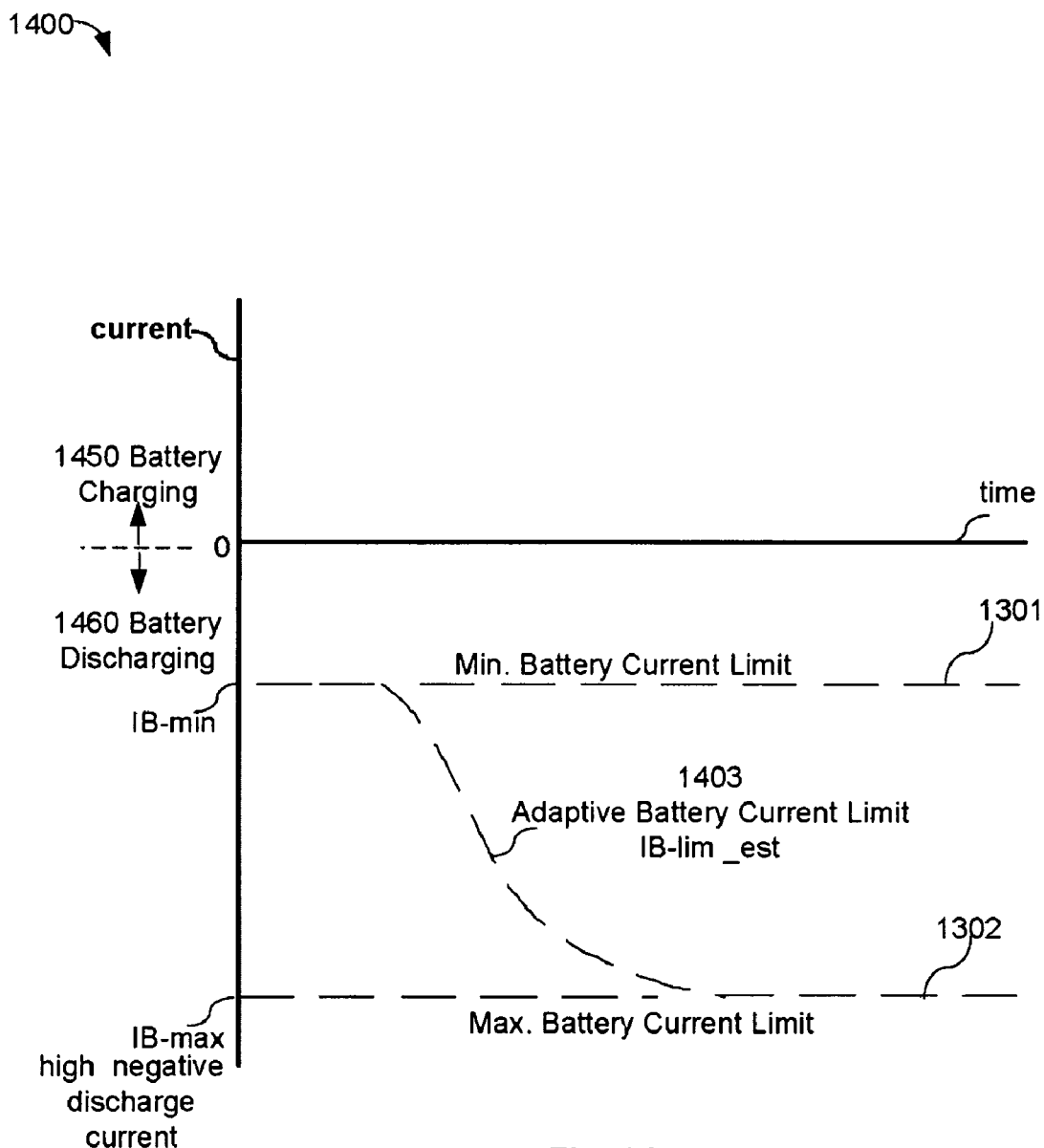
FIG. 14 is a graph of battery current vs. time, showing the battery current limits and adaptive battery current limit operation, in accordance with some embodiments.
Figure 15:
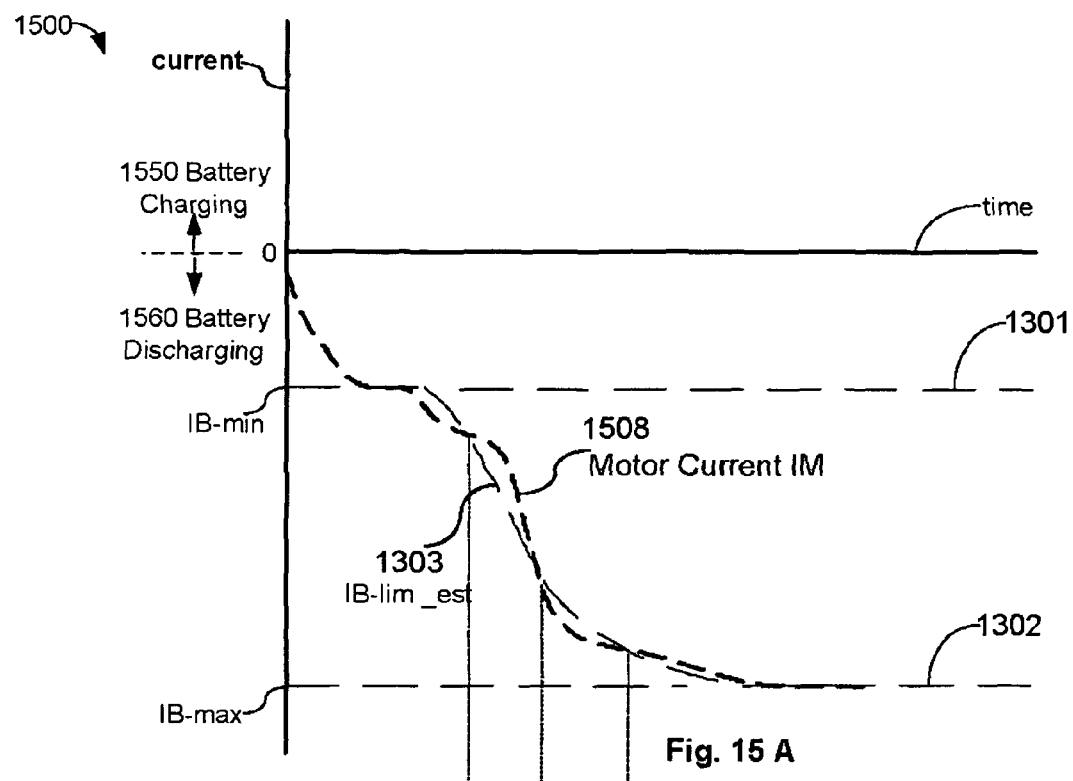
FIGS. 15A and B are two graphs of battery current and FES current respectively versus time, that show the relationship between battery, motor and FES currents while in the TCC region of operation, in accordance with some embodiments.
Figure 15:
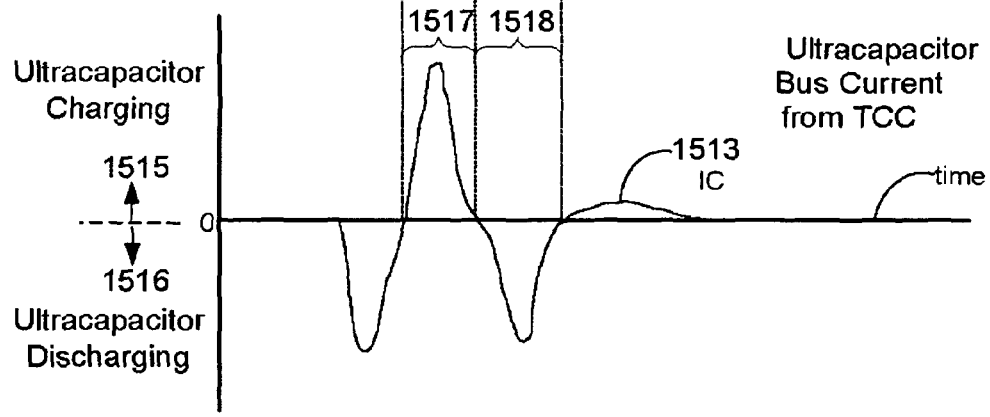

FIG. 14 is a graph 1400 of battery current vs. time, showing the battery current limits and adaptive battery current limit operation, in accordance with some embodiments. The operating zones of FIG. 14 correspond to the operating zones of FIG. 13. FIG. 14 shows time on the X-axis and battery current on the Y-axis. The positive portion of the Y-axis 1450 corresponds to a battery charging situation. The negative portion of the Y-axis 1460 corresponds to a battery discharging situation. A minimum battery current limit 1301 and a maximum battery current limit 1302 (both from FIG. 13) indicate upper and lower battery current limits. An adaptive battery current limit 1403 is shown between these upper and lower limits.

Referring to FIG. 14, the battery current limit 1403 may be adaptively adjusted 1403 between the low (min) 1301 and high (max) 1302 limits. In some embodiments, the determination of how to adjust the battery current limit is made by observing the motor current 1508, shown in FIG. 15.

FIGS. 15A and 15B are two graphs 1600 of battery current (IB_lim_est) and FES current respectively versus time, that show the relationship between battery, motor and FES currents while in the TCC region of operation, in accordance with some embodiments.

FIG. 15A shows time on the X-axis and battery current on the Y-axis. A positive value 1550 on the Y-axis of FIG. 15A indicates a battery charging situation. A negative value 1560 indicates a battery discharging situation. Battery current minimum (1301) and maximum (1302) values are shown, and a motor current 1508 is varied between these values.

FIG. 15B shows time on the X-axis and FES current on the Y-axis. A positive value for current indicates that the FES is charging 1515, and a negative value indicates that the FES is discharging 1516. A FES bus current 1513 from the transient current control (TCC) is illustrated.

A time period 1517 on FIG. 15B corresponds to a period in FIG. 15A where the load (motor) current 1508 is less than the estimated battery current 1303 IB_lim_est. Since there is excess battery current over what is required by the load, this excess may be used to charge the FES.

A time period 1518 on FIG. 15B corresponds to a period in FIG. 15A where the load (motor) current 1508 is greater than the estimated battery current 1303. Since the battery current is insufficient to safely provide what is required by the load, the FES provides current to cover the difference and prevent an excess current from being drawn from the battery.

Referring to FIG. 15B, in one implementation the battery current limit is computed by continuously averaging the load (motor) current 1508 (this calculation can be performed any number of ways including a simple exponential filter, or moving averager). This averaged value then represents the ideal current that should be supplied by the battery. The calculation is bounded by the low 1301 and high 1302 limits.

In some embodiments, the battery current limit may also be quickly adjusted between the low 1301 and high 1302 bounds. For example in the case of a "full throttle" acceleration event, one approach is to set the battery current limit equal to the high battery current limit 1302. In some embodiments, the adjustment is a step change. In some embodiments, the adjustment is a ramp change.

The high battery current limit 1302 may be decreased as function of excessive battery temperature to protect against battery damage or battery aging. Many other parameters may be used as input for the adjustment of battery current limits.

Figure 16:
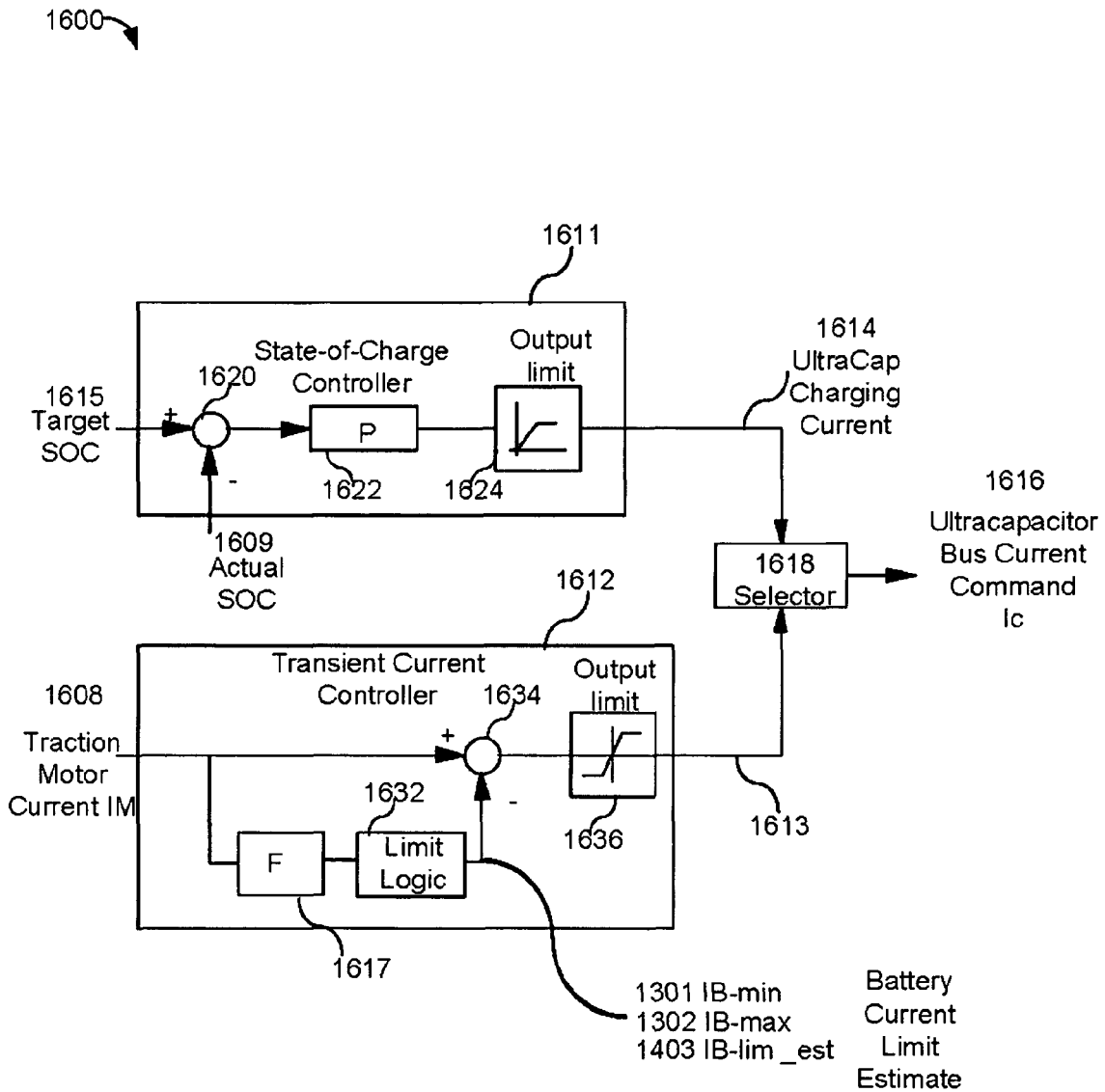
FIG. 16 is a circuit schematic showing control functions of state of charge (SOC) and transient current control (TCC), in accordance with some embodiments.

FIG. 16 is a logic circuit schematic 1600 showing control functions of state of charge (SOC) and transient current control (TCC), in accordance with some embodiments.

The circuit comprises a state-of-charge (SOC) controller 1611, coupled to input 1615 target state-of-charge, and to input 1609 actual state-of-charge. The state of charge controller comprises a summer 1620 coupled to the inputs 1615 and 1609 that determines the difference between the inputs. The difference (summer output) is coupled to a proportional-integral (PI) control 1622. The output of the proportional-integral (PI) control 1622 is coupled to an output limiter 1624. The output 1614 of the output limiter 1624 comprises a FES charging current, and is coupled to a selector 1618.

The circuit further comprises a transient current controller (TCC) 1612, coupled to input 1608 traction motor current. The TCC 1612 comprises a TCC filter 1617 coupled to the input 1608, and having an output coupled to limit logic 1632. The limit logic 1632 implements the battery current limit estimates 1301 (minimum battery current), 1302 (maximum battery current), and 1403 (dynamically adjusted battery limit), as illustrated in FIGS. 13 and 14. The output of the limit logic is coupled to a summer 1634, which is also coupled to input 1608 traction motor current. The summer 1634 outputs a difference between the motor current and the estimated battery current limit, and that output is coupled to output limiter 1636. The output limiter has a limited difference output 1613 coupled to the selector 1615. The selector 1615 provides an output 1616 representing the FES bus current command.

State of charge (SOC) control is described with reference to state-of-charge (SOC) controller 1611 of FIG. 16. State of charge control is used to restore the charge of the FES 1108 during times that have the least impact on vehicle performance. When invoked, the SOC controller 1611 will restore the SOC of the FES to a target value 1615 using a simple feedback control mechanism. It is appropriate to charge the FES more quickly the more it has been depleted. In some embodiments, this is accomplished by incorporating proportional feedback in the strategy. In some embodiments, a look up table (LUT) is used.

In some embodiments, the actual SOC (1609) is the feedback. In some embodiments, the actual SOC is compared with the target SOC. The difference is fed to the P algorithm which computes an output current (Ic) command to the PCC. The PCC sources or sinks current from the ultracapacitor changing the actual SOC, and thus provides the feedback loop.

The high rate of charge in SOC control mode may be varied by limiting the output of the controller (using output limiter 1624) to a high or low value as appropriate. For instance it is appropriate to charge the FES quickly when the vehicle is stopped thus preparing it for the acceleration that will follow.

Varying the charge rate as a function of SOC and motor speed enables a designer (e.g., of automobiles, of machinery, of construction or lifting equipment, of power supplies, etc.) to minimize the size, weight and cost of the FES while providing a specified level of protection for the batteries. Applying the concept of increasing charge rate when the vehicle is stopped or when SOC is low permits a substantial reduction in the required capacity if the FES, compared to a FES providing the same level of protection without implementing these concepts.

Transient current control (TCC) is described with reference to transient current controller (TCC) 1612 of FIG. 16. During TCC control the FES is operated to reduce the transient loads on the battery, thus preserving battery life. In some embodiments, an acceptable battery current limit is estimated by continuously averaging (or filtering) the motor current 1608. This battery current limit 1303 will typically reside between the low 1301 and high 1302 battery limits previously discussed with regard to FIG. 13.

The TCC controller 1612 is used to source or sink current from the FES to make up the difference 1613 between the motor current 1608 and the battery current limit estimate 1303. In an embodiment, current sourced or sunk by the FES 1108 is explicitly controlled and set equal to the difference (determined by summer 1634) between the motor current and the battery current limit estimate (generated by filter 1617 and limit logic 1632), thus regulating battery current.

In some embodiments, the selecting between the TCC controller and the SOC controller are shown graphically in FIG. 13.

When the magnitude of the load (motor) current 1608 is smaller than the battery current limit estimate 1303 but remains above the threshold for SOC control 1301, the difference between battery current and the battery current limit estimate is sunk by the FES 1608 thus charging the FES 1108. If the FES is fully charged, battery current is allowed to fall below the battery current limit estimate.

When the magnitude of motor current 1608 exceeds the battery current limit estimate 1403, the TCC controller 1612 sources current 1613 from the FES (as shown by 1518), thereby maintaining battery current at the battery current limit estimate so that the combination of battery current and FES current meets the motor current requirement. If the FES is depleted and unable to source current, battery current is allowed to exceed the battery current limit estimate. If the battery current increases to the high battery limit 1302, and attempts to exceed this current limit, then the motor current may be reduced using torque limiting, to regulate the current to this high allowed value.

Under certain conditions, the battery current limit estimate will be initialized meaning that the battery current limit estimate will be set to an initial value. The assignment of the initial value may be based on the operating history of the battery. Typically, the initial battery current limit estimate will be set to the low battery current limit 1301 whenever the vehicle is stopped or parked.

As described, when the FES is not able to protect the battery from high current, motor current is reduced, as illustrated 2324 in FIG. 23. In one implementation, the motor torque limit can be calculated simply using readily available parameters:

$$K\{P_{ultracap} + V_{bus} * I_{B\text{-}max}\}/w = T_{limit}$$

where:
K=a scaling parameter
Pultracap=power sourced by ultracap (measured value)
Vbus=DC bus voltage (measured value)
IB-max=maximum battery current (specified by estimator)
w=motor spin speed (measured value)

In some embodiments, the motor operates up to approximately 12000 rpm and this relates to approximately 90 mph of vehicle speed. The spin speed is used to compute torque from power since the basic relationship is: Power=Torque*Speed The scaling factor K is used to correct for system efficiency and for differences in units. The scaling factor K takes into account the efficiency of the motor, the motor drive, and the gearbox or transmission. This scaling factor may be fixed for simplicity or may be variable to better approximate motor and drive efficiency that vary as a function of current, motor speed, and other factors.

The method above is a direct estimation of the torque limit value. Alternatively, any number of feedback control methods may be also used to apply torque limiting to the motor as a function of the deviation of current from the high current limit. Typical methods include linear proportional-integral (PI) control, or a non-linear lookup table method.

It is desirable to assure stability in control transitions. One method of avoiding a particular type of control conflict (instability) between SOC controller 1611, TCC controller 1612, and the torque limit of the motor, is to exclude certain types of operations by using allowed operating zones (as shown in FIG. 13). Stability means the avoidance of self-induced transitions between control modes such as SOC control and TCC. In some embodiments, hysteresis may also be used to prevent rapid transitioning between operating modes. In some embodiments, stability can be attained as described below.

Referring to FIG. 13, the high 1302 and low 1301 battery current limits may define a band 1306 where FES operation is expected using the TCC control method 1612 (FIG. 6), and not by SOC control 1611. Below the low battery current limit 1301 in the SOC control zone 1309, the TCC method is excluded and only SOC control 1611 is used. When SOC control is active, FES charging current 1614 (FIG. 16) will not be allowed to result in a battery current that would cause an inadvertent transition to the TCC method (by raising the current above the low battery current limit 1301).

Exemplary rules to provide stability are described, and other rules may also be used. In addition to these, other rules that will also avoid excessive battery current and suppress the undesired transition between control states include:

(1) controlling FES current 1C, so that motor current (IM)+ FES current (IC) is greater than minimum battery current (IB-min);

(2) requiring motor current (IM) to be greater than zero to enable FES charging (i.e. use motor regeneration and not the battery for charging of the FES);

(3) applying fixed or variable thresholds other than motor current (IM) greater than zero or motor current (IM) greater than minimum battery current (IB-min) to enable FES charging;

(4) automatically adjusting the time constant of the TCC filter 1617 (FIG. 6) to influence the rate at which the FES is depleted under different conditions (e.g. using a shorter time constant at high motor current IM to avoid depleting the capacitor too quickly);

(5) using a fixed or automatically adjusted FES current (IC) current limit (as well as an IB limit) to impose a high charge/discharge rate for the FES, thus controlling the charge/depletion time;

(6) applying an SOC control zone 1309 (FIG. 13) specifically for the purpose of defining a FES state of charge "seek state" in which SOC control is enabled;

These equations assume negative current values for discharging of the battery and/or FES, and delivering power to the motor. Positive values represent a regenerative situation where the motor generates current, and charges the battery and/or FES.

Further aspects of the invention will become apparent from consideration of the drawings and the ensuing description of preferred embodiments of the invention. A person skilled in the art will realize that other embodiments of the invention are possible and that the details of the invention can be modified in a number of respects, all without departing from the inventive concept. Thus, the following drawings and description are to be regarded as illustrative in nature and not restrictive.

Figure 17:
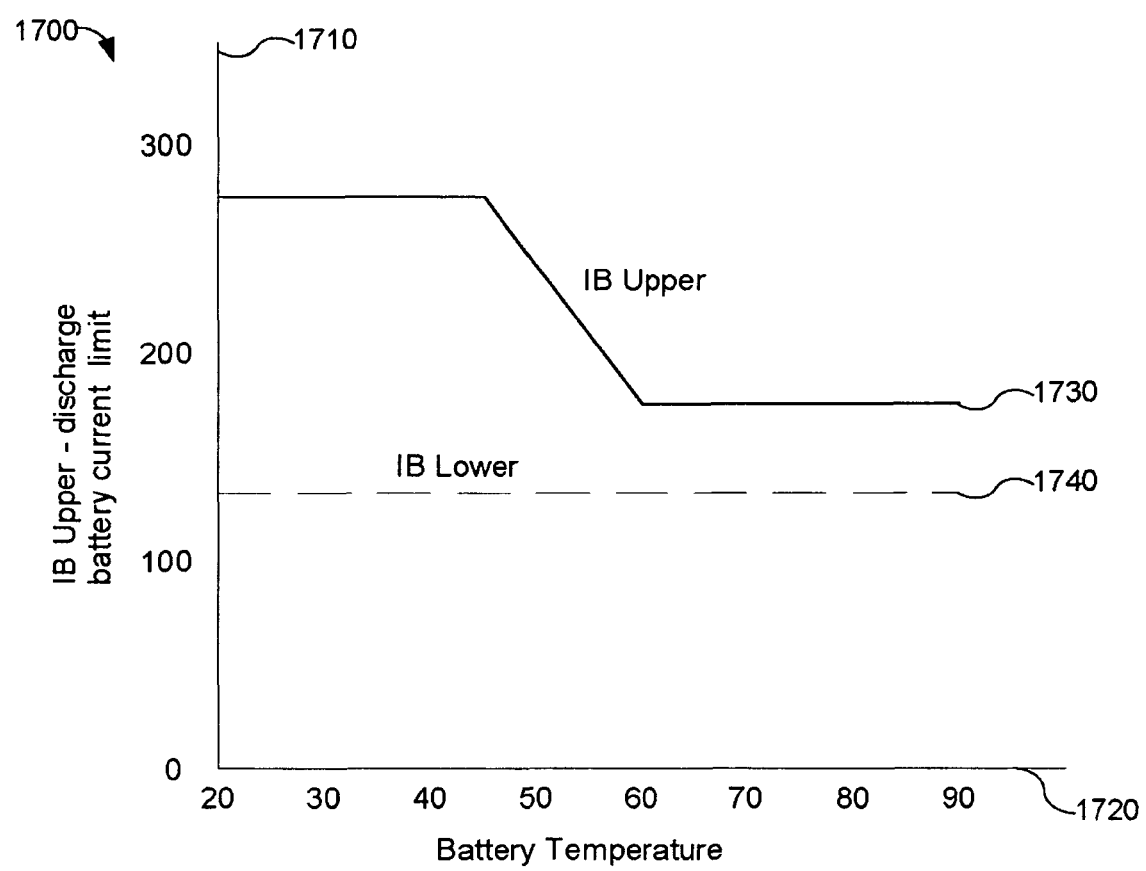
FIG. 17 is a graph of adaptive current vs. temperature, in accordance with some embodiments.

FIG. 17 illustrates a graph 1700 of varying adaptive current vs. temperature. The x-axis 1720 illustrates battery temperature (e.g., in degrees F.) and the y-axis illustrates the discharge battery current limit in amperes (A). A dotted line 1740 illustrates a lower battery current limit (IB Lower). A solid line 1730 illustrates the upper battery current limit IB Upper, and how it varies with temperature. As the battery temperature increases, the upper current limit is reduced to protect the battery from damage1.

Referring to FIGS. 18-22, alternate embodiments of the invention are disclosed.

FIG. 18 shows a schematic of a parallel hybrid propulsion system with one electrically driven axle, in accordance with some embodiments.

The parallel hybrid propulsion system comprises an engine 1803 (e.g., a conventional hydrocarbon fuel engine as described) mechanically coupled to a motor/generator 1802 (where during recharge the gearbox drives the motor/generator producing electricity, and during discharge the motor/generator drives the gearbox to turn the axle 1805 and wheel 1806) and mechanically coupled to a gearbox 1804, and coupled via the gearbox to an axle 1805 and a wheel 1806.

The motor/generator 1802 is coupled to a power controller converter (PCC) 1807 via a DC bus 1811 (although in some embodiments an AC bus may be used). The PCC 1107 is coupled to a FES 1808, and to a slow energy storage (e.g., battery) 1809. The PCC 1807 is coupled to the DC bus 1811, and thus to the motor/generator 1802.

Electric power is exchanged between the motor/generator 1802, the battery 1809, the FES 1808, and the ancillary systems by the power converter and controller 1807. Both the conventional combustion engine 1803 and the electric motor 1802 drive the same set of wheels 1806.

FIG. 19 is a schematic of a Through The Road (TTR) parallel plug-in hybrid vehicle, in accordance with some embodiments. The TTR parallel configuration comprises a electrical power portion 1901 and a combustion power portion 1900.

In this embodiment, the electrical power portion 1901 comprises a first set of wheels 1906 coupled to an axle 1905, where the axle is mechanically coupled to a gearbox 1905 and to an electric motor/generator 1902. The electric motor/generator is electrically coupled by a DC bus 1913 (or in some embodiments an AC bus) to a power converter controller (PCC) 1907 and to a battery 1909 and to a FES 1908.

The combustion power portion 1900 comprises an engine 1903 mechanically coupled to a second set of wheels 1912, through a second gearbox or transaxle 1910 and through a second axle or half shafts 1911. In the TTR configuration, there is no electrical exchange of traction energy between the combustion portion 1900 and the electrical portion 1901 and no mechanical exchange of energy between the engine and the electrical drive system except for that which passes through the road on which the vehicle travels. An example of TTR transfer of energy is operation of the engine 1903 at a higher power than necessary to propel the vehicle while simultaneously operating the electric drive train (gearbox 1904 and motor/generator 1902) to provide regenerative braking, to absorb the excess energy produced by the engine 1903 and store it in the battery 1909 or FES 1908.

FIG. 20 is a schematic of a series hybrid propulsion system 2000 with two driven axles, in accordance with some embodiments.

The series hybrid propulsion system comprises an engine 2003, mechanically coupled to a first motor/generator 2001 such that the engine drives the first motor/generator producing electricity. The motor/generator 2001 is coupled to a power controller converter (PCC) 2007, and the PCC 2007 is coupled to a FES 2008 and to a slower energy storage (e.g., battery 2009).

A third motor generator 2013 is electrically coupled to the PCC 2007. The third motor/generator 2013 is mechanically coupled to a second gearbox 2010, which is mechanically coupled to a second axle 2011. The second axle is mechanically coupled to a second set of wheels 2012.

A second motor/generator 2002 is electrically coupled by a DC bus 2014 (which in some embodiments can be an AC bus) to the PCC 2007. The second motor/generator 2002 is mechanically coupled to a first gearbox 2004, which is mechanically coupled to a first axle 2005. The first axle is mechanically coupled to a first set of wheels 2006.

The second motor/generator 2002 uses electricity to provide motive power to the driven second wheel 2006 via the second gearbox (transaxle) and differential 2004, and second axle or half shafts 2005. The third motor/generator 2013 uses electricity to provide motive power to the second set of driven wheels 2012 through the second gearbox or transaxle 2010 and the second axle or set of half shafts 2011. Power is exchanged between motor/generators, the battery 2009, the FES 2008, and ancillary systems by the power converter and controller 2007. The second and third motor/generators 2002 and 2013 may consume electricity to produce traction power or may produce electricity through regenerative braking.

Figure 21A:
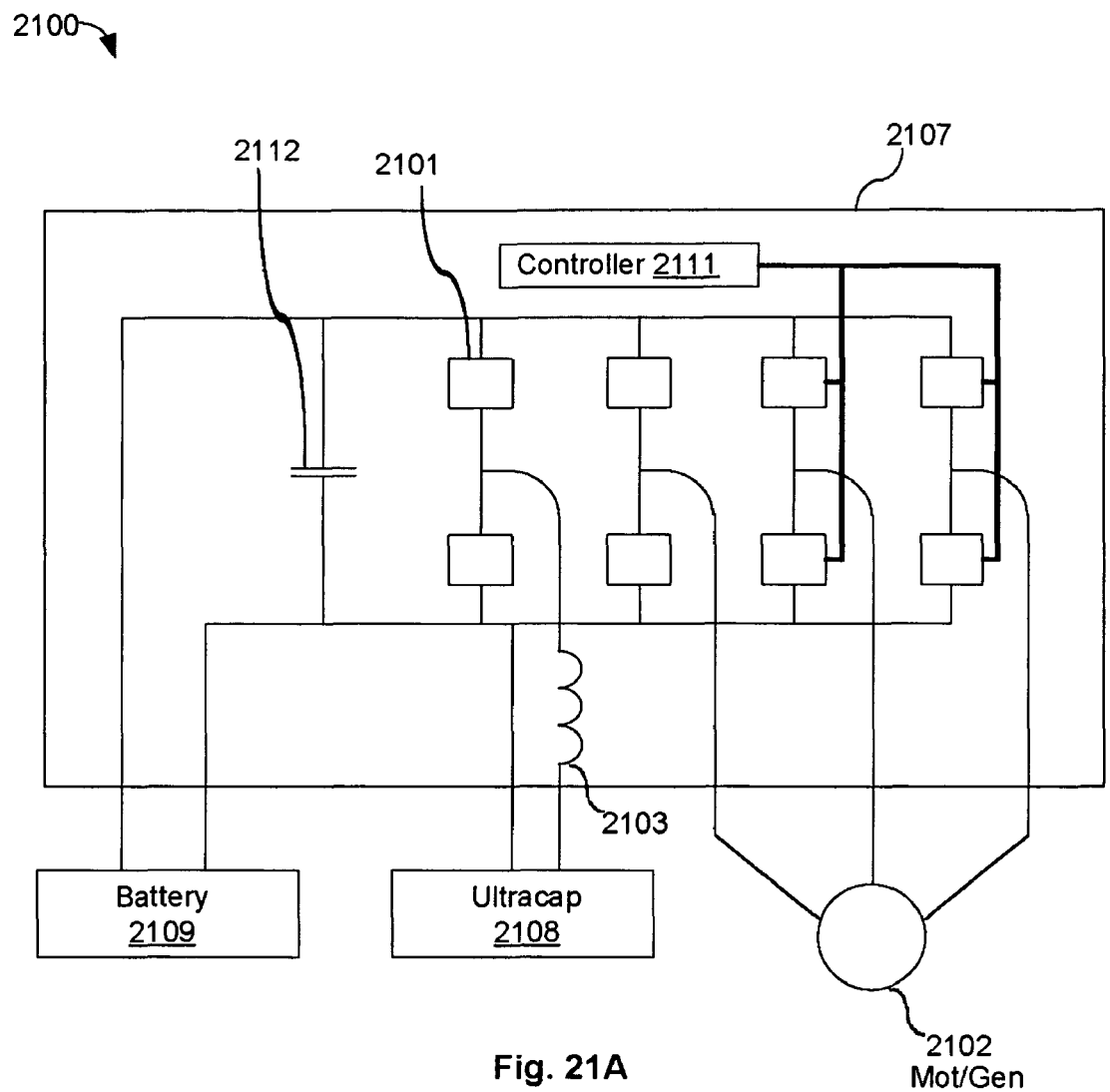
FIGS. 21A and 21B are a schematic of exemplary propulsion systems for the vehicles shown in FIGS. 18, 19, 20, in accordance with some embodiments.
Figure 21B:
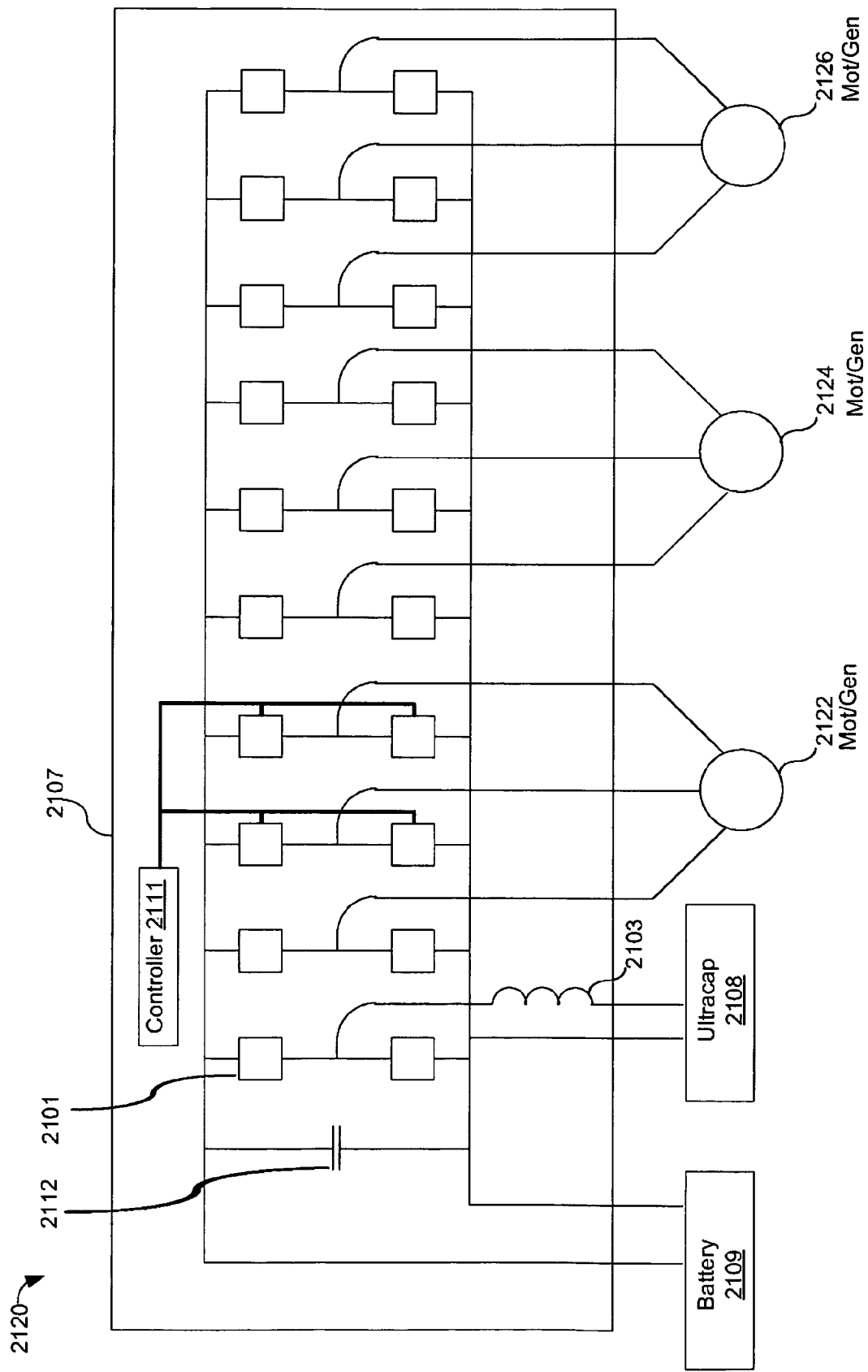

FIGS. 21A and 21B are a schematic of exemplary propulsion systems for the vehicles shown in FIGS. 18, 19, 20, in accordance with some embodiments.

FIG. 21A shows a propulsion system 2100, comprising a power converter controller (PCC) 2107, coupled to a slower energy source (e.g., battery 2109) and to a FES 2108. A motor/generator 2101 is also coupled to the PCC 2107. The PCC comprises a controller 2111, a smoothing capacitor 2112 coupled across inputs from the battery 2109, a plurality of switches 2101 coupled in series across the inputs of the battery 2109, and an inductor 2103 coupled to an input from the FES 2108, and coupled between a first set of switches 2101. A plurality of inputs from the motor/generator 2102 are coupled between sets of switches 2101 also.

The propulsion system 2100 of FIG. 21A is a schematic representation of the power converter and controller 2107 corresponding to the parallel drive shown in FIG. 18, and to the through the road (TTR) system shown in FIG. 19.

In an embodiment, the switches 2101 drive the motor/generator 2102 and are arranged in a 3-phase bridge configuration. The FES 2108 is coupled to the DC bus (i.e., the power supplied by battery 2109) by a buck-boost converter comprising a single phase leg with the first set of switches 2101 and the inductor 2103. Smoothing capacitor 2112 helps stabilize the DC bus voltage (i.e., the power supplied by battery 2109) and reduces the ripples. The switching devices 2101 are operated by the controller 2111. For simplicity only a few of the control paths between the controller 2111 and the switching devices 2101 are shown.

The propulsion system 2120 of FIG. 21B is a schematic representation of the power converter and controller 2107 corresponding to the two-axle series configuration shown in FIG. 20.

The propulsion system 2120 comprises (similar to FIG. 21A) a power converter controller (PCC) 2107, coupled to a slower energy source (e.g., battery 2109) and to FES 2108. The PCC comprises a controller 2111, a smoothing capacitor 2112 coupled across inputs from the battery 2109, a plurality of switches 2101 coupled in series across the inputs of the battery 2109, and an inductor 2103 coupled to an input from the FES 2108, and coupled between a first set of switches 2101.

A first motor/generator 2122 is also coupled to the PCC 2107, and has a plurality of inputs coupled between a set of switches 2101. A second motor generator 2124 and third motor generator 2126 are similarly coupled to the PCC 2107. In some embodiment, the first, second and third motor/generators correspond to motor/generators 2001, 2002, and 2013 of FIG. 20.

Referring to FIG. 21B, in an embodiment the power converter and controller (PCC) 2107 corresponding to the two-axle series configuration shown in FIG. 20 may have two driven axles, e.g., corresponding to second motor generator 2124 and third motor generator 2126. In some embodiments, all three motor/generators shown in FIG. 20 are coupled to a DC bus (the battery 2104) through 3-phase inverters comprising switching devices 2111 operated by a controller 2114, as described.

Figure 22:
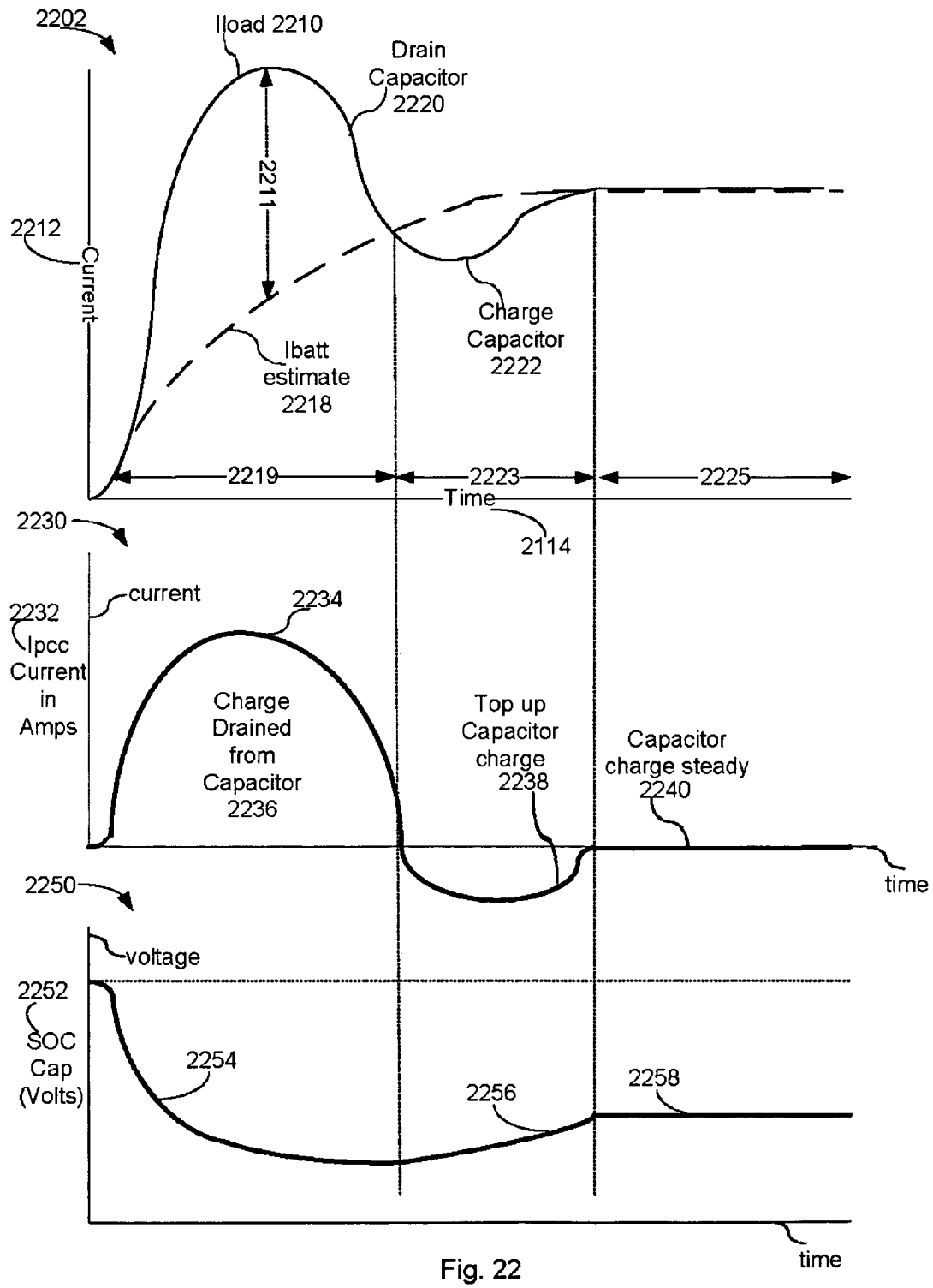
FIG. 22 are graphs of load current, PCC current, and FES voltage versus time showing adaptive charging of a fast energy storage, in accordance with some embodiments.

FIG. 22 illustrates a graph 2202 of load current, graph 2230 of PCC current, and graph 2250 of FES voltage, all with respect to time, showing adaptive charging of a FES, in accordance with some embodiments. In FIG. 22, graphs 2202 and 2230, a value above the X-axis indicates a positive current. In FIG. 22, graph 2250, a value above the X-axis indicated a positive voltage.

Graph 2202 illustrates current 2212 on the Y-axis and time 2114 on the X-axis. An average load current (Iload) 2210 drawn by a load (e.g., a motor/generator) rises rapidly as a vehicle accelerates (e.g., from a standstill), during a transient period 2219. The load current drawn by the load typically rises faster than an estimated battery current (Ibatt estimate) 2218. The battery is a slow energy storage device that stores significant amounts of energy, but that must release that energy relatively slowly when compared to the rate of change of the load current 2210, to avoid overheating and damaging the battery. If the difference 2211 between the average load current and the estimated battery current is not satisfied from a source other than the battery, the battery will attempt to supply the difference 2211, drawing more current than is safe (i.e., higher than the Ibatt estimate 2218), potentially damaging the battery.

The fast energy storage supplies the difference 2211 between the estimated battery current 2218 and the load current 2210 during the transient period 2219 and energy is drained 2220 from the capacitor. Graph 2230 illustrates current 2234 sourced by the fast energy storage device. The integral of this current 2234 gives the charge 2236 drained from the fast energy storage device during the transient period 2219. Graph 2250 shows the state of charge (SOC) 2252 of the fast energy storage device. This charge drops 2254 during the transient period 2219 as current is drawn from the fast energy storage device and supplied to the load (motor) by the power converter controller (PCC). The charge then rises during time period 2223 as the capacitor is recharged, where this charge is given by the integral 2238 (top up capacitor charge) of the current 2234 during time period 2223.

In some embodiments, when the vehicle approaches a target speed (e.g., 60 mph) the current drawn by the load begins to decrease. In some embodiments, this is approximately mid-way through the transient period 2219. This decrease occurs as a driver begins to back off the acceleration (i.e., take his/her foot off the accelerator pedal slightly) as the vehicle begins to approach a target speed. When this occurs, the load current begins to reduce. While the load current 2210 is greater than the estimated battery current 2218, the FES continues to supply current to supplement the estimated battery current and depletes charge 2254 as energy is drained 2222 from the FES.

When the load current 2210 falls below the estimated battery current 2218, the excess of the battery current over the load current is used to 'top-up' the fast energy storage device. This is shown as period 2223 of graph 2210. During this period, charge flows from the battery into the PCC (shown as a negative current 2238 in graph 2230) and this causes the state of charge (SOC) of the fast energy storage to rise, shown as voltage rise 2256 in graph 2250.

When the load current and battery current equalize (period 2225) current is no longer supplied from the battery to the fast energy storage. No additional current flows into the fast energy storage, as shown by the zero current flow 2240 in graph 2230. The state of charge 2258 of the fast energy storage levels out and stays steady 2258. When the average load current 2210 falls below the estimated battery current 2218, the capacitor charge up again. In some embodiments, the PCC can be configured (e.g., by selecting time constants) such that the time 2223 (charge capacitor time) is longer so the capacitor charges up fully upon reaching a steady state (where the estimated battery current matches the load current).

FIG. 23 illustrates graphs of load current and FES voltage vs. time, showing adaptive charging of a fast energy storage, in accordance with other embodiment.

FIG. 23 illustrates a graph 2310 of current 2312 flowing overtime 2314. In this embodiment, an average load current 2316 is illustrated along with estimated battery current 2322. During a time period 2370, load current 2316 starts rising as current is drawn by the motor. In some embodiments, once the load current rises over the lower battery current limit 2330, an estimated battery current 2322 is calculated, e.g., by the PCC controller.

During a time period 2372, when the load current 2316 is higher than the estimated battery current 2322, current is supplied from the fast energy storage to make up this difference. The state of charge (SOC) of the fast energy storage decreases from a full level 2360 (or close to the full level) to a low level 2362. When the fast energy storage reaches the low level and is discharged, current can no longer be supplied by the fast energy storage to the load. At this point the torque to the load is cut 2324, and the load current 2316 drops to a level to match the estimated battery output current 2322. The estimated battery output current may be set at (or close to) an upper battery current 2318, e.g., a temporary (e.g., 30 second) maximum load that the battery can supply. In some embodiments, close to means within 5% of maximum. In some embodiments, close to means within 15% of maximum. In some embodiments, close to means within 30% of maximum.

In a band 2326 between the upper battery current 2318 and the lower battery current 2330, the fast energy storage (e.g., capacitor) will be recharged if the transient load current 2316 falls below the estimated battery current 2322. If the load current falls into in a band 2328 below the lower battery current 2330, the fast energy storage will be recharged.

Figure 24:
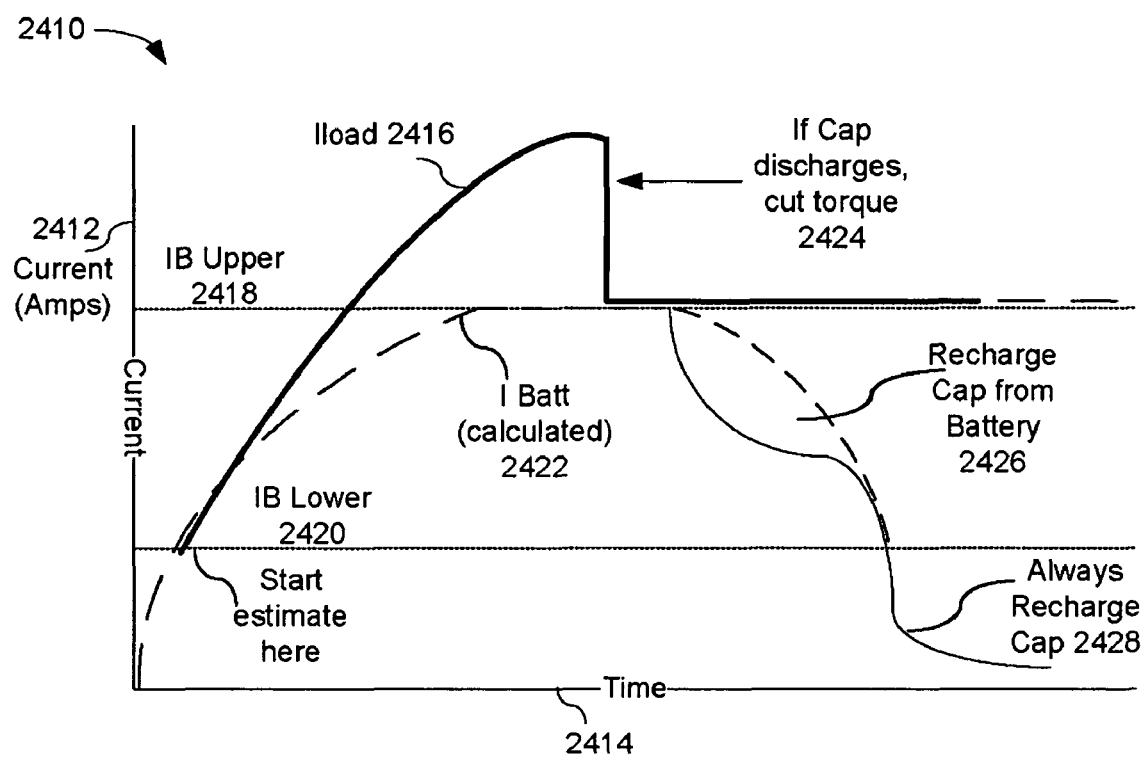
FIG. 24 is a graph of load current versus time showing adaptive charging of a FES, in accordance with other embodiments.

FIG. 24 illustrates a graph 2410 of current 2412 overtime 2314. In this embodiment, an average load current 2416 drawn by the load is illustrated along with estimated battery current 2422. FIG. 24 illustrates upper 2418 and lower 2420 battery current limits. When the load current falls below the estimated battery current 2422, the fast energy storage (e.g., capacitor) is recharged 2426. If the load current falls below the lower 2420 battery current limit, the fast energy storage is recharged 2428.

Figure 25:
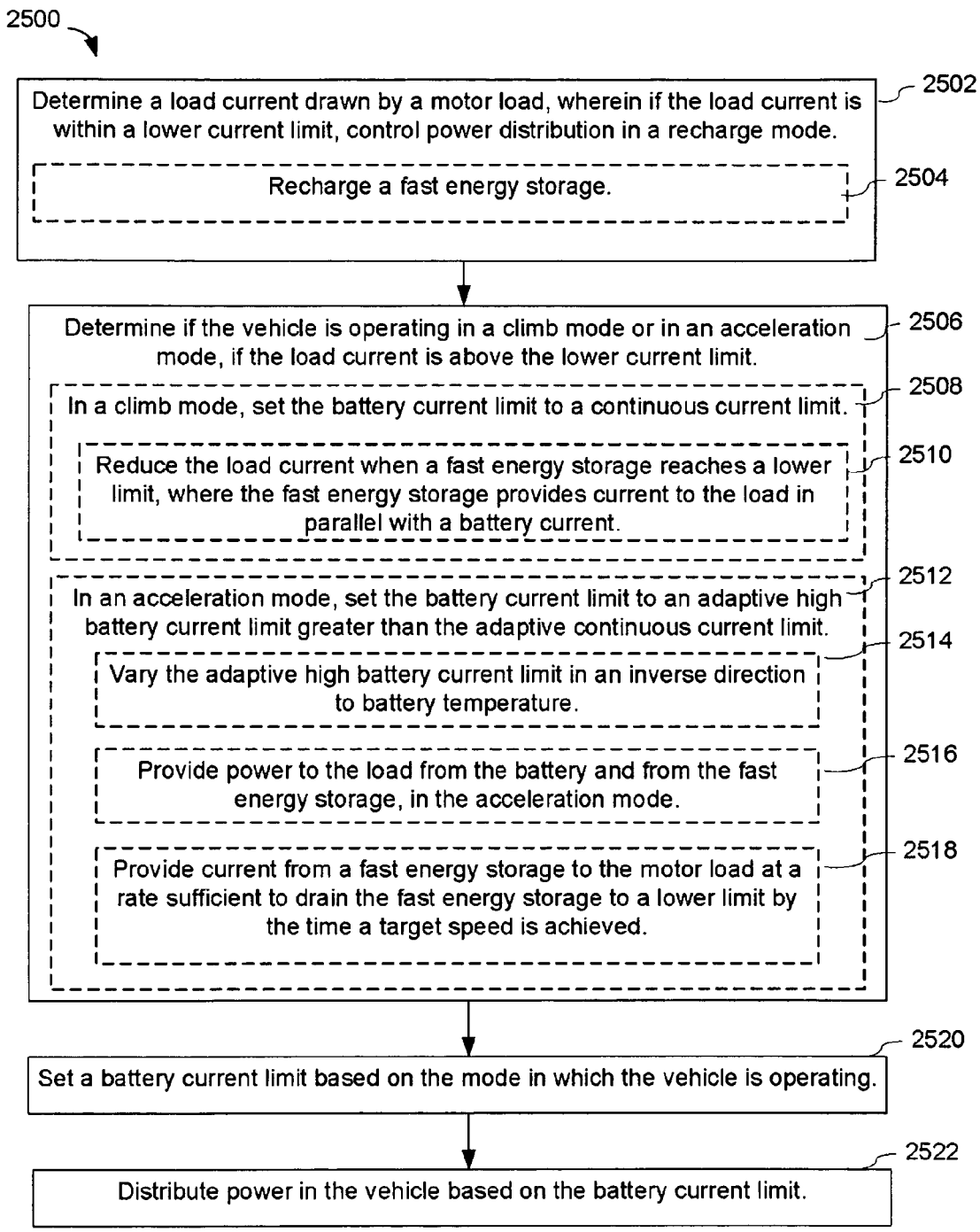
FIG. 25 is a flowchart for controlling power distribution using a fast energy storage device, and for adaptively controlling current in an electric vehicle, in accordance with some embodiments.

FIG. 25 is a flowchart representing a computer method 2500 for dual energy storage management, according to certain embodiments of the invention.

A load current drawn by a motor load (e.g., motor/generator 1102, FIG. 11) is determined (2502), and if the load current is within a lower current limit, power distribution is controlled in a recharge mode.

In some embodiments, (e.g., FES 1108, FIG. 11) is recharged (2504).

A determination is made (2506) if the vehicle is operating in a climb mode or in an acceleration mode, if the load current is above the lower current limit.

In some embodiments, in a climb mode, the battery current limit is set to a continuous current limit (2508), such as minimum battery current limit 1301 of FIG. 14. This minimum limit prevents the fast energy storage from becoming depleted. In some embodiments, the fast energy storage is maintained with sufficient charge for maneuvering or bursts of acceleration while climbing, in case the drive needs to quickly maneuver out of a dangerous situation or pass a big vehicle (e.g., a semi trailer).

In some embodiments, the load current is reduced (2510) when a fast energy storage reaches a lower limit, wherein the fast energy storage provides current to the load in parallel with a battery current.

In some embodiments, in an acceleration mode, the battery current limit is set (2512) to an adaptive high battery current limit greater than the adaptive continuous current limit, such as the maximum battery current limit 1302 of FIG. 14. This high limit allows high power for fast acceleration, and may be adaptively varied 1403 in response to battery temperature, battery wear, external environmental conditions, etc. In some embodiments, this is advantageous since it permits a more efficient use of the battery power and fast energy storage power by reducing cost and weight of the power system.

In some embodiments, the adaptive high battery current limit is varied (2514) in an inverse direction to battery temperature. As battery temperature rises (due to current drawn from the battery), current drawn from the battery must be reduced to prevent harm to the battery. The adaptive current limit takes account of this by reducing the current drawn from the battery when the battery gets hot, thus preventing damage to the battery.

In some embodiments, in the acceleration mode power is provided (2516) to the load from the battery and from the fast energy storage. For example, in FIG. 22 during the first time period 2219, the automobile is accelerating, and the motor draws a high load current 2210. The battery can only safely provide a portion of this load current (Ibatt estimate 2218) and the difference 2211 is provided by the fast energy storage. Graph 2230 illustrates the charge drained from the fast energy storage (capacitor) 2236. Graph 2250 illustrates the drop 2254 in the state of charge of the fast energy storage as it provides power to the load 2210.

In some embodiments, current is provided from a fast energy storage (2518) to the motor load at a rate sufficient to drain the fast energy storage to a lower limit by the time a target speed is achieved. For example, the charge in the fast energy storage may drain 2254 as power if provided to the load 2211 to supplement the battery power 2218. The rate at which charge drains can be set to drain all or most of the charge during a 0-60 mph acceleration. Many automobiles are specified and rated by the time in which the accelerate from 0 to 60 miles per hour. Thus, it may be advantageous to drain the capacitor during this acceleration to provide maximum boost to the motor.

A battery current limit is set (2520) based on the mode in which the vehicle is operating, as described.

Power is distributed in the vehicle (2522) based on the battery current limit.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described to best explain the principles of the invention and its practical applications, to thereby enable others skilled in the art to best utilize the invention and various embodiments with various modifications as are suited to the particular use contemplated.

What is claimed is:

1. A method of controlling power distribution, comprising:
   determining a load current drawn by a load;
   estimating an estimated battery current to be supplied from a battery to the load, based on the load current;
   determining a transient current required from a fast energy storage to the load based on the estimated battery current and the load current;
   controlling discharge of the transient current from the fast energy storage to the load, and
   analyzing the load current and determining if the load is stopped or operating in a steady state,
   if the load is stopped, controlling the recharge current to charge the fast energy storage to the maximum charge, and
   if the load is operating in a steady state:
   determining an estimated recharge current to be supplied to the fast energy storage by the battery, based on the steady state; and controlling the recharge current to charge the fast energy storage to below the maximum charge.

2. The method of claim 1, further comprising recharging the fast energy storage if the load current is below a predetermined level.

3. The method of claim 1, wherein the estimating further comprises filtering the load current to generate the estimated battery current.

4. The method of claim 1, further comprising limiting the estimated battery current to a maximum threshold value.

5. The method of claim 3, wherein if the estimated battery current remains near a maximum threshold value for more than a predetermined period of time, reducing the estimated battery current to a lower threshold value below the maximum threshold value.

6. The method of claim 3, further comprising recharging the fast energy storage if the load current is below a lower threshold value.

7. The method of claim 1, wherein at least one of the estimating, determining, or controlling occur at a power controller.

8. The method of claim 1, wherein the method is performed at a universal power supply (UPS).

9. The method of claim 1, wherein the method is performed at an at least partially electric vehicle.

10. The method of claim 1, wherein the method is performed at a lift power controller converter in a lift mechanism.

11. The method of claim 1, wherein determining the load current includes measuring energy associated with the load current at a sensor coupled to a powertrain of a vehicle.

12. The method of claim 1, wherein determining the load current includes measuring a position of a throttle control, wherein the throttle control is configured to increase or decrease the load current to the load.

13. The method of claim 2, wherein the load current is filtered using a low-pass filter.

14. The method of claim 1, wherein estimating the estimated battery current includes estimating a safe battery current that a battery can provide without damaging the battery.

15. The method of claim 1, wherein the transient current is a difference between the load current and the estimated battery current.

16. The method of claim 1, further comprising reducing the load current when the fast energy storage reaches a minimum charge.

17. The method of claim 16, further comprising limiting the estimated battery current drawn from the battery to a maximum battery current level.

18. The method of claim 17, further comprising varying the maximum battery current level in response to a temperature of the battery.

19. The method of claim 1, further comprising upon reaching a low charge state of the fast energy storage, gradually reducing the transient current from the fast energy storage to protect the fast energy storage from damage.

20. The method of claim 1, wherein the controlling includes sending a discharge command to a power converter controller to manage a flow of electrical energy from the fast energy storage and the battery.

21. The method of claim 1, further comprising monitoring a state of charge of the fast energy storage and gradually reducing the estimated recharge current to be supplied by the battery, to protect the fast energy storage from damage.

22. The method of claim 21, further comprising sending a recharge command to a power converter controller, wherein the power converter controller manages a flow of electrical energy between the fast energy storage and the battery.

23. The method of claim 1, wherein determining when a steady state has been reached includes comparing the transient current to a seek band, wherein the seek band specifies a range of transient current in which the fast energy storage will be recharged.

24. A non-transitory computer readable storage medium storing one or more programs configured for execution by one or more processors, the one or more programs comprising instructions to:
 determine a load current drawn by a load;
 estimate an estimated battery current to be supplied from a battery to the load, based on the load current;
 determine a transient current required from a fast energy storage to the load based on the estimated battery current and the load current;
 control discharge of the transient current from the fast energy storage to the load, and
 analyzing the load current and determining if the load is stopped or operating in a steady state,
  if the load is stopped, controlling the recharge current to charge the fast energy storage to the maximum charge, and
  if the load is operating in a steady state:
   determining an estimated recharge current to be supplied to the fast energy storage by the battery, based on the steady state; and
   controlling the recharge current to charge the fast energy storage to below the maximum charge.

25. A method of adaptively controlling a load driven by a system that includes a battery and a fast energy storage, the method comprising:
 determining a load current drawn by the load;
 determining an estimated battery current by filtering the load current;
 bounding the estimated battery current to an upper first threshold value;
 bounding the estimated battery current to a lower second threshold value, and
 analyzing the load current and determining if the load is stopped or operating in a steady state,
  if the load is stopped, controlling the recharge current to charge the fast energy storage to the maximum charge, and
  if the load is operating in a steady state:
   determining an estimated recharge current to be supplied to the fast energy storage by the battery, based on the steady state; and
   controlling the recharge current to charge the fast energy storage to below the maximum charge.

26. The method of claim 25, further comprising limiting a maximum current drawn from the battery to the upper first threshold value, if the current drawn by the load is above the upper first threshold value for a period of time.

27. The method of claim 25, further comprising recharging the fast energy storage if the load current is below the lower second threshold value.

28. The method of claim 25, further comprising determining a transient current required from the fast energy storage to the load based on the estimated battery current, and controlling discharge of the transient current from the fast energy storage to the load.

29. A non-transitory computer readable storage medium storing one or more programs configured for execution by one or more processors, the one or more programs comprising instructions to adaptively control power distribution in a system that includes a battery and a fast energy storage, comprising instructions to:

determine a load current drawn by the load;

determine an estimated battery current by filtering the load current;

bound the estimated battery current to an upper first threshold value;

bound the estimated battery current to a lower second threshold value, and analyzing the load current and determining if the load is stopped or operating in a steady state, if the load is stopped, controlling the recharge current to charge the fast energy storage to the maximum charge, and if the load is operating in a steady state:
- determining an estimated recharge current to be supplied to the fast energy storage by the battery, based on the steady state; and
- controlling the recharge current to charge the fast energy storage to below the maximum charge.

* * * * *